United States Patent
Kunchakarra et al.

(10) Patent No.: US 12,541,726 B1
(45) Date of Patent: Feb. 3, 2026

(54) EFFICIENT PROVISIONING, IDENTIFICATION AND REMEDIATION OF EXCESSIVE PRIVILEGES OF IDENTITY AND ACCESS MANAGEMENT ROLES AND POLICIES USING AI/ML MODELS

(71) Applicant: CAPITIS SOLUTIONS INC., Clarksville, MD (US)

(72) Inventors: Prasad V. Kunchakarra, Clarksville, MD (US); Samiul Karim, Clarksville, MD (US); Vikas K. Gupta, Clarksville, MD (US); Eric C. Hein, Clarksville, MD (US); Sanjay K. Kunchakarra, Clarksville, MD (US)

(73) Assignee: CAPITIS SOLUTIONS INC.

( * ) Notice: Subject to any disclaimer, the term of this patent is extended or adjusted under 35 U.S.C. 154(b) by 119 days.

(21) Appl. No.: 18/405,289

(22) Filed: Jan. 5, 2024

Related U.S. Application Data

(63) Continuation-in-part of application No. 18/123,618, filed on Mar. 20, 2023, now Pat. No. 11,895,121.

(51) Int. Cl.
*H04L 29/06* (2006.01)
*G06F 40/40* (2020.01)
*G06Q 10/0631* (2023.01)

(52) U.S. Cl.
CPC ......... *G06Q 10/0631* (2013.01); *G06F 40/40* (2020.01)

(58) Field of Classification Search
CPC ... H04L 63/105; H04L 63/104; H04L 63/107; H04L 63/108; H04L 63/20; H04L 63/0263
USPC .............................................. 726/1
See application file for complete search history.

(56) References Cited

U.S. PATENT DOCUMENTS

| | | | | |
|---|---|---|---|---|
| 9,087,148 | B2 * | 7/2015 | Giblin | H04L 63/20 |
| 11,055,420 | B2 * | 7/2021 | De Gaetano | G06F 21/604 |
| 11,108,828 | B1 * | 8/2021 | Curtis | H04L 63/20 |
| 2019/0114593 | A1 * | 4/2019 | Champaneria | G06F 16/3326 |
| 2023/0131236 | A1 * | 4/2023 | Khan | G06Q 10/1053 |
| | | | | 705/321 |

* cited by examiner

*Primary Examiner* — Longbit Chai
(74) *Attorney, Agent, or Firm* — Raj S. Dave; Dave Law Group LLC

(57) ABSTRACT

A method is described. The method comprises: extracting one or more contents related to an organization from one or more data sources based on one or more job role names and one or more contextual inputs; determining, using an artificial intelligence engine, at least one of an organizational structure, one or more roles, one or more responsibilities, one or more hierarchical relationships, one or more access levels, one or more service actions, and one or more departments of the organization from the one or more contents; and generating, using the artificial intelligence engine, one or more job descriptions based on at least one of the organizational structure, the one or more roles, the one or more responsibilities, the one or more hierarchical relationships, the one or more access levels, the one or more service actions, and the one or more departments.

19 Claims, 19 Drawing Sheets

EFFICIENT PROVISIONING, IDENTIFICATION AND REMEDIATION OF EXCESSIVE PRIVILEGES OF IDENTITY AND ACCESS MANAGEMENT ROLES AND POLICIES USING AI/ML MODELS

CROSS-REFERENCE TO RELATED APPLICATIONS

The present application is a continuation-in part application of U.S. patent application Ser. No. 18/123,618 titled "EFFICIENT IDENTIFICATION AND REMEDIATION OF EXCESSIVE PRIVILEGES OF IDENTITY AND ACCESS MANAGEMENT ROLES AND POLICIES" filed on Mar. 20, 2023, and allowed for issuance as a patent. The contents of the aforementioned application are incorporated by reference in their entirety.

FIELD OF THE INVENTION

This disclosure relates generally to computing systems configuration management and, more particularly, to efficient configuration compliance verification of resources in a target environment of a computing system. The disclosure further relates generally to computer system and/or or information technology (IT) systems security, and more particularly, to systems, methods, and non-transitory storage mediums for efficiently identifying and remediating excessive privileges of Identity and Access Management (IAM) Roles and/or Policies.

BACKGROUND

Compliance specific to security in a traditional computing system may involve implementing boundary controls at network and infrastructure layers of a system architecture model thereof. With increasing threats posed by external and internal actors, information security teams associated with the traditional computing system are now increasingly aware of controls for protecting data at rest and data in motion through encryption. Also, penetration testing and security vulnerability management in the traditional computing system has matured considerably. However, little attention has been directed toward hardening and configuration management of applications and vendor products such as databases, application servers and web servers within the traditional computing system. Further, configuration management of applications, microservices, infrastructure, platform services, Software-as-a-Service (SaaS) services have not been given full attention from a functional and/or a non-functional perspective as standalone resources and/or interoperable elements (e.g., resource-to-resource interfaces, integrations; compatible elements).

A functional configuration may be a configuration related to an actual working of a computing system to create functional value thereof. The function configuration may simply deal with one or more functional features of the aforementioned computing system. A non-functional configuration may refer to one or more features of the system that are pertinent to characteristics including but not limited to availability, performance, resilience, scalability, throughput, and response time. Security configurations may deal with security controls implementations such as encryption algorithm types and secure protocol types.

A misconfiguration can contribute to one or more of the above issues related to security, functionality, performance, availability, resilience, throughput, and response time. During the lifecycle of a computing system, resource configurations may change. A change in one or more resource configurations may have side effects. A change to a security configuration of a computing network may make an application non-functional, lead to suboptimal performance thereof and/or may lead to data loss.

Personnel associated with the traditional computing system may operate in silos. The lack of ready availability of configuration information across the traditional computing system may render the above mentioned misconfigurations (e.g., security, functional and/or non-functional aspects thereof) difficult to handle. Data losses and security compromises ensuing from the aforementioned security misconfigurations may render recovery costs prohibitive. Additionally, a functional misconfiguration may render the computing system incapable of delivering business value, and a non-functional misconfiguration may cause a user of the computing system to experience degraded performance or in, some cases, unavailability of one or more resources.

"Security of computer system or information technology (IT) infrastructure, which is also termed cyber security, can be a significant concern for modern computer system administrators. One aspect of cyber security is access control, which is concerned with ensuring that resources (e.g., computers, data repositories, network resources, services, etc.) are accessed by authorized entities (e.g., users, services, objects, other resources) in an authorized manner. When implemented and managed appropriately access control can prevent theft, unauthorized access, and/or damage to IT resources, help maintain and deliver IT services and functionality, and prevent system disruption. With the increasing complexity, scale, and rate of change of organizational IT infrastructure, especially as cloud infrastructure, services, and applications are adopted—managing and verifying cyber security and access control in modern IT systems can be a challenge. Typically, many organizations continue to rely on unwieldy and error prone manual methods to verify access control. Access control policies may be verified through periodic manual reviews focused on spot-checking specific components or parts of the IT infrastructure. For example, computer security professionals may manually analyze access count of the IT infrastructure to verify that the access control policies are appropriately configured to reflect organizational procedures. However, in part because of its manual nature, IT security policy analysis and/or verification is typically sporadic and focused only on a portion of the overall IT infrastructure. Because the underlying IT infrastructure can change rapidly and have a very large scale—security reliant on sporadic manual checks on parts of the infrastructure can leave significant gaps in the security framework and leave sensitive data and workloads open to unauthorized access from hackers or malicious insiders. In addition, the dynamic nature of IT infrastructure (with resources being continually added, deleted, and/or replaced) coupled with the absence of comprehensive and continuous access control checks across the infrastructure, may lead to inconsistent application and enforcement of access control policies." [Source: U.S. patent application Ser. No. 16/389,755 titled "Automated access control management for computing systems: published on 24 Oct. 2019].

"Computer networks have become important tools for modern business. Today a large amount of information is stored in and accessed across such networks by users throughout the world. Much of this information is, to some degree, private or confidential and protection of the information is required. Not surprisingly then, various network security monitor devices have been developed to help uncover attempts by unauthorized persons and/or devices to gain access to computer networks and the information stored therein.

In the context of enterprise systems, a user identity generally refers to information that uniquely identifies a user. By providing some of such information to a network security monitor device of the enterprise system, a user may be permitted to access various resources available within the enterprise. These resources can include, for example, software products, applications (e.g., cloud-based applications, enterprise applications, or any other applications), cloud services, various types of data (e.g., networked files, directory information, databases, or the like) and other resources. In order to effectively manage user access to resources within an enterprise, the enterprise often has to monitor and track the users' access to information stored in multiple target systems of the enterprise. Therefore, techniques for managing user access to available resources within an enterprise environment continues to be a priority and are desired." [Source: U.S. patent application Ser. No. 15/940,604 titled "Mechanisms for anomaly detection and access management," published on 4 Oct. 2018].

"Network devices provide useful and necessary services that assist individuals in business and in their everyday lives. In recent years, a growing number of cyberattacks are being conducted on all types of network devices, especially network devices deployed at an enterprise (e.g., private or publicly traded company, a governmental agency, etc.). In some cases, these cyberattacks are orchestrated in an attempt to gain access to content stored on one or more of these enterprise-based network devices. Such access is for illicit (i.e., unauthorized) purposes, such as spying or other malicious or nefarious activities. For protection, many enterprises deploy cybersecurity systems, such as on-premises malware detection systems that monitor and analyze content propagating over a local network in efforts to detect a cyberattack.

Therefore, there is a long felt need for an end-to-end solution that helps to comply with Access Management Controls for least functionality, least privilege and privileged access management.

SUMMARY OF INVENTION

The following presents a summary to provide a basic understanding of one or more embodiments described herein. This summary is not intended to identify key or critical elements or delineate any scope of the different embodiments and/or any scope of the claims. The sole purpose of the summary is to present some concepts in a simplified form as a prelude to the more detailed description presented herein.

Disclosed are a method, a non-transitory medium and/or a system for generation of job descriptions, baseline configuration, Role Potential Excessive Service Action List (RPESAL), and Role Actual Excessive Service Action List (RAESAL).

In an aspect, a method is described. The method comprises: extracting one or more contents related to an organization from one or more data sources based on one or more job role names and one or more contextual inputs; determining, using an artificial intelligence engine, at least one of an organizational structure, one or more roles, one or more responsibilities, one or more hierarchical relationships, one or more access levels, one or more service actions, and one or more departments of the organization from the one or more contents; and generating, using the artificial intelligence engine, one or more job descriptions based on at least one of the organizational structure, the one or more roles, the one or more responsibilities, the one or more hierarchical relationships, the one or more access levels, the one or more service actions, and the one or more departments.

In one embodiment, the one or more contents comprise at least one of one or more security policies, one or more privacy policies, one or more change management policies, one or more organizational policies, one or more standards, and one or more procedures.

In one embodiment, the one or more contents are in a form of at least one of one or more documents, one or more files, one or more folders, one or more images, one or more slides, and one or more excel sheets. In one embodiment, the one or more contents comprise at least one of one or more security contents and one or more organizational structural contents.

In one embodiment, the one or more data sources are related to the organization. In one embodiment, the one or more data sources are external to the organization.

In one embodiment, the artificial intelligence engine comprises one or more large language models.

In one embodiment, the method further comprises: extracting at least one of one or more security contents and one or more organizational structural contents from the contents; generating one or more custom datasets by combining at least one of the one or more security contents and the one or more organizational structural contents; and training the artificial intelligence engine using the one or more custom datasets.

In one embodiment, the method further comprises: creating, using the artificial intelligence engine, one or more queries based on at least one of the organizational structure, the one or more roles, the one or more responsibilities, the one or more hierarchical relationships, the one or more access levels, the one or more service actions, and the one or more departments.

In one embodiment, the method further comprises: receiving one or more feedback from one or more users for the one or more queries; and refining, using the artificial intelligence engine, the one or more job descriptions based on the one or more feedback.

In one embodiment, the method further comprises: receiving validation for the one or more job descriptions from the one or more users.

In one embodiment, the method further comprises: receiving the one or more job role names and the one or more contextual inputs as an input from one or more users.

In one embodiment, the one or more data sources are internal to the organization.

In one embodiment, the method further comprises: deploying one or more models onto a computing system to generate one or more second job descriptions of a second organization based on the training; creating one or more second roles based on the one or more second job descriptions; and assigning one or more second access levels, and one or more second service actions to the one or more second roles based on the one or more second job descriptions.

In one embodiment, the method further comprises: enabling the one or more second roles to perform one or more tasks; monitoring the one or more tasks performed by the one or more second roles; and determining at least one of one or more misconfigurations and one or more excessive privilege drifts for the one or more second roles.

In one embodiment, determining, using the artificial intelligence engine, at least one of the organizational structure, the one or more roles, the one or more responsibilities, the one or more hierarchical relationships, the one or more access levels, the one or more service actions, and the one or more departments comprises: extracting data comprising at least one of one or more keywords, one or more statements, one or more images, one or more access control requirements, and role-related information from the one or more contents; organizing the data into a format, wherein the format comprises the one or more roles associated with the one or more service actions and the one or more access levels; and generating one or more custom datasets from the data.

In one embodiment, the method further comprises: annotating the one or more custom datasets by highlighting the one or more roles, and the one or more service actions and the one or more access levels, respectively; and training the artificial intelligence engine using the one or more custom datasets.

In one embodiment, the method further comprises: updating the one or more custom datasets based on one or more feedback received from one or more users; and retraining the artificial intelligence engine iteratively based on one or more custom datasets updated.

In one embodiment, the method further comprises: extracting, using the artificial intelligence engine, cloud provider service action access level reference list related to the organization from the one or more data sources based on the one or more job role names and the one or more contextual inputs.

In one embodiment, the method further comprises: generating one or more role actual service action reference lists based on the one or more job descriptions, wherein the one or more role actual service action reference lists comprises the one or more roles tabulated against at least the one or more service actions and the one or more access levels; and generating a Role Potential Excessive Service Action List (RPESAL) for the one or more roles based on comparing the cloud provider service action access level reference list and the one or more role actual service action reference lists.

In one embodiment, the method further comprises: generating a Role Actual Excessive Service Action List (RAESAL) for the one or more roles based on comparing the cloud provider service action access level reference list and the one or more job descriptions.

In one embodiment, the method further comprises: monitoring at least one of one or more activities and one or more tasks executed by the one or more roles for a predefined period of time;

recording at least one of the one or more activities and the one or more tasks executed by the one or more roles; and generating a Role Actual Excessive Service Action List (RAESAL) for the one or more roles based on comparing the cloud provider service action access level reference list with at least one of the one or more activities and the one or more tasks.

In one embodiment, the one or more job descriptions comprises narration of responsibilities of a principal while interacting with one or more Information Systems.

In one embodiment, the one or more contextual inputs comprises at least one of an organization size, an industry, a field, a tier classification, and employee count.

In one embodiment, the method further comprises: generating, using the artificial intelligence engine, one or more role actual service action reference lists based on the one or more job descriptions, wherein the one or more role actual service action reference lists comprises the one or more roles tabulated against at least the one or more service actions and the one or more access levels.

In one embodiment, the method further comprises: monitoring at least one of activity or an event related to one or more changes in the one or more job descriptions; analyzing the one or more changes in the one or more job descriptions; and generating a Role Potential Excessive Service Action List (RPESAL) for the one or more roles based on the analysis of the one or more changes in the one or more job descriptions.

In one embodiment, analyzing the one or more changes in the one or more job descriptions comprises: estimating a deviation in at least one of the one or more service actions, and the one or more access levels of the one or more roles.

In one embodiment, analyzing the one or more changes in the one or more job descriptions comprises: generating, using the artificial intelligence engine, one or more second role actual service action reference lists based on the changes in the one or more job descriptions.

In one embodiment, the method further comprises: generating a Role Actual Excessive Service Action List (RAESAL) for the one or more roles based on the analysis of the one or more changes in the one or more job descriptions.

In one embodiment, the method further comprises: creating a baseline configuration, from an environment definition, wherein the one or more contents comprise the environment definition.

In another aspect, a system is described. The system comprises: a memory; and a processor communicatively coupled to the memory, the processor storing instructions in the memory that, when executed, causes the processor to: extract one or more contents related to an organization from one or more data sources based on one or more job role names and one or more contextual inputs; determine, using an artificial intelligence engine, at least one of an organizational structure, one or more roles, one or more responsibilities, one or more hierarchical relationships, one or more access levels, one or more service actions, and one or more departments of the organization from the one or more contents; and generate, using the artificial intelligence engine, one or more job descriptions based on at least one of the organizational structure, the one or more roles, the one or more responsibilities, the one or more hierarchical relationships, the one or more access levels, the one or more service actions, and the one or more departments.

In one embodiment, the one or more contents comprises at least one of one or more security policies, one or more privacy policies, one or more change management policies, one or more organizational policies, one or more standards, and one or more procedures.

In one embodiment, the one or more contents are in a form of at least one of one or more documents, one or more files, one or more folders, one or more images, one or more slides, and one or more excel sheets. In one embodiment, the one or more contents comprise at least one of one or more security contents and one or more organizational structural contents.

In one embodiment, the one or more data sources are related to the organization. In one embodiment, the one or more data sources are external to the organization.

In one embodiment, the artificial intelligence engine comprises one or more large language models.

In one embodiment, the processor is operable to: extract at least one of one or more security contents and one or more organizational structural contents from the contents; generate one or more custom datasets by combining at least one of the one or more security contents and the one or more organizational structural contents; and train the artificial intelligence engine using the one or more custom datasets.

In one embodiment, the processor is operable to: create, using the artificial intelligence engine, one or more queries based on at least one of the organizational structure, the one or more roles, the one or more responsibilities, the one or more hierarchical relationships, the one or more access levels, the one or more service actions, and the one or more departments.

In one embodiment, the processor is operable to: receive one or more feedback from one or more users for the one or more queries; and refine, using the artificial intelligence engine, the one or more job descriptions based on the one or more feedback.

In one embodiment, the processor is operable to: receive validation for the one or more job descriptions from the one or more users.

In one embodiment, the processor is operable to: receive the one or more job role names and the one or more contextual inputs as an input from one or more users. In one embodiment, the one or more users comprises at least one of one or more professionals and one or more stakeholders.

In one embodiment, the processor is operable to: deploy one or more models onto a computing system to generate one or more second job descriptions of a second organization based on the training; create one or more second roles based on the one or more second job descriptions; and assign one or more second access levels, and one or more second service actions to the one or more second roles based on the one or more second job descriptions.

In one embodiment, the processor is operable to: enable the one or more second roles to perform one or more tasks; monitor the one or more tasks performed by the one or more second roles; and determine at least one of one or more misconfigurations and one or more excessive privilege drifts for the one or more second roles.

In one embodiment, the processor, determining, using the artificial intelligence engine, at least one of the organizational structure, the one or more roles, the one or more responsibilities, the one or more hierarchical relationships, the one or more access levels, the one or more service actions, and the one or more departments, is operable to: extract data comprising at least one of one or more keywords, one or more statements, one or more images, one or more access control requirements, and role-related information from the one or more contents; organize the data into a format, wherein the format comprises the one or more roles associated with the one or more service actions and the one or more access levels; and generate one or more custom datasets from the data.

In one embodiment, the processor is operable to: annotate the one or more custom datasets by highlighting the one or more roles, and the one or more service actions and the one or more access levels, respectively; and train the artificial intelligence engine using the one or more custom datasets.

In one embodiment, the processor is operable to: update the one or more custom datasets based on one or more feedback received from one or more users; and retrain the artificial intelligence engine iteratively based on one or more custom datasets updated.

In another a non-transitory computer-readable storage medium is described. The non-transitory computer-readable storage medium storing a sequence of instructions, which when executed by a processor causes: extracting one or more contents related to an organization from one or more data sources based on one or more job role names and one or more contextual inputs; determining, using an artificial intelligence engine, at least one of an organizational structure, one or more roles, one or more responsibilities, one or more hierarchical relationships, one or more access levels, one or more service actions, and one or more departments of the organization from the one or more contents; and generating, using the artificial intelligence engine, one or more job descriptions based on at least one of the organizational structure, the one or more roles, the one or more responsibilities, the one or more hierarchical relationships, the one or more access levels, the one or more service actions, and the one or more departments.

In one embodiment, the one or more contents comprises at least one of one or more security policies, one or more privacy policies, one or more change management policies, one or more organizational policies, one or more standards, and one or more procedures. In one embodiment, the one or more contents are in a form of at least one of one or more documents, one or more files, one or more folders, one or more images, one or more slides, and one or more excel sheets. In one embodiment, the one or more contents comprise at least one of one or more security contents and one or more organizational structural contents.

In one embodiment, the one or more data sources are related to the organization. In one embodiment, the one or more data sources are external to the organization.

In one embodiment, the artificial intelligence engine comprises one or more large language models.

In one embodiment, the non-transitory computer-readable storage medium further causes: extracting at least one of one or more security contents and one or more organizational structural contents from the contents; generating one or more custom datasets by combining at least one of the one or more security contents and the one or more organizational structural contents; and training the artificial intelligence engine using the one or more custom datasets.

In one embodiment, the non-transitory computer-readable storage medium further causes: creating, using the artificial intelligence engine, one or more queries based on at least one of the organizational structure, the one or more roles, the one or more responsibilities, the one or more hierarchical relationships, the one or more access levels, the one or more service actions, and the one or more departments.

In one embodiment, the non-transitory computer-readable storage medium further causes: receiving one or more feedback from one or more users for the one or more queries; and refining, using the artificial intelligence engine, the one or more job descriptions based on the one or more feedback.

In one embodiment, the non-transitory computer-readable storage medium further causes: receiving validation for the one or more job descriptions from the one or more users.

In one embodiment, the non-transitory computer-readable storage medium further causes: receiving the one or more job role names and the one or more contextual inputs as an input from one or more users. In one embodiment, the one or more users comprises at least one of one or more professionals and one or more stakeholders.

In one embodiment, the non-transitory computer-readable storage medium further causes: deploying one or more models onto a computing system to generate one or more second job descriptions of a second organization based on the training; creating one or more second roles based on the one or more second job descriptions; and assigning one or more second access levels, and one or more second service actions to the one or more second roles based on the one or more second job descriptions.

In one embodiment, the non-transitory computer-readable storage medium further causes: enabling the one or more second roles to perform one or more tasks; monitoring the one or more tasks performed by the one or more second roles; and determining at least one of one or more misconfigurations and one or more excessive privilege drifts for the one or more second roles.

In one embodiment, the non-transitory computer-readable storage medium further causes: extracting data comprising at least one of one or more keywords, one or more statements, one or more images, one or more access control requirements, and role-related information from the one or more contents; organizing the data into a format, wherein the format comprises the one or more roles associated with the one or more service actions and the one or more access levels; and generating one or more custom datasets from the data.

In one embodiment, the non-transitory computer-readable storage medium further causes: annotating the one or more custom datasets by highlighting the one or more roles, and the one or more service actions and the one or more access levels, respectively; and training the artificial intelligence engine using the one or more custom datasets. In one embodiment, the non-transitory computer-readable storage medium further causes: updating the one or more custom datasets based on one or more feedback received from one or more users; and retraining the artificial intelligence engine iteratively based on one or more custom datasets updated.

In one embodiment, the non-transitory computer-readable storage medium further causes: extracting, using the artificial intelligence engine, cloud provider service action access level reference list related to the organization from the one or more data sources based on the one or more job role names and the one or more contextual inputs.

In one embodiment, the non-transitory computer-readable storage medium further causes: generating one or more role actual service action reference lists based on the one or more job descriptions, wherein the one or more role actual service action reference lists comprises the one or more roles tabulated against at least the one or more service actions and the one or more access levels; and generating a Role Potential Excessive Service Action List (RPESAL) for the one or more roles based on comparing the cloud provider service action access level reference list and the one or more role actual service action reference lists.

In one embodiment, the non-transitory computer-readable storage medium further causes: generating a Role Actual Excessive Service Action List (RAESAL) for the one or more roles based on comparing the cloud provider service action access level reference list and the one or more job descriptions.

In one embodiment, the non-transitory computer-readable storage medium further causes: monitoring at least one of one or more activities and one or more tasks executed by the one or more roles for a predefined period of time; recording at least one of the one or more activities and the one or more tasks executed by the one or more roles; and generating a Role Actual Excessive Service Action List (RAESAL) for the one or more roles based on comparing the cloud provider service action access level reference list with at least one of the one or more activities and the one or more tasks.

The methods and systems disclosed herein may be implemented in any means for achieving various aspects and may be executed in a form of a non-transitory machine-readable medium embodying a set of instructions that, when executed by a machine, causes the machine to perform any of the operations disclosed herein. Other features will be apparent from the accompanying drawings and from the detailed description that follows.

BRIEF DESCRIPTION OF THE DRAWINGS

These and other aspects of the present disclosure will now be described in more detail, with reference to the appended drawings showing exemplary embodiments, in which.

Figure 1:
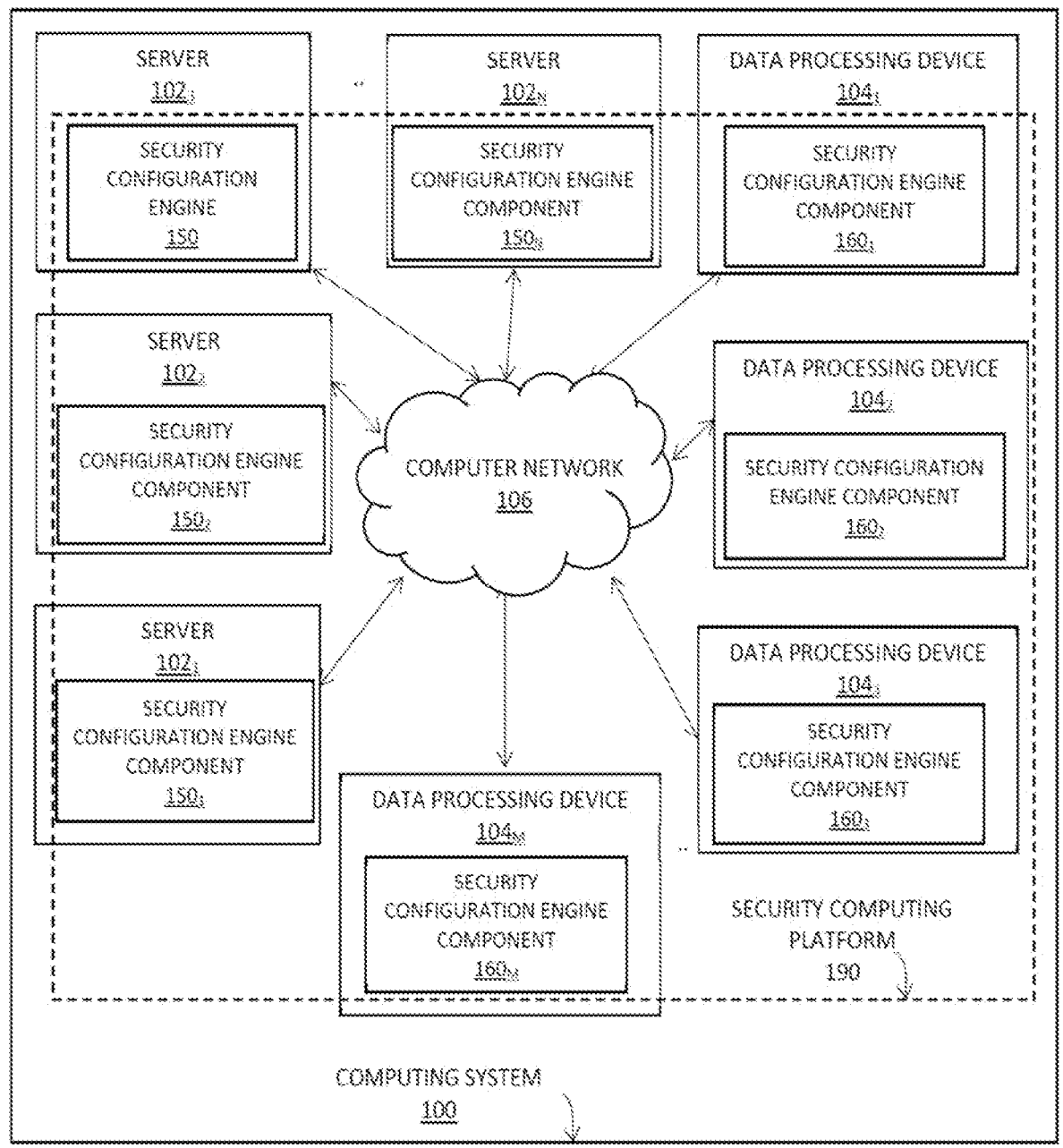
FIG. 1 is a schematic view of a computing system, according to one or more embodiments.

Other features of the present embodiments will be apparent from the accompanying drawings and from the detailed description that follows.

DETAILED DESCRIPTION

For simplicity and clarity of illustration, the figures illustrate the general manner of construction. The description and figures may omit the descriptions and details of well-known features and techniques to avoid unnecessarily obscuring the present disclosure. The figures exaggerate the dimensions of some of the elements relative to other elements to help improve understanding of embodiments of the present disclosure. The same reference numeral in different figures denotes the same element.

Although the detailed description herein contains many specifics for the purpose of illustration, a person of ordinary skill in the art will appreciate that many variations and alterations to the details are considered to be included herein.

Accordingly, the embodiments herein are without any loss of generality to, and without imposing limitations upon, any claims set forth. The terminology used herein is for the purpose of describing particular embodiments only and is not limiting. Unless defined otherwise, all technical and scientific terms used herein have the same meaning as commonly understood by one with ordinary skill in the art to which this disclosure belongs.

No element act, or instruction used herein is critical or essential unless explicitly described as such. Furthermore, the term "set" includes items (e.g., related items, unrelated items, a combination of related items and unrelated items, etc.) and may be interchangeable with "one or more". Where only one item is intended, the term "one" or similar language is used. Also, the terms "has," "have," "having," or the like are open-ended terms. Further, the phrase "based on" means "based, at least in part, on" unless explicitly stated otherwise.

Digital electronic circuitry, or in computer software, firmware, or hardware, including the structures disclosed in this specification and their structural equivalents, or in combinations of one or more of them may realize the implementations and all of the functional operations described in this specification. Implementations may be as one or more computer program products i.e., one or more modules of computer program instructions encoded on a computer-readable storage medium for execution by, or to control the operation of, data processing apparatus. The computer-readable storage medium may be a machine-readable storage device, a machine-readable storage substrate, a memory device, a composition of matter affecting a machine-readable propagated signal, or a combination of one or more of them. The term "computing system" encompasses all apparatus, devices, and machines for processing data, including by way of example, a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal (e.g., a machine-generated electrical, optical, or electromagnetic signal) that encodes information for transmission to a suitable receiver apparatus.

The actual specialized control hardware or software code used to implement these systems and/or methods is not limiting to the implementations. Thus, any software and any hardware can implement the systems and/or methods based on the description herein without reference to specific software code.

A computer program (also known as a program, software, software application, script, or code) is written in any appropriate form of programming language, including compiled or interpreted languages. Any appropriate form, including a standalone program or a module, component, subroutine, or other unit suitable for use in a computing environment may deploy it. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may execute on one computer or on multiple computers that are located at one site or distributed across multiple sites and interconnected by a communication network.

One or more programmable processors, executing one or more computer programs to perform functions by operating on input data and generating output, perform the processes and logic flows described in this specification. The processes and logic flows may also be performed by, and apparatus may also be implemented as, special purpose logic circuitry, for example, without limitation, a Field Programmable Gate Array (FPGA), an Application Specific Integrated Circuit (ASIC), Application Specific Standard Products (ASSPs), System-On-a-Chip (SOC) systems, Complex Programmable Logic Devices (CPLDs), etc.

Processors suitable for the execution of a computer program include, by way of example, both general and special purpose microprocessors, and any one or more processors of any appropriate kind of a digital computer. A processor will receive instructions and data from a read-only memory or a random-access memory or both. Elements of a computer can include a processor for performing instructions and one or more memory devices for storing instructions and data. A computer will also include, or is operatively coupled to receive data, transfer data or both, to/from one or more mass storage devices for storing data e.g., magnetic disks, magneto optical disks, optical disks, or solid-state disks. However, a computer need not have such devices. Moreover, another device, e.g., a mobile telephone, a personal digital assistant (PDA), a mobile audio player, a Global Positioning System (GPS) receiver, etc. may embed a computer. Computer-readable media suitable for storing computer program instructions and data include all forms of non-volatile memory, media and memory devices, including, by way of example, semiconductor memory devices (e.g., Erasable Programmable Read-Only Memory (EPROM), Electronically Erasable Programmable Read-Only Memory (EEPROM), and flash memory devices), magnetic disks (e.g., internal hard disks or removable disks), magneto optical disks (e.g. Compact Disc Read-Only Memory (CD ROM) disks, Digital Versatile Disk-Read-Only Memory (DVD-ROM) disks) and solid-state disks. Special purpose logic circuitry may supplement or incorporate the processor and the memory.

To provide for interaction with a user, a computer may have a display device, e.g., a Cathode Ray Tube (CRT) or Liquid Crystal Display (LCD) monitor, for displaying information to the user, and a keyboard and a pointing device, e.g., a mouse or a trackball, by which the user may provide input to the computer. Other kinds of devices provide for interaction with a user as well. For example, feedback to the user may be any appropriate form of sensory feedback, e.g., visual feedback, auditory feedback, or tactile feedback; and a computer may receive input from the user in any appropriate form, including acoustic, speech, or tactile input.

A computing system that includes a back-end component, e.g., a data server, or that includes a middleware component, e.g., an application server, or that includes a front-end component, e.g., a client computer having a graphical user interface or a Web browser through which a user may interact with an implementation, or any appropriate combination of one or more such back-end, middleware, or front-end components, may realize implementations described herein. Any appropriate form or medium of digital data communication, e.g., a communication network may interconnect the components of the system. Examples of communication networks include a Local Area Network (LAN) and a Wide Area Network (WAN), e.g., Intranet and Internet.

The computing system may include clients and servers. A client and server are remote from each other and typically interact through a communication network. The relationship of the client and server arises by virtue of computer programs running on the respective computers and having a client-server relationship to each other.

Embodiments may comprise or utilize a special purpose or general purpose computer including computer hardware. Embodiments within the scope of the present disclosure may also include physical and other computer-readable media for carrying or storing computer-executable instructions and/or data structures. Such computer-readable media can be any media accessible by a general purpose or special purpose computer system. Computer-readable media that store computer-executable instructions are physical storage media. Computer-readable media that carry computer-executable instructions are transmission media. Thus, by way of example and not limitation, embodiments can comprise at least two distinct kinds of computer-readable media: physical computer-readable storage media and transmission computer-readable media.

Although the present embodiments described herein are with reference to specific example embodiments it will be evident that various modifications and changes may be made to these embodiments without departing from the broader spirit and scope of the various embodiments. For example, hardware circuitry (e.g., Complementary Metal Oxide Semiconductor (CMOS) based logic circuitry), firmware, software (e.g., embodied in a non-transitory machine-readable medium), or any combination of hardware, firmware, and software may enable and operate the various devices, units, and modules described herein. For example, transistors, logic gates, and electrical circuits (e.g., Application Specific Integrated Circuit (ASIC) and/or Digital Signal Processor (DSP) circuit) may embody the various electrical structures and methods.

In addition, a non-transitory machine-readable medium and/or a system may embody the various operations, processes, and methods disclosed herein. Accordingly, the specification and drawings are illustrative rather than restrictive.

Physical computer-readable storage media includes RAM, ROM, EEPROM, CD-ROM or other optical disk storage (such as CDs, DVDs, etc.), magnetic disk storage or other magnetic storage devices, solid-state disks or any other medium. They store desired program code in the form of computer-executable instructions or data structures which can be accessed by a general purpose or special purpose computer.

Further, upon reaching various computer system components, program code in the form of computer-executable instructions or data structures can be transferred automatically from transmission computer-readable media to physical computer-readable storage media (or vice versa). For example, computer-executable instructions or data structures received over a network or data link can be buffered in RAM within a Network Interface Module (NIC), and then eventually transferred to computer system RAM and/or to less volatile computer-readable physical storage media at a computer system. Thus, computer system components that also (or even primarily) utilize transmission media may include computer-readable physical storage media.

Computer-executable instructions comprise, for example, instructions and data which cause a general purpose computer, special purpose computer, or special purpose processing device to perform a certain function or group of functions. The computer-executable instructions may be, for example, binary, intermediate format instructions such as assembly language, or even source code. Although the subject matter herein described is in a language specific to structural features and/or methodological acts, the described features or acts described do not limit the subject matter defined in the claims. Rather, the herein described features and acts are example forms of implementing the claims.

While this specification contains many specifics, these do not construe as limitations on the scope of the disclosure or of the claims, but as descriptions of features specific to particular implementations. A single implementation may implement certain features described in this specification in the context of separate implementations. Conversely, multiple implementations separately or in any suitable sub-combination may implement various features described herein in the context of a single implementation. Moreover, although features described herein as acting in certain combinations and even initially claimed as such, one or more features from a claimed combination may in some cases be excised from the combination, and the claimed combination may be directed to a sub-combination or variation of a sub-combination.

Similarly, while operations depicted herein in the drawings in a particular order to achieve desired results, this should not be understood as requiring that such operations be performed in the particular order shown or in sequential order or that all illustrated operations be performed, to achieve desirable results. In certain circumstances, multi-tasking and parallel processing may be advantageous. Moreover, the separation of various system components in the implementations should not be understood as requiring such separation in all implementations, and it should be understood that the described program components and systems may be integrated together in a single software product or packaged into multiple software products.

Even though particular combinations of features are recited in the claims and/or disclosed in the specification, these combinations are not intended to limit the disclosure of possible implementations. Other implementations are within the scope of the claims. For example, the actions recited in the claims may be performed in a different order and still achieve desirable results. In fact, many of these features may be combined in ways not specifically recited in the claims and/or disclosed in the specification. Although each dependent claim may directly depend on only one claim, the disclosure of possible implementations includes each dependent claim in combination with every other claim in the claim set.

Further, a computer system including one or more processors and computer-readable media such as computer memory may practice the methods. In particular, one or more processors execute computer-executable instructions, stored in the computer memory, to perform various functions such as the acts recited in the embodiments.

Those skilled in the art will appreciate that the invention may be practiced in network computing environments with many types of computer system configurations including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, etc. Distributed system environments where local and remote computer systems, which are linked (either by hardwired data links, wireless data links, or by a combination of hardwired and wireless data links) through a network, both perform tasks may also practice the invention. In a distributed system environment, program modules may be located in both local and remote memory storage devices.

The embodiments described herein can be directed to one or more of a system, a method, an apparatus, and/or a computer program product at any possible technical detail level of integration. The computer program product can include a computer-readable storage medium (or media) having computer-readable program instructions thereon for causing a processor to carry out aspects of the one or more embodiments described herein. The computer-readable storage medium can be a tangible device that can retain and store instructions for use by an instruction execution device. For example, the computer-readable storage medium can be, but is not limited to, an electronic storage device, a magnetic storage device, an optical storage device, an electromagnetic storage device, a superconducting storage device, and/or any suitable combination of the foregoing. A non-exhaustive list of more specific examples of the computer-readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer-readable storage medium, as used herein, does not construe transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer-readable program instructions described herein are downloadable to respective computing/processing devices from a computer-readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device. Computer-readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer-readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA), and/or programmable logic arrays (PLA) can execute the computer-readable program instructions by utilizing state information of the computer-readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. Each block of the flowchart illustrations and/or block diagrams, and combinations of blocks in the flowchart illustrations and/or block diagrams, can be implemented by computer-readable program instructions. These computer-readable program instructions can be provided to a processor of a general purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer-readable program instructions can also be stored in a computer-readable storage medium that can direct a computer, a programmable data processing apparatus and/or other devices to function in a particular manner, such that the computer-readable storage medium having instructions stored therein can comprise an article of manufacture including instructions which can implement aspects of the function/act specified in the flowchart and/or block diagram block or blocks. The computer-readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function(s). In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter described herein is in the general context of computer-executable instructions of a computer program product that runs on a computer and/or computers, those skilled in the art will recognize that the one or more embodiments herein also can be implemented in combination with one or more other program modules. Program modules include routines, programs, components, data structures, and/or the like that perform particular tasks and/or implement particular abstract data types. Moreover, other computer system configurations, including single-processor and/or multiprocessor computer systems, mini-computing devices, mainframe computers, as well as computers, hand-held computing devices (e.g., PDA, phone), microprocessor-based or programmable consumer and/or industrial electronics and/or the like can practice the herein described computer-implemented methods. Distributed computing environments, in which remote processing devices linked through a communications network perform tasks, can also practice the illustrated aspects. However, stand-alone computers can practice one or more, if not all aspects of the one or more embodiments described herein. In a distributed computing environment, program modules can be located in both local and remote memory storage devices.

As used in this application, the terms "component," "system," "platform," "interface," and/or the like, can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer-readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

As it is employed in the subject specification, the term "processor" can refer to any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular based transistors, switches and/or gates, in order to optimize space usage and/or to enhance performance of related equipment. A combination of computing processing units can implement a processor.

Herein, terms such as "store," "storage," "data store," data storage," "database," and any other information storage component relevant to operation and functionality of a component refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read-only memory (ROM), programmable ROM (PROM), electrically programmable ROM (EPROM), electrically erasable ROM (EEPROM), flash memory, and/or nonvolatile random access memory (RAM) (e.g., ferroelectric RAM (FeRAM). Volatile memory can include RAM, which can function as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synch link DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein include, without being limited to including, these and/or any other suitable types of memory.

The embodiments described herein include mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the one or more embodiments are for purposes of illustration but are not exhaustive or limiting to the embodiments described herein. Many modifications and variations will be apparent to those of ordinary skill in the art without departing from the scope and spirit of the described embodiments. The terminology used herein best explains the principles of the embodiments, the practical application and/or technical improvement over technologies found in the marketplace, and/or to enable others of ordinary skill in the art to understand the embodiments described herein.

In order to fully understand the scope of the invention, the following terms used herein are hereby defined. The following terms and phrases, unless otherwise indicated, shall have the following meanings.

As used herein, the articles "a" and "an" used herein refer to one or to more than one (i.e., to at least one) of the grammatical object of the article. By way of example, "an element" means one element or more than one element. Moreover, usage of articles "a" and "an" in the subject specification and annexed drawings construe to mean "one or more" unless specified otherwise or clear from context to mean a singular form.

As used herein, the terms "example" and/or "exemplary" mean serving as an example, instance, or illustration. For the avoidance of doubt, such examples do not limit the herein described subject matter. In addition, any aspect or design described herein as an "example" and/or "exemplary" is not necessarily preferred or advantageous over other aspects or designs, nor does it preclude equivalent exemplary structures and techniques known to those of ordinary skill in the art.

As used herein, the terms "first," "second," "third," and the like in the description and in the claims, if any, distinguish between similar elements and do not necessarily describe a particular sequence or chronological order. The terms are interchangeable under appropriate circumstances such that the embodiments herein are, for example, capable of operation in sequences other than those illustrated or otherwise described herein. Furthermore, the terms "include," "have," and any variations thereof, cover a non-exclusive inclusion such that a process, method, system, article, device, or apparatus that comprises a list of elements is not necessarily limiting to those elements, but may include other elements not expressly listed or inherent to such process, method, system, article, device, or apparatus.

As used herein, the terms "left," "right," "front," "back," "top," "bottom," "over," "under" and the like in the description and in the claims, if any, are for descriptive purposes and not necessarily for describing permanent relative positions. The terms so used are interchangeable under appropriate circumstances such that the embodiments of the apparatus, methods, and/or articles of manufacture described herein are, for example, capable of operation in other orientations than those illustrated or otherwise described herein.

As used herein, the terms "system," "device," "unit," and/or "module" refer to a different component, component portion, or component of the various levels of the order. However, other expressions that achieve the same purpose may replace the terms.

As used herein, the terms "couple," "coupled," "couples," "coupling," and the like refer to connecting two or more elements mechanically, electrically, and/or otherwise. Two or more electrical elements may be electrically coupled together, but not mechanically or otherwise coupled together. Coupling may be for any length of time, e.g., permanent, or semi-permanent or only for an instant. "Electrical coupling" includes electrical coupling of all types. The absence of the word "removably," "removable," and the like, near the word "coupled" and the like does not mean that the coupling, etc. in question is or is not removable.

As used herein, the term "or" means an inclusive "or" rather than an exclusive "or." That is, unless specified otherwise, or clear from context, "X employs A or B" means any of the natural inclusive permutations. That is, if X employs A; X employs B; or X employs both A and B, then "X employs A or B" is satisfied under any of the foregoing instances.

As used herein, two or more elements or modules are "integral" or "integrated" if they operate functionally together. Two or more elements are "non-integral" if each element can operate functionally independently.

As used herein, the term "component" broadly construes hardware, firmware, and/or a combination of hardware, firmware, and software.

As used herein, a "Sensor" is a device that measures physical input from its environment and converts it into data that is interpretable by either a human or a machine. Most sensors are electronic, which presents electronic data, but some are simpler, such as a glass thermometer, which presents visual data.

As used herein, the term "Information System" refers to any target environment (e.g., an organization, an entity, etc.) for which the roles and policies are provisioned.

As used herein, the term "System" refers to a compliance verification system employed to achieve Access Management Controls for least functionality, least privilege and privileged access management in any target environment (e.g., Information System).

As used herein, the term "network" refers to one or more data links that enable the transport of electronic data between computer systems and/or modules and/or other electronic devices. When a network or another communications connection (either hardwired, wireless, or a combination of hardwired or wireless) transfers or provides information to a computer, the computer properly views the connection as a transmission medium. A general purpose or special purpose computer access transmission media that can include a network and/or data links which carry desired program code in the form of computer-executable instructions or data structures. The scope of computer-readable media includes combinations of the above, that enable the transport of electronic data between computer systems and/or modules and/or other electronic devices.

The term "comprising", which is synonymous with "including", "containing", or "characterized by" here is defined as being inclusive or open-ended, and does not exclude additional, unrecited elements or method steps, unless the context clearly requires otherwise.

The term, "a plurality of" is defined as multiple.

The term, "computer network" is defined as a plurality of computers that are interconnected so they can exchange information.

The term, "device" is defined as an electronic element that cannot be divided without destroying its stated function.

The term, "user" includes a person or a computer.

The term, "data processing" is defined as the manipulation of data which performs some operation or sequence of operations on the data.

The term, "server" is defined as a computer that manages network resources.

The term, "communicatively coupled" is defined as devices connected in a way that permits communication.

The term, "database" is defined as a comprehensive collection of related data organized for convenient access.

The term, "configuration" is defined as the arrangement within the system of each of its functional units, according to their nature, number, and chief characteristics.

The term, "misconfiguration" is defined as an incorrect or inappropriate configuration.

The term, "repository" is defined as a database in which an aggregation of data is kept and maintained in an organized way.

The term, "execute" is defined as the process by which a computer or a virtual machine executes the instructions of a computer program.

The term, "environment" is defined as the state of a computer, determined by a combination of software, hardware, data, and which programs are running.

The term, "application" is defined as a program or piece of software designed to fulfill a particular purpose.

The term, "metadata" is defined as a set of data that describes and gives information about other data.

The term "temporal drift" is defined as change in an attribute, value, or operational resource of a system over time.

The term "job description" refers to the description of responsibilities of a user while interacting with an Information System under assessment. The job description captures the set of activities relevant to his/her interaction with the System under assessment. The job description may be a natural language description of activities or duties performed by a human user or by an automated program (A.K.A Service).

The term "Machine-Readable Role Definition" refers to a machine-readable formatted file that contains the list of resources and the access levels that a role requires. The machine-readable formatted file comprises a JavaScript Object Notation (JSON) or extensible Markup Language (XML) or YAML Ain't Markup Language (YAML) or any other equivalent machine-readable formatted file.

The term "service responsibility description" refers to the description of responsibilities of an Information Process/Application/Program while interacting with the System under assessment. The service responsibility description captures the set of activities relevant to service's interaction with the system under assessment.

The term "role definition" refers to a set of permissions that allow users to read, edit, list, or delete, or a combination of the permissions, while interacting with Information Systems under assessment.

The term "Identity and Access Management (IAM)" refers to managing the identity and access permissions. Identity and access management may be performed by a category of software tools.

The term "IAM identity" represents a user that can be authenticated and then authorized to perform actions.

The term "IAM policy" refers to a set of permissions defined within the Identity and Access Management (IAM).

The term "IAM role" refers to an IAM identity with permissions that determine what the IAM identity can and cannot do within the IAM. By assuming the IAM Role, an identity can perform the set of actions that are permitted by the IAM Role. An IAM Role is associated with a set of IAM policies.

The term "access level" refers to the privileges a user has within an Information System or network. In computer security, access levels are assigned to each user account. Access levels are permission sets that allow members to perform different tasks within an organization. The access level includes actions such as list, read, write and permissions management within the IAM.

The term "IAM service action" refers to a specific service offering provided as part of a service. For the Email service, for example, you can have various Service Actions, such as "Creation of new email account", "Password reset" and "Close email account". A Service Action is therefore always linked to a service. Each Information System service has its own set of actions (i.e., service action) that describe tasks that a user can perform with that Information System service. Example: Amazon Web Services (AWS) Service Actions publish defined actions, resources, and condition contexts.

The term "Role Actual Service Action List" refers to a list of IAM Access Levels that are Allowed by an IAM Role.

The term "Role Potential Excessive Service Action List (RPESAL)" refers to a list of all possible service actions that can be considered as excess from a role definition perspective.

The term "Role Actual Excessive Service Action List (RAESAL)" refers to a list of IAM Access Levels that are Allowed by an IAM but considered as not required based on "Role" definitions. RAESAL is a subset of Actual Role Permissions List. The list of service actions that are enabled for the IAM role constitute the Role Actual Excessive Service Action List (RAESAL).

The term "principal" is any entity that can be authenticated by the operating system, such as a user account, a computer account, or a thread or process that runs in the security context of a user or computer account, or the security groups for these accounts. The term "principal" may also represent a user, an application, a software, or a program.

The term "version control" also known as source control, refers to tracking and managing changes to at least one of a file, a set of files, a software code, digital assets, program, descriptions, contents, definitions, baselines, source files, designs, etc. over time so that the system can recall specific versions later.

The term "golden baseline" refers to a baseline that is validated against organization policies, security best practices and security control implementation statements.

The term "least functionality" refers to a principle that recommends only essential functionality is enabled and specifically prohibits and/or restricts the not essential functionality.

The term "least privilege" refers to a principle that recommends only essential privileges are enabled and specifically prohibits and/or restricts the not essential privileges.

The term "privileged access management (PAM)" is a subset of identity and access management (IAM) focused on privileged users-those with the authority to make changes to a network, device, or application. The privileged access management enables those users to make changes to a network, device, or application.

The term "related to" refers to in connection with or associated with either synonymic, logically, semantically, or contextually. The term "related to" further refers to that may or may not be identical or equivalent to.

As used herein, the term "agents" refers to software agents or a computer program or automated units that performs various actions continuously and autonomously on behalf of an individual or an organization. For example, an agent may archive various computer files or retrieve electronic messages on a regular schedule. Such simple tasks barely begin to tap the potential uses of software agents, however. This is because an intelligent software agent can observe the behavior patterns of its users and learn to anticipate their needs or at least their repetitive actions. Mobile software agents are particularly useful in gathering information—from Internet articles and academic research papers to electronic newspapers, magazines, and books—to match a user's interests. Simple software agents have also been used to facilitate trading on an electronic auction site, as well as on various electronic exchanges.

As used herein, the term "real-time" refers to operations conducted as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As used herein, the term "approximately" can mean within a specified or unspecified range of the specified or unspecified stated value. In some embodiments, "approximately" can mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As used herein, the terms "example" and/or "exemplary" mean serving as an example, instance, or illustration. For the avoidance of doubt, such examples do not limit the herein described subject matter. In addition, any aspect or design described herein as an "example" and/or "exemplary" is not necessarily preferred or advantageous over other aspects or designs, nor does it preclude equivalent exemplary structures and techniques known to those of ordinary skill in the art.

As used herein, the terms "first," "second," "third," and the like in the description and in the claims, if any, distinguish between similar elements and do not necessarily describe a particular sequence or chronological order. The terms are interchangeable under appropriate circumstances such that the embodiments herein are, for example, capable of operation in sequences other than those illustrated or otherwise described herein. Furthermore, the terms "include," "have," and any variations thereof, cover a non-exclusive inclusion such that a process, method, system, article, device, or apparatus that comprises a list of elements is not necessarily limiting to those elements, but may include other elements not expressly listed or inherent to such process, method, system, article, device, or apparatus.

Example embodiments, as described below, may be used to provide efficient configuration compliance verification of resources in a target environment of a computing system. It will be appreciated that the various embodiments discussed herein need not necessarily belong to the same group of exemplary embodiments, and may be grouped into various other embodiments not explicitly disclosed herein. In the following description, for purposes of explanation, numerous specific details are set forth in order to provide a thorough understanding of the various embodiments. Those skilled in the art will appreciate that the invention may be practiced for any configuration resource.

FIG. 1 shows a computing system 100, according to one or more embodiments. In one or more embodiments, computing system 100 may include a number of servers 1021-N communicatively coupled to one another and a number of data processing devices 1041-M through a computer network 106. In one or more embodiments, computer network 106 may be a Local Area Network (LAN), a Wide Area Network (WAN) and/or a short-range network (e.g., based on Bluetooth®, Wi-Fi et al.). Other forms of computer network 106 are within the scope of the exemplary embodiments discussed herein. Concepts associated with the exemplary embodiments may be applicable across a wide range of data processing devices 1041-M including but not limited to desktops, laptops, notebooks, and smart devices such as smart televisions, smart media players, Internet of Things (IoT) devices and pacemaker devices.

It should be noted that computing system 100 may preferentially be an Enterprise Information System (EIS) that integrates a number of systems associated with enterprise-related operations. Other contexts involving concepts associated with the exemplary embodiments discussed herein are within the scope of the exemplary embodiments. Thus, one or more of servers 1021-N may be a database server, a server dedicated to executing an application server, a data center device, a server dedicated to executing a web server and/or a Content Delivery Network (CDN). The database server (e.g., a server providing database services in computing system 100), the application server (e.g., a set of software components enabling operations between applications (e.g., business applications) and users); said applications may be at a backend of computing system 100) and the web server (e.g., a set of software components enabling content or services to the users through, say, the Internet) are well known to one skilled in the art. Detailed discussion associated therewith has been skipped for the case of convenience and brevity.

At least some of servers 1021-N may execute one or more operations thereof physically thereon. Additionally, or alternatively, one or more servers 1021-N may have a number of virtual machines (VMs) emulated thereon; here, the one or more servers 1021-N may serve as the "host" and the number of VMs may be the "guests" utilizing resources of said "host." In the case of computing system 100 being cloud based, one or more servers 1021-N may represent data centers, enterprise private clouds and/or cloud providers (e.g., providing cloud based services and/or solutions) and one or more data processing devices 1041-M may represent edge computing devices/implementations such as IoT devices, gateways, autonomous vehicular controls, personal health devices, remote medical equipment, implanted medical devices and drones. Some of the aforementioned edge computing devices/implementations may, alternatively or additionally, be represented by one or more servers 1021-N. It should be noted that the CDN discussed above may be regarded as representing edge computing devices.

Exemplary embodiments discussed herein improve computing system 100 from the perspective of security, functional and non-functional aspects thereof specifically by automatically identifying and remediating misconfigurations of custom applications and related components in computing system 100. The aforementioned may ensure that the functional configuration requirements of computing system 100 are met and may also increase non-functional aspects including reliability, availability, and performance of components (e.g., servers 1021-N, data processing devices 1041-M, applications and related components and functionalities thereof) of computing system 100. In one or more embodiments, the improved security may mitigate adversarial threats such as those arising from Distributed Denial of Service (DDoS) attacks and data (and, thereby, Intellectual Property (IP)) exfiltration. Further, exemplary embodiments discussed herein may improve efficiency associated with security audits through efficient validation of security configurations and remediation of misconfigurations associated with computing system 100.

As discussed and implied above computing system 100 may not merely be limited to traditional data centers but may also include multi-cloud environments and edge computing devices. Exemplary embodiments discussed herein may be related to a security configuration engine 150 (to be discussed below) that performs the above mentioned automatic security configuration compliance verification and remediation of security misconfigurations. While the figures discussed herein are specifically directed to security, it should be noted that concepts discussed herein may additionally encompass functional and non-functional aspects of computing system 100 and remediating misconfigurations associated therewith. Specifically, in one or more embodiments, security configuration engine 150 may scan, analyze, visualize, and report security misconfigurations of a multitude of custom applications, data, vendor products and services such as Infrastructure as a Service (IaaS), Platform as a Service (PaaS) and Software as a Service (SaaS) associated with computing system 100. In one or more embodiments, the aforementioned processing associated with security misconfigurations may span even multiple hybrid and edge computing devices. In one or more embodiments, all processing associated with identifying, protecting, and detecting security threats, recovering therefrom and remediation may be performed through security configuration engine 150 (to be discussed below).

FIG. 1 shows security configuration engine 150 implemented within computing system 100 on a server 1023, according to one or more embodiments. In one or more embodiments, security configuration engine 150 may be configured to execute on a security computing platform 190 that represents an environment (e.g., hardware, operating system(s), browsers, Application Programming Interface(s) (API(s))) in which components/engines of security configuration engine 150 are configured to execute. In one or more embodiments, server(s) 1021-N and data processing devices 1041-M may include processors and memories (e.g., volatile and/or non-volatile memories) configured to execute instructions associated with security configuration engine 150 and components (to be discussed below) thereof.

FIG. 1 shows each of the servers other than (e.g., servers 1021-2 and servers 1024-N) server 1023 executing a security configuration engine component (e.g., security configuration engine component 1501-2 and security configuration engine component 1504-N) configured to perform operations specified by security configuration engine 150. Similarly, FIG. 1 shows each of data processing devices 1041-M executing the security configuration engine component 1601-M (analogous to security configuration engine component 1501-2, 1504-N) thereon. It should be noted that security computing platform 190 may be a distributed computing platform; accordingly, the physical and virtual components associated with servers 1021-N and data processing devices 1041-M may be considered as being associated with security computing platform 190 by way of security configuration engine 150 and the security configuration engine components (e.g., security configuration engine components 1501-2, security configuration engine components 1504-N, security configuration engine components 1601-M).

Figure 2:
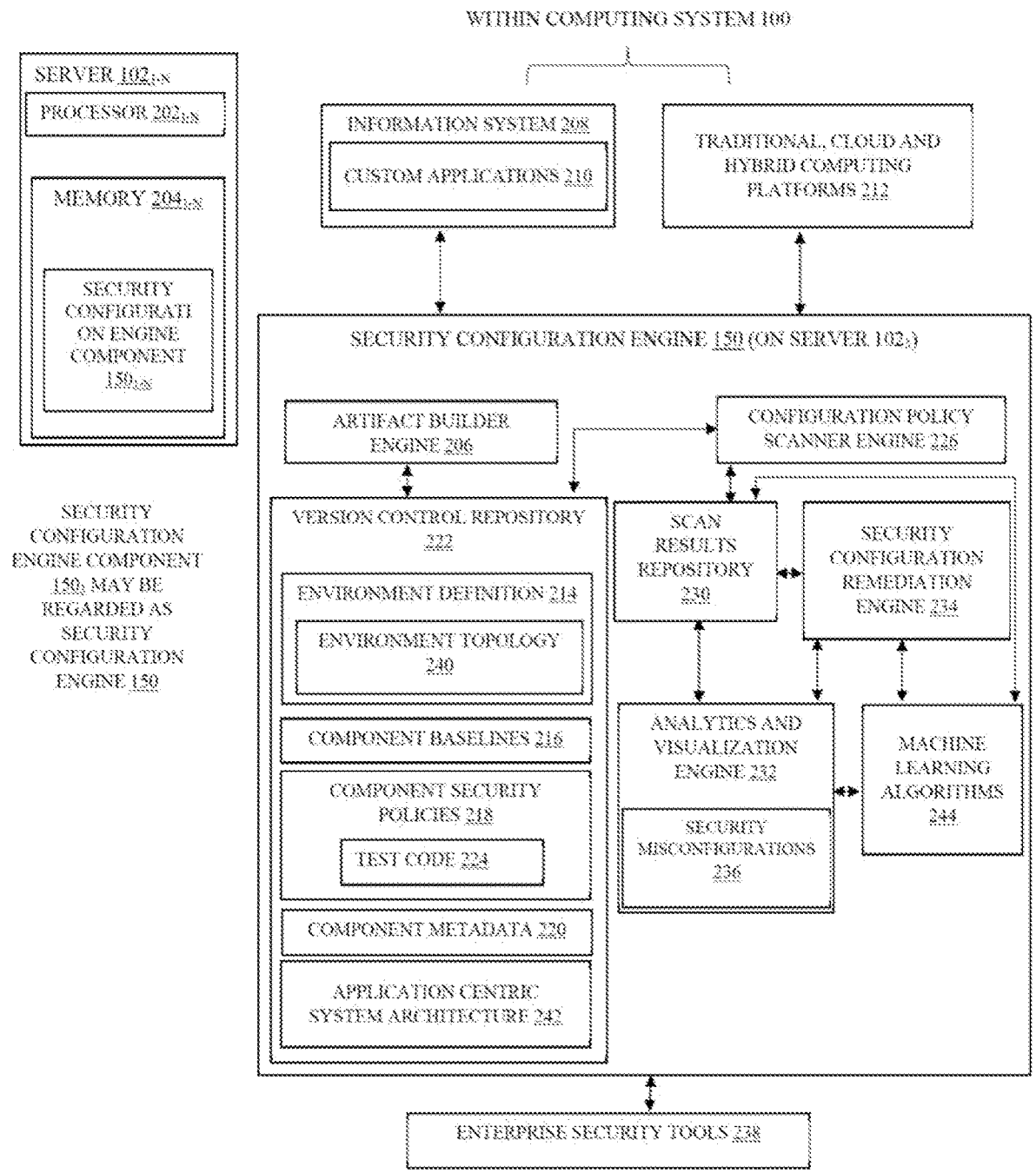
FIG. 2 is a conceptual architectural view of a security configuration engine of the computing system of FIG. 1, according to one or more embodiments.

FIG. 2 shows each server 1021-N as including a processor 2021-N communicatively coupled to a memory 2041-N, according to one or more embodiments. It should be noted that server 1021-N and security configuration engine 150 may be distributed across computing system 100; in other words, server 1021-N may represent more than one server 1021-N of computing system 100; security configuration engine 150 may execute on more than one server 1021-N. FIG. 1 shows server 1023 as solely executing security configuration engine 150 merely for the sake of illustration. Specifically, server 1023 is shown as including instructions associated with security configuration engine 150 stored in memory; security configuration engine 150 is configured to execute on the processor.

FIG. 2 shows a conceptual architecture of security configuration engine 150, according to one or more embodiments. In accordance therewith, in one or more embodiments, security configuration engine 150 may provide security configuration engine components 1501-2, security configuration engine components 1504-N and security configuration engine components 1601-M the capabilities to perform operations that enable scanning and analyzing security configurations of all elements/components of computing system 100 and reporting security misconfigurations therethrough. It should be noted that the computing environment associated with security computing platform 190 may encompass the entire computing environment associated with computing system 100 to which security policies are applicable. In one or more embodiments, an artifact builder engine 206 may discover resources in the entire computing environment (or target a specific environment, as will be discussed below) associated with computing system 100. As shown in FIG. 2, artifact builder engine 206 may discover resources in an Information System 208 with custom applications 210 within computing system 100 and in traditional, cloud and hybrid computing platforms 212 within computing system 100; the types of resources are discussed in detail above (and below).

It should be noted that the entire computing environment of computing system 100 may not be limited to Information System 208 and traditional, cloud and hybrid computing platforms 212 within computing system 100 and that the aforementioned alone have been shown in FIG. 2 merely for the sake of illustration; alternatively, Information System 208 and traditional, cloud and hybrid computing platforms 212 may constitute a target environment (to be discussed below). In one or more embodiments, custom applications 210 may include software applications designed for an organization, a set of organizations and/or a set of users within the organization; custom applications 210 may also be applications designed or customized for clients/customers of one or more organizations. In one or more embodiments, in accordance with the discovery of resources through artifact builder engine 206 discussed above, artifact builder engine 206 may create an environment definition 214 of the entire computing environment (or, a target environment) of computing system 100; environment definition 214 is shown as part of version control repository 222 in FIG. 2.

In addition, in one or more embodiments, artifact builder engine 206 may build baselines, security policies and metadata for components of the resources discovered, shown as component baselines 216, component security policies 218 and component metadata 220 respectively in FIG. 2. In one or more embodiments, environment definition 214 may include but is not limited to configuration information (e.g., security configuration information) of servers 1021-N, data processing devices 1041-M, custom applications 210, traditional, cloud and hybrid computing platforms 212 and components (e.g., database schema, user entitlements). It should be noted that Information System 208 may encompass servers 1021-N and data processing devices 1041-M and custom applications 210. Information System 208 may execute on one or more servers 1021-N and one or more data processing devices 1041-M. FIG. 2 shows custom applications 210 executing on a data processing device 1041-M for the sake of illustration.

In one or more embodiments, environment definition 214 may be dynamically created by artifact builder engine 206 following the discovery of resources/components in the entire computing environment associated with computing system 100. Alternatively or additionally, in one or more embodiments, artifact builder engine 206 may enable security configuration engine components (1501-2, 1504-N, 1601-M) executing on servers (1021-2, 1024-N) and data processing devices 1041-M to create individual environment definition(s) based on components of computing system 100 associated therewith; the aforementioned individual environment definition(s) may be compiled and collected as environment definition 214 through artifact builder engine 206. In some other embodiments, the aforementioned security configuration engine components may individually be associated with components of computing system 100 and may enable elements of environment definition 214 to be built therethrough. All reasonable variations are within the scope of the exemplary embodiments discussed herein.

In one or more embodiments, environment definition 214 may be written into a file or a set of instructions; the aforementioned file or set of instructions may be checked into a version control repository 222 (e.g., Git). In one or more embodiments, component baselines 216 discussed above may be predetermined attributes of the components of the resources discovered; the aforementioned predetermined attributes may serve as bases/references for change definitions. Additionally, in one or more embodiments, component security policies 218, which may either be defined through artifact builder engine 206 or collected therethrough, may be applied to environment definition 214 and component baselines 216 to provide security-based tracking mechanism in computing system 100; machine-readable component security policies 218 may enable selection of only a subset of components and component baselines 216 relevant to a specific scan for a given environment of computing system 100. In one or more embodiments, component metadata 220 may include metadata associated with components of the resources identified; the aforementioned metadata may be tracing information for one or more components of the resources identified, update log (e.g., database schema updates) of the one or more components of the resources identified, specific version (e.g., operating system version) of the one or more components of the resources identified and so on. In one or more embodiments, component metadata 220 may be tracked to track deviations from component baselines 216. In one or more embodiments, component metadata 220 may be built based on component security policies 218 applied thereto. In some embodiments, artifact builder engine 206 may build component metadata 220 based on collection thereof in bits and pieces by security configuration engine components (1501-2, 1504-N, 1601-M) discussed above.

In one or more embodiments, version control repository 222 may be used to store component baselines 216, test code 224 (e.g., code to access security configurations of the target components and validate against baselines) and component metadata 220. Although version control repository 222 is shown as being part of security configuration engine 150, it should be noted that, in some embodiments, version control repository 222 may be distributed across computing system 100. In one or more embodiments, security configuration engine 150 may include a configuration policy scanner engine 226 configured to scan the resources identified by artifact builder engine 206, access security configurations thereof and validate the aforementioned security configurations against component baselines 216.

In one or more embodiments, the results of the scanning may be stored in a scan results repository 230, which, although shown in FIG. 2 as part of security configuration engine 150, may be distributed across computing system 100. In one or more embodiments, visualization of the results of the scanning (e.g., stored in scan results repository 230) may be analyzed and visualized through an analytics and visualization engine 232 that is part of security configuration engine 150. In one or more embodiments, based on determination through analytics and visualization engine 232 of a security misconfiguration (e.g., a database schema modification, sensitive data leak from a custom application 210, a non-secure view of data in a database, an operating system vulnerability), a security configuration remediation engine 234 may remediate the determined security misconfiguration. FIG. 2 shows security misconfigurations 236 determined by analytics and visualization engine 232 therein.

Figure 3:
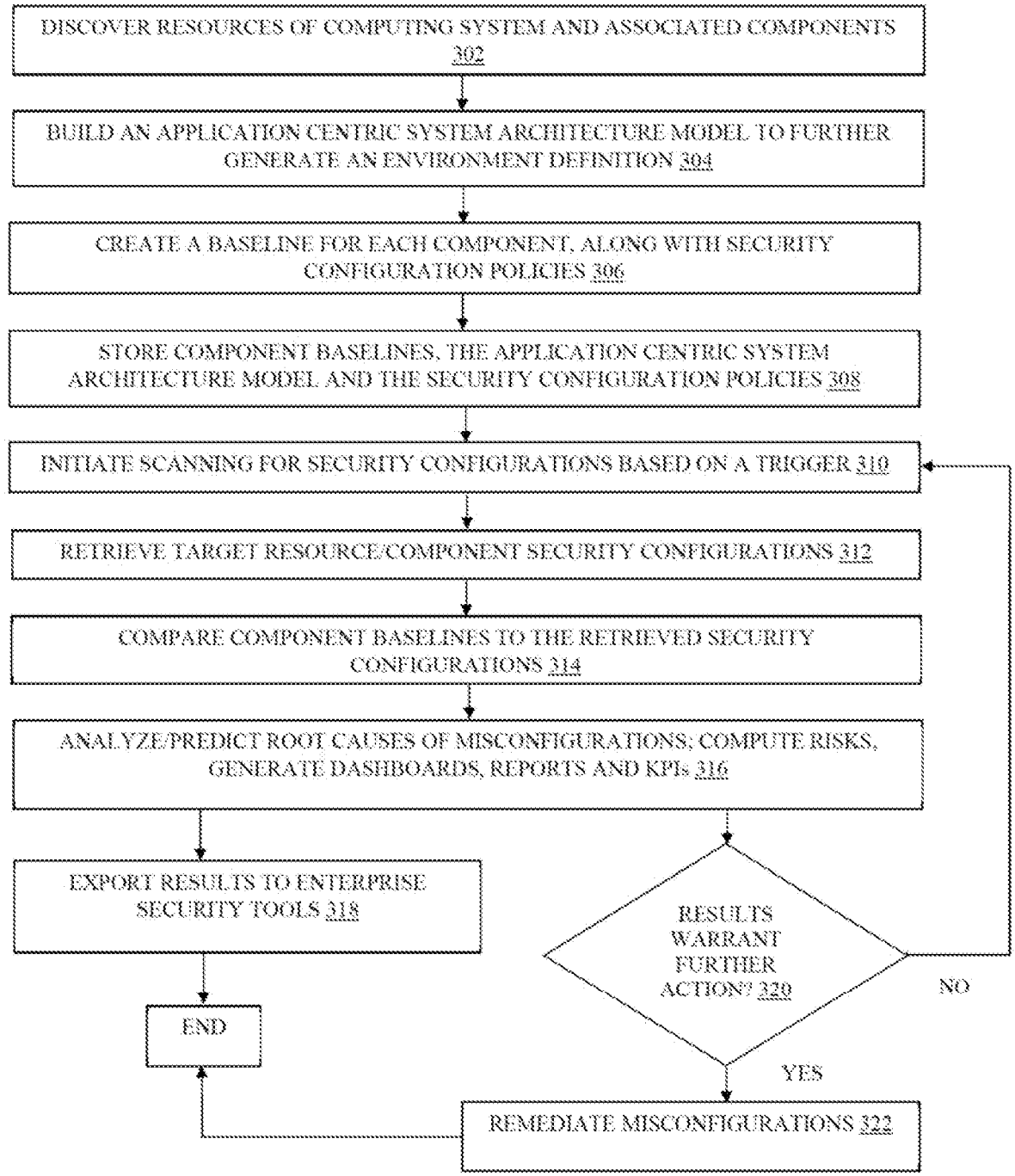
FIG. 3 is a conceptual flow diagram associated with operations pertinent to the security configuration engine of FIG. 1 and FIG. 2, according to one or more embodiments.

In one or more embodiments, the results of the scanning may be visualized through analytics and visualization engine 232 based on security configuration engine 150, security configuration engine components (1501-2, 1504-N, 1601-M) executing on servers 1021-N, and data processing devices 1041-M (e.g., laptops, mobile devices) associated with enterprise security tools 238 (e.g., sets of instructions). It should be noted that the determination of security misconfigurations 236 and remediation thereof may be a periodic process, a continuous process, or a process triggerable through a user (e.g., an administrator) of computing system 100. FIG. 3 shows a conceptual flow diagram associated with the operations discussed above with respect to security configuration engine 150, according to one or more embodiments. In one or more embodiments, operation 302 may involve identifying/discovering, through artifact builder engine 206, resources of computing system 100 such as physical resources (e.g., servers 1021-N, data processing devices 1041-M, edge computing devices discussed above), virtual resources (e.g., VMs), custom applications 210, and supporting resources/components including but not limited to databases and messaging systems.

In one or more embodiments, operation 304 may involve building, through artifact builder engine 206, an application centric system architecture model that specifies connections (e.g., data connections) between applications (e.g., custom applications 210) and supporting components including infrastructure and platform components (e.g., components of traditional, cloud and hybrid computing platforms 212) discussed above. In one or more embodiments, the application centric system architecture model may be a specification detailing an environment topology (e.g., environment topology 240 shown as part of environment definition 214; machine-readable environment definition 214 may encompass a universe of components of computing system 100 belonging to all layers of security including but not limited to connection details, custom applications 210 and data repositories) that includes the connections between the aforementioned applications and the supporting components; the environment topology may detail the configuration requirements of the components and the identified resources in a target deployment environment (e.g., development environment, integration environment, test environment, production environment) associated with computing system 100.

In one or more embodiments, artifact builder engine 206 may determine the boundary and components of environment topology 240 using threat modeling concepts including the security architecture of computing system 100 as applied to the (application centric) system architecture model discussed above; said security architecture may incorporate data flows, processes, data storage, requests, responses, trust boundaries and controls for securing components. In one or more embodiments, artifact builder engine 206 may discover components/resources of computing system 100 by querying metadata (e.g., tags for cloud resources including but not limited to computing machines, storage services, routers, and firewalls) associated therewith. In one or more embodiments, the aforementioned discovery process may include retrieval of the connection information (e.g., Internet Protocol (IP) addresses, ports, and protocols) from environment topology 240 and environment definition 214, essential for collecting security configuration parameters of interest. In one or more embodiments, by combining the essential connection information with the relationships defined in the application centric system architectural model such as data flows, requests, responses, trust boundaries and security controls, machine-readable environment definition 214 may be created.

In one or more embodiments, operation 306 may involve creating, through artifact builder engine 206, a baseline for each of the components discussed above, along with security configuration policies (e.g., component security policies 218) that include the code (e.g., test code 224; FIG. 2 shows test code 224 as part of component security policies 218) to access security configurations of the target components and validate against the baselines; the created baselines may be component baselines 216; machine-readable component baselines 216 may be specific configuration parameters and allowable values thereof for each of the security controls of the components based on requirements of the target environment (e.g., Information Systems) of computing system 100. In one or more embodiments, operation 308 may involve storing the aforementioned component baselines 216, the application centric system architecture model (e.g., shown as application centric system architecture model 242 within version control repository 222) and component security policies 218 (or security configuration policies) in version control repository 222 (e.g., Git). In one or more embodiments, operation 310 may involve initiating configuration policy scanner engine 226 based on a trigger (e.g., through a time-based trigger, an on-demand execution trigger, an event based trigger). For example, the trigger may be a change in any data (e.g., a violation of a component security policy 218) stored in version control repository 222.

In one or more embodiments, operation 312 may involve, in accordance with the initiation, configuration policy scanner engine 226 retrieving target resource security configurations based on executing the code (e.g., test code 224) in version control repository 222 therefor; the results of the retrieval may be stored in scan results repository 230. In one or more embodiments, operation 314 may involve configuration policy scanner engine 226 comparing component baselines 216 to the retrieved target resource configurations (e.g., stored in scan results repository 230); the aforementioned operation may involve validation of the retrieved target resource configurations. In one or more embodiments, operation 316 may involve analytics and visualization engine 232 analyzing and identifying/predicting root causes based on the determination (e.g., if a target resource configuration deviates from a corresponding component baseline 216) of the validation of the target resource configurations, and may provide risk computations, dashboards, reports, and Key Performance Indicators (KPIs) in conjunction with enterprise security tools 238.

In one or more embodiments, operation 318 may involve exporting the results of analytics and visualization engine 232 to enterprise security tools 238 (e.g., enterprise Security Information and Event Management (SIEM) tools, enterprise reporting hubs). In one or more embodiments, operation 320 may involve determining whether the results of analytics and visualization engine 232 warrant further action. In one or more embodiments, if yes, operation 322 may involve security configuration remediation engine 234 remediating the deviated target resource configurations in accordance with component security policies 218 as the further action. In one or more embodiments, if no control may pass onto operation 310 to repeat subsequent operations until there are no misconfigurations from a security perspective.

In some embodiments, the identification and/or prediction of root causes discussed above may be implemented in a machine learning environment. For example, remediation of a specific security misconfiguration (e.g., security misconfiguration 236) may involve a solution that may have been applied a number of times. In one or more embodiments, execution of one or more machine learning algorithms (e.g., machine learning algorithms 244 shown part of security configuration engine 150 in FIG. 2) may automatically determine the solution based on training thereof. In some implementations, a team of experts may train machine learning algorithms 244 in addition to previous solutions being stored in security configuration engine 150. All reasonable variations are within the scope of the exemplary embodiments discussed herein.

Figure 4:
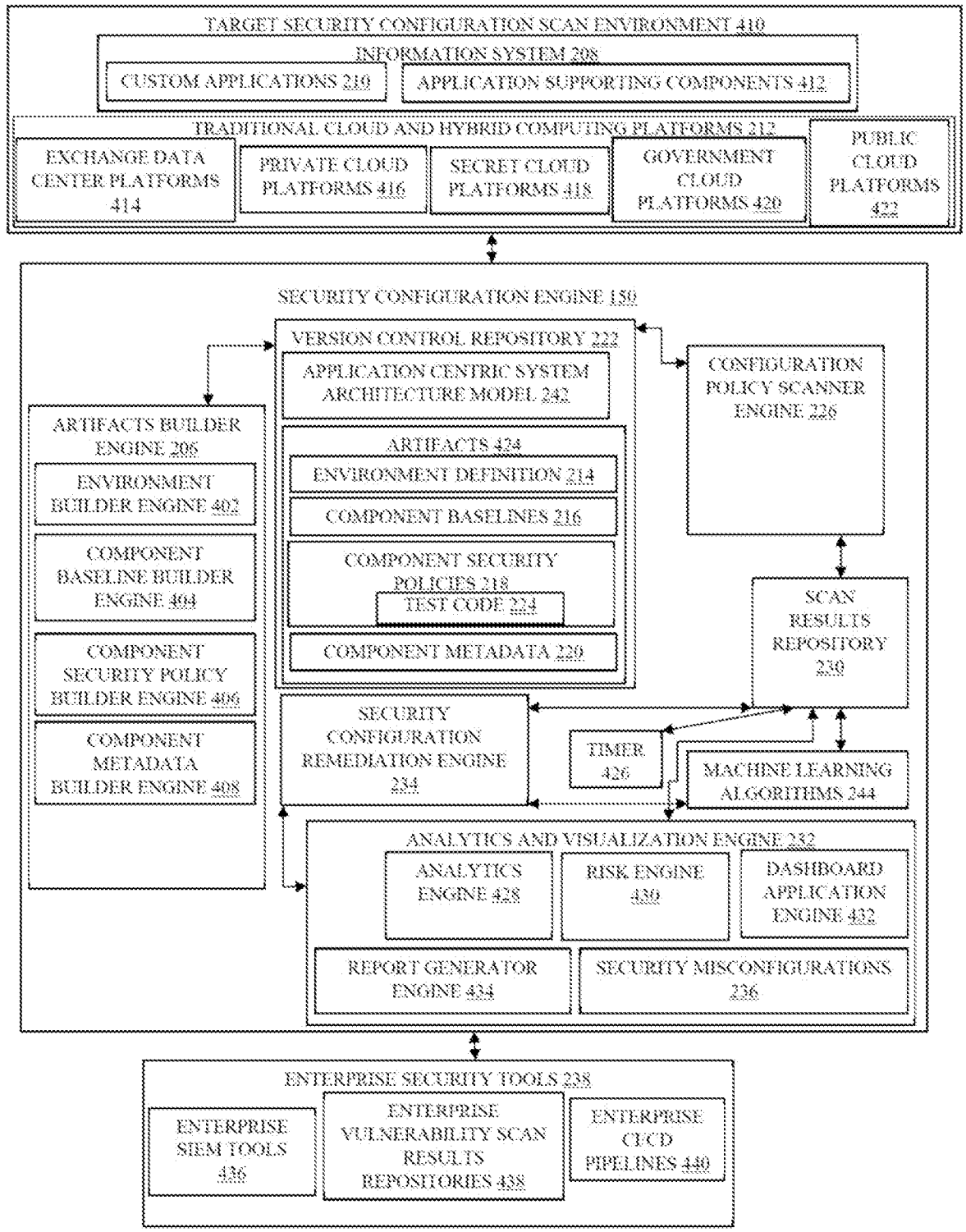
FIG. 4 is a more detailed conceptual architectural view of the security configuration engine of FIG. 1 and FIG. 2, according to one or more embodiments.

FIG. 4 shows the conceptual architecture of security configuration engine 150 in more detail, according to one or more embodiments. Here, in one or more embodiments, artifact builder engine 206 may include an environment builder engine 402, a component baseline builder engine 404, a component security policy builder engine 406 and a component metadata builder engine 408. In one or more embodiments, environment builder engine 402 may discover resources of computing system 100 in a target security configuration scan environment 410 (e.g., the target environment may be defined through test code 224, in one embodiment). In one or more embodiments, Target Security Configuration Scan Environment 410 May Include Information System 208 including custom applications 210 and supporting components (e.g., application supporting components 412) thereof discussed above, and traditional, cloud and hybrid computing platforms 212. In one or more embodiments, traditional, cloud and hybrid computing platforms 212 may include but are not limited to on-premise data center platforms 414, private cloud platforms 416, secret cloud platforms 418, government cloud platforms 420 and public cloud platforms 422.

In one or more embodiments, the discovery of the resources (and associated components) by environment builder engine 402 may be through automatic and/or manual processes. In one or more embodiments, in accordance with the discovery, environment builder engine 402 may create environment definition 214 and store said created environment definition 214 in version control repository 222. In one or more embodiments, component baseline builder engine 404 may build baseline security configurations (e.g., component baselines 216) for the resources (and associated components) of target security configuration scan environment 410 in accordance with environment definition 214. In one or more embodiments, while component baselines 216 may primarily focus on security configurations, component baselines 216 may also include functional and performance configurations of computing system 100 as availability and reliability of critical and secure enterprise applications (e.g., custom applications 210) of computing system 100 may also be important.

In one or more embodiments, component security policy builder engine 406 may include instructions for accessing security configurations (e.g., of target security configuration scan environment 410) and validating against component baselines 216; component security policy builder engine 406 may also build component security policies 218 in accordance with environment definition 214. In one or more embodiments, component metadata builder engine 408 may build metadata about components of target security configuration scan environment 410 (or, computing system 100); said metadata may include types of data, business context of individual components and, as discussed above, trace information for one or more components of the resources identified, update log (e.g., database schema updates) of the one or more components of the resources identified, specific version (e.g., operating system version). Other types of metadata are within the scope of the exemplary embodiments discussed herein.

The above mentioned artifacts (e.g., artifacts 424) generated by artifact builder engine 206 may be stored in version control repository 222; version control repository 222 is shown in FIG. 4 as including artifacts 424 (e.g., environment definition 214, component baselines 216, component security policies 218, component metadata 220 discussed above); machine-readable component metadata 220 may add to the environment definition (e.g., part of environment definition 214) of each of the components of the environment of computing system 100 not only the business context but also technical and operational contexts. In one or more embodiments, configuration policy scanner engine 226 may access version control repository 222 to execute test code 224 to scan target security configuration scan environment 410, access/retrieve the target security configurations in accordance with specification thereof in environment definition 214 and store the aforementioned accessed/retrieved target security configurations in scan results repository 230. In one or more embodiments, the aforementioned scanning by configuration policy scanner engine 226 may be triggered through, say, a timer 426 (e.g., hardware circuitry controllable through software) or through other means discussed above; the triggering may result based on tracking component metadata 220.

In one or more embodiments, the results of the scanning may be analyzed through analytics and visualization engine 232. FIG. 4 shows analytics and visualization engine 232 as including an analytics engine 428, a risk engine 430, a dashboard application engine 432 and a report generator engine 434. In one or more embodiments, analytics and visualization engine 232 may also be interfaced with machine learning algorithms 244 discussed above. In one or more embodiments, analytics engine 428 may analyze the results of the scanning to identify anomalies and root causes of the security misconfigurations (e.g., security misconfigurations 236) discussed above. In one or more embodiments, machine learning algorithms 244 may incorporate a set of models to retrieve the results of the scanning to predict the root causes of the anomalies/security misconfigurations in cases where detection thereof is not possible through deterministic analytical tools. In one or more embodiments, risk engine 430 may, from the retrieved results of the scanning, compute risks based on the impact of the security misconfigurations utilizing component metadata 220 (e.g., that considers the business context).

In one or more embodiments, dashboard application engine 432 may display KPIs and other tabular and/or graphical visualizations of validation tests associated with the security configurations. In one or more embodiments, report generator engine 434 may, from the above mentioned retrieved results of the scanning, generate reports in multiple formats (e.g., Portable Document Format (PDF), Comma-Separated Values (CSV), JavaScript Object Notation (JSON)) for human and/or machine consumption. In one or more embodiments, the retrieved results of scanning (or analytics and visualization engine 232) may be exported to enterprise security tools 238 discussed above; FIG. 4 shows enterprise security tools 238 as including enterprise SIEM tools 436, enterprise vulnerability scan results repositories 438 and enterprise Continuous Integration/Continuous Delivery (CI/CD) pipelines 440. In one or more embodiments, enterprise vulnerability scan results repositories 438 may include the results of scanning for security vulnerabilities via analytics and visualization engine 232. In one or more embodiments, enterprise CI/CD pipelines 440 may enable automating software delivery processes, including combining code changes in a central repository and deploying to desired environments; the aforementioned scans may be integrated with enterprise CI/CD pipelines 440.

FIG. 4 also shows security configuration remediation engine 234 configured to remediate deviated security configurations in accordance with component security policies 218 discussed above. In one or more embodiments, the results of analytics and visualization engine 232 and the generated artifacts discussed above may be accessed through end user devices such as laptops and mobile devices (example data processing devices 104$_1$-M). It should also be noted that enterprise security tools 238 may also be executed on one or more servers 102$_1$-N and one or more data processing devices 104$_1$-M.

Figure 5:
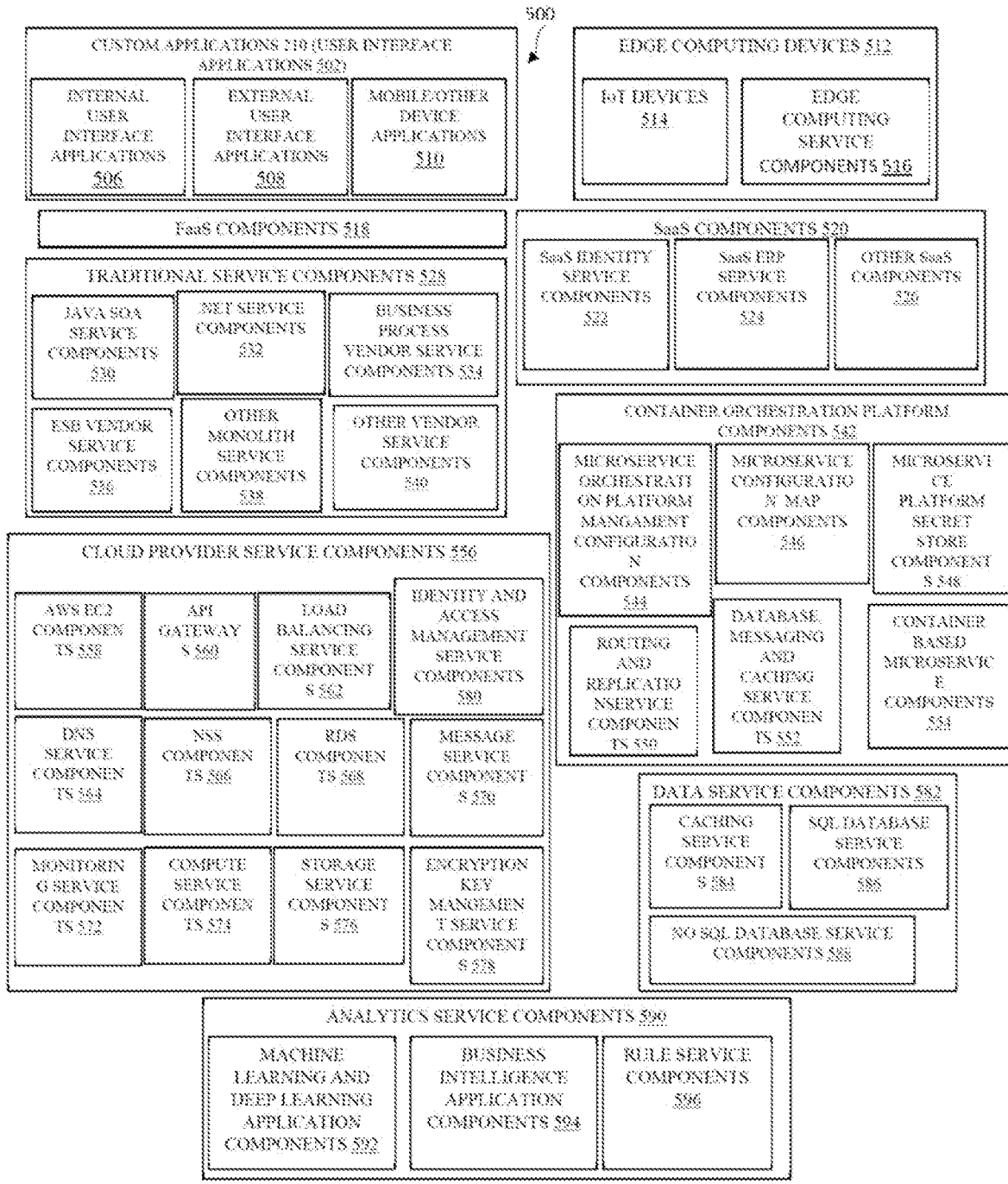
FIG. 5 is a schematic view of components of an example computing system for which security misconfigurations are configured to be detected.

FIG. 5 shows components 500 of an example computing system 100 for which security misconfigurations are configured to be detected in accordance with the operations/processes discussed above. Components 500 for which security configurations are configured to be scanned include user interface applications 502 that incorporate Graphical User Interfaces (GUIs) to interact with human users (e.g., on data processing devices 104$_1$-M). In one or more embodiments, user interface applications 502 may be regarded as part of custom applications 210. As shown in FIG. 5, user interface applications 502 may include internal user interface applications 506 (e.g., relevant to users within an organization on, say, one or more data processing devices 104$_1$-M), external user interface applications 508 (e.g., relevant to customers of the organization on, say, one or more data processing devices 1041-M) and mobile/other device applications 510 (e.g., again, on one or more data processing devices 1041-M).

In one or more embodiments, components 500 may also include edge computing devices 512, such as IoT devices 514 (e.g., IoT sensors, IoT gateways) and edge computing service components 516 (e.g., associated with edge computing services associated with computing system 100), function as a service (FaaS) components 518 such as Amazon® Web Services (AWS) Lambda-based applications, and SaaS components 520. FaaS may represent cloud computing services that enable management of application functionalities without the requirements of building and maintaining infrastructure associated therewith. As shown in FIG. 5, SaaS components 520 may include SaaS identity service components 522 (e.g., Okta®, Amazon® Cognito), SaaS Enterprise Resource Planning (ERP) service components 524 (e.g., Salesforce® ERP) and other SaaS components 526.

Further, components 500 may include traditional service components 528 including Java Service Oriented Architecture (SOA) service components 530, .NET service components 532 (e.g., .NET application service components), business process vendor service components 534 (e.g., business process flow application service components), Enterprise Service Bus (ESB) vendor service components 536, other monolith service components 538 (e.g., J2EE application service components) and other vendor service components 540. Still further, components 500 may include container orchestration platform components 542 that include microservice orchestration platform management configuration components 544, microservice configuration map components 546, microservice platform secret store components 548, routing and replication service components 550, database, messaging and caching service components 552 and container based microservice components 554 pertinent to container based microservices (e.g., OpenShift® based, AWS Elastic Kubernetes Service (EKS) based, AWS Elastic Container Service (ECS) based) hosted on container orchestration platform components.

Components 500 may further include cloud provider service components 556 that cover IaaS components and PaaS components. Examples may include but are not limited to AWS Elastic Compute Cloud (EC2) components 558, API gateways 560, load balancing service components 562, Domain Name System (DNS) service components 564, Network Security Service (NSS) components 566 such as AWS Virtual Private Clouds (VPCs) and AWS subnets, Relational Database Service (RDS) components 568 such as AWS RDS, messaging service components 570 such as AWS Simple Queue Service (SQS) and AWS Simple Notification Service (SNS), monitoring service components 572 such as AWS CloudTrail and AWS CloudWatch, compute service components 574, storage service components 576 such as AWS Simple Storage Service (S3) and AWS Elastic File System (EFS), encryption key management service components 578 such as AWS Key Management Service (KMS), and Identity and Access Management Service Components 580 such as AWS Identity and Access Management (IAM) and Amazon® Cognito.

Components 500 may still further include data service components 582 that include caching service components 584 such as Amazon® ElastiCache (e.g., for Redis) and Amazon® Elasticsearch service (ES), Structured Query Language (SQL) database service components 586 and NoSQL database service components 588 such as Amazon® DynamoDB and MongoDB, and analytics service components 590 such as Machine Learning and Deep Learning application components 592, business intelligence application components 594 and rule service components 596 (e.g., Apache Spark based applications/application components). Other types are within the scope of the exemplary embodiments discussed herein.

Figure 6:
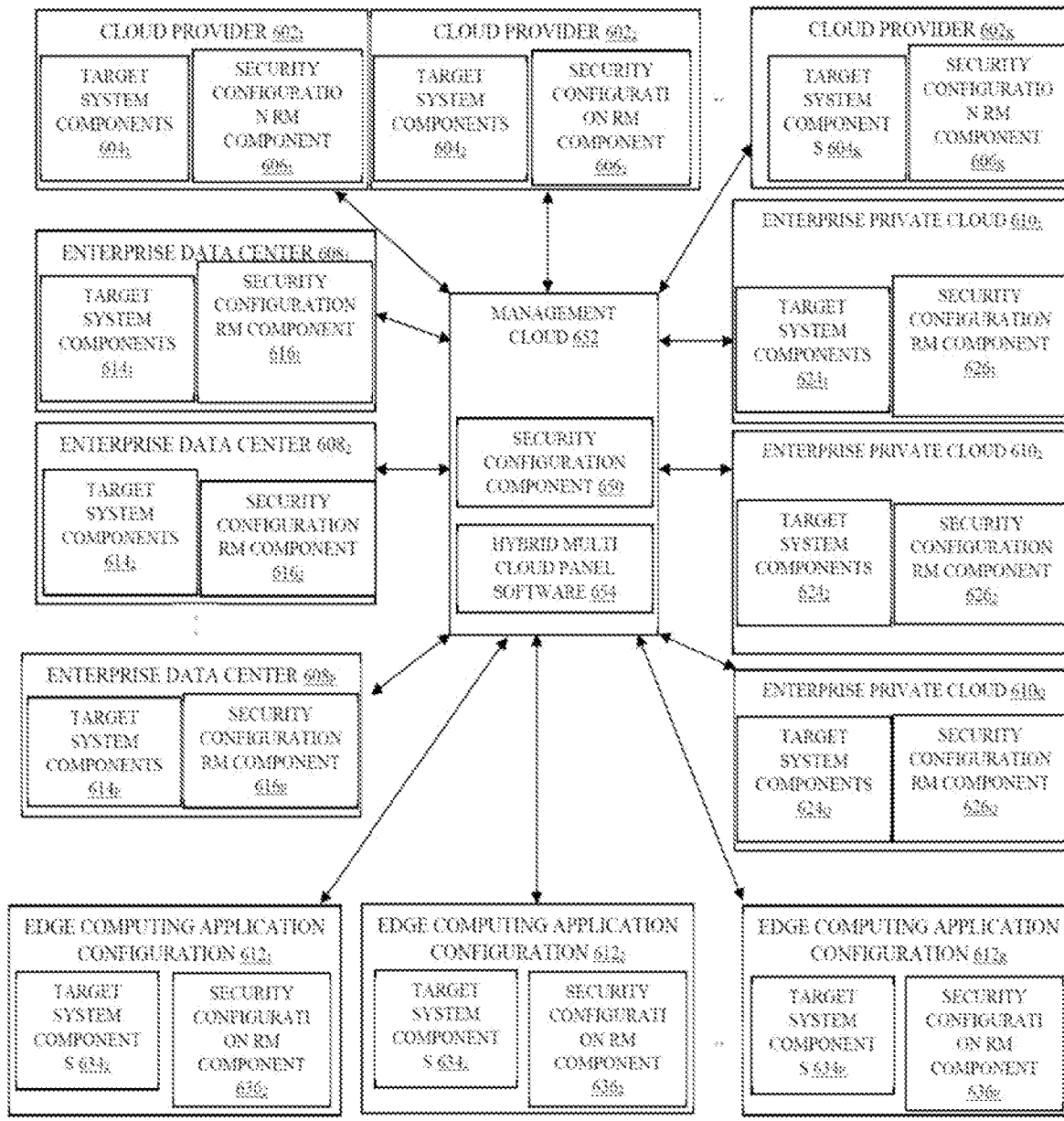
FIG. 6 is a schematic view of an example distributed deployment configuration of a security configuration engine in accordance with a target security configuration scan environment being distributed across multiple clouds, data centers and computing services.

FIG. 6 shows an example distributed deployment configuration of security configuration engine 150 in accordance with target security configuration scan environment 410 being distributed across multiple clouds. With hosting of enterprise applications becoming more distributed with time, computing system 100 may be envisioned to be geographically distributed across multiple cloud providers, on-premise data centers and edge computing devices. In one or more embodiments, the architecture of security configuration engine 150 may be conducive to scanning applications (e.g., custom applications 210) distributed across multiple cloud providers, on-premise data centers and edge computing devices.

In accordance therewith, applications and associated components (e.g., components 500) to be scanned may be hosted on a number of cloud providers 6021-K. FIG. 6 shows each cloud provider 6021-K having corresponding target system components 6041-K. In addition, in a zone of each cloud provider 6021-K, a security configuration regional manager (RM) component 6061-K (analogous to security configuration engine components 1501-2, 1504-N, 1601-M) may execute to take the responsibility of performing scans discussed above, storing results thereof and sharing relevant information within the scope of a boundary thereof. A security configuration RM component (e.g., security configuration RM component 6161-P) may also be scoped to cover target system components 6141-P hosted in each of a number of enterprise data centers 6081-P.

FIG. 6 shows security configuration component 650 (analogous to security configuration engine 150) executing on a management cloud 652 (in accordance with distribution thereof across computing system 100, management cloud 652 may be considered to be distributed across servers 1021-N and/or data processing devices 1041-M). FIG. 6 also shows enterprise private clouds 6101-Q and edge computing application configurations 6121-R as including corresponding target system components 6241-Q and target system components 6341-R, respectively. Again, security configuration RM components 6261-Q and security configuration RM components 6361-R may be part of enterprise private clouds 6101-Q and edge computing application configurations 6121-R, respectively.

Security configuration component 650 may coordinate with security configuration RM components (6061-K, 6161-P, 6261-Q, and 6361-R) to delegate work thereto. Management cloud 652 may include a hybrid multi cloud panel software 654 that provides a single panel of control for provisioning and administering resources hosted on multiple clouds. Hybrid multi cloud panel software 654 may be interfaced with security configuration component 650. Edge computing application configurations 6121-R may include IoT devices (e.g., in industrial plants, home appliances) and gateways, autonomous vehicular control applications (e.g., self-driving cars, trucks, airplanes, ships, drones), CDNs capable of hosting computing applications for personalization of content using, say, Lambda functions in AWS CDNs, remote medicine instruments that require several applications to be deployed along with medical equipment, and implanted medical devices with associated software applications.

Traditionally, details related to a computing system may be documented and data stored in silos based on the intended audience for the data or the details. Software developers may have a logical view of applications, data, requests, and responses thereof. However, trust boundaries and security controls may not have been implemented for the applications. While diagrams about network component details such as VPC, subnets, routers, router tables and Network Address Translation (NAT) instances may be available, details of the applications, types of data stored and security controls for application layers may not be fully understood. DevOps teams associated with the computing system may possess deployment, installation and connection information between applications including High Availability and Resiliency requirements.

In another case of operations in silos, within an information security team within the traditional computing system, security operation centers may possess monitoring related information but not information pertinent to actual applications, networks, etc. Information security threat modeling personnel may typically possess logical diagrams of applications, requests, responses, and trust boundaries but may not possess information about networks, infrastructure components, connection details, etc. Exemplary embodiments discussed herein solve the problems associated with operating in silos through security configuration engine 150 and security configuration engine components (1501-2, 1504-N and 1601-M).

Specifically, environment definition 214 discussed above may combine information relevant to test security configurations pertinent to all components from all layers of the multi-layered software architecture model of computing system 100 including network infrastructure, applications, and platform services. Typically, components of a computing system at one central location may have connection details thereof available immediately. However, in the case of there being several components of the computing system outside the central location, inefficiencies may ensue because of some components, controls and/or data flow related configurations possibly being unnoticed and not monitored, leading to security misconfigurations and vulnerabilities. The aforementioned problem may be solved through computing system 100 discussed above. In one or more embodiments, environment topology 240 (shown as part of environment definition 214) may be a machine-readable file that includes components of interest along with connection information for data flow therebetween.

In one or more embodiments, component baselines 216 discussed above may include configuration items that define attribute names and expected values. In one or more embodiments, the aforementioned expected values may be derived based on application specific requirements, organizational policies, and standards and/or industry benchmarks (e.g., Center for Internet Security (CIS) based). However, in one or more embodiments, component baselines 216 may not be built solely based on industry benchmarks and general organizational standards; component baselines 216 may incorporate data flows, user access patterns and configurations required to satisfy compliance standards (e.g., National Institute of Standards and Technology (NIST) 800-53). In one or more embodiments, component baselines 216 may incorporate specific requirements of custom applications 210 and security configuration requirements thereof, as well as other supporting components of environment definition 214. In addition, as seen above, component baselines 216 may incorporate functional and performance configurations pertinent to "availability" and "reliability" of computing system 100.

The above mentioned custom application configurations may include name value pairs of a parameter and value thereof specific to an application and an environment in which the application is deployed. However, in a typical setup, allowable values for the configuration parameters may be known only to Subject Matter Experts (SMEs) within a computing system; alternatively, said allowable values may be stored in baseline documents (e.g., in Microsoft® Word format, Microsoft® Excel format) within a repository. This may lead to inefficiencies due to lack of ready availability for machine consumption. In case of there being a security incident, identification of the root cause of a security misconfiguration associated therewith and remediation of said security misconfiguration may take a long time. Exemplary embodiments discussed herein solve the aforementioned problems by enabling maintenance of a central repository (e.g., version control repository 222) for allowable configuration parameters and values pertinent to computing system 100.

In modern computing systems, there may be hundreds of custom applications, with thousands of custom configurations of importance from a security perspective. With a proliferation of the number of configurations, it may be extremely difficult to understand the above mentioned allowable values easily. In one or more embodiments, the above mentioned maintenance of a centralized repository that can scale to hundreds of thousands of allowable configuration values specific to computing system 100 in a specific environment may increase efficiency of security compliance and accuracy of security compliance solutions. In one or more embodiments, the aforementioned may be enabled through collection of the allowable configuration values specific to computing system 100 in the specific environment in one central location in machine-readable format.

In one or more embodiments, artifact builder engine 206 (or, specifically, component security policy builder engine 406) may generate policies (e.g., component security policies 218) that specify the configurations to be verified; the aforementioned specification may serve as an input to test code 224 that is configured to compare actual values of the configurations to baseline values (e.g., component baselines 216). In one or more embodiments, depending on the environment and phase of the validation testing (e.g., security validation testing), validation of solely a subset of the configurations may be made possible. Thus, in one or more embodiments, the policies (e.g., component security policies 218) may enable selection of the subset of the configurations that is contextually relevant to a current set of validation scenarios. In one or more embodiments, having the ability to customize the validations based on testing needs may further improve timeliness of the validation and keep the focus on validation tests that are of importance.

In one or more embodiments, artifact builder engine 206 (or, specifically, component metadata builder engine 408) may create metadata (e.g., component metadata 220) of the components specified in the environment of computing system 100. In one or more embodiments, component metadata 220 may be intended to understand the context of a security misconfiguration and impact thereof. In one implementation, component metadata 220 may include an identifier of the component, component name, user type (e.g., internal, external), data classification (e.g., Confidential, Sensitive, Personally Identifiable Information (PII) and data domain (e.g., Financial, Customer)). In one or more embodiments, associating the components (e.g., components 500) and configurations with component metadata 220 in context of business usage thereof may be powerful. In typical implementations, whenever a misconfiguration is identified during manual audits, the business context of components and how the configurations protect the components may have to be interpreted by security personnel. However, in one or more embodiments, the association of component metadata 220 discussed herein may make the impact of a misconfiguration and importance thereof to business immediately available.

To summarize, in one or more embodiments, artifact builder engine 206 (or, specifically, component metadata builder engine 408) may enable association of business context(s) to the components and the configurations to further enable improvement of interpretation of the impact(s) of the misconfigurations and to bring forth with the importance of fixing issues. In one or more embodiments, as discussed above, security configuration engine 150 may include version control repository 222 therein (or associated therewith) to enable storing and retrieval of environment definition 214, component baselines 216, component security policies 218 and component metadata 220. In one or more embodiments, the versioning of the above artifacts (e.g., artifacts 424) may provide a capability to understand temporal drifts therein. In other words, in one or more embodiments, versioning allowable values specified in component baselines 216, environment definition 214 and component metadata 220 may enable identification of root causes of problems faster.

For example, the versioned artifacts discussed above may be checked to see if any changes were made to data therein in case scan results indicate current failure of a validation test that was passed only recently. Solutions based on root cause analysis, thereby, may be expedited. In one or more embodiments, as discussed above, configuration policy scanner engine 226 may execute instructions to access and retrieve configuration parameters defined in component baselines 216. In one or more embodiments, component baselines 216 may have configuration parameters for components identified as relevant through threat modeling that results in validations not merely based on generic best practices but also based on fine-grained specificity to the system under validation. Typical vulnerability scanning solutions do not focus on specific configuration requirements for a system based on business requirements thereof and threat modeling, and custom applications having unique sets of configuration parameters and values. Thus, in one or more embodiments, the ability of configuration policy scanner engine 226 to retrieve configuration parameters along with values thereof and to compare with specific component baselines 216 may provide for a highly accurate and future-proof security configuration validation solution, consonant with modern and emerging application requirements.

In one or more embodiments, the ability to scale to thousands of configuration parameters within a short time (e.g., few minutes) may make it possible to track security configurations and the resulting security postures in computing system 100 efficiently and continuously. In one or more embodiments, scan results repository 230 may store (e.g., in a database) results of the scans discussed above. In one or more embodiments, scan results repository 230 may include details of each scan that facilitates a mechanism for retrieving results, creating dashboards, and developing machine learning models discussed above. In one or more embodiments, storing results of the scans discussed above with the associated environment definition (e.g., environment definition 214), component baselines 216 and component metadata 220 may enable visualization of results, in addition to comparison thereof with results from different time periods. In one or more embodiments, the aforementioned comparison may be useful in tracking the drift in configurations across two different times. In one or more embodiments, as the results may include configuration validations about custom applications 210, searching and retrieving of the results through scan results repository 230 may further improve analyzes of the results and enable expeditious root cause analysis of security misconfigurations.

In one or more embodiments, security configuration engine 150, as discussed above, may include scan security configurations of components hosted on edge computing devices (e.g., IoT devices/sensors, IoT gateways). While security control of IoT devices is slowly becoming important, a comprehensive automatic security compliance validation solution including IoT sensors and associated components (e.g., IoT gateways) thereof in typical implementations is lacking, which may be remedied through security configuration engine 150 discussed above. Additionally, exemplary embodiments provide for scan security configurations of personal health applications on personal computing devices such as mobile phones, remote medicine applications, implanted devices such as pacemakers, applications hosted on airplanes and drones and/or backend applications thereof and/or Information Systems with emerging technology components. Exemplary embodiments discussed herein may enable continuous monitoring of application security configurations of components discussed herein and identification of security misconfigurations in near real-time.

Exemplary embodiments discussed herein may further include scan security configurations of systems distributed on multiple clouds (e.g., Microsoft® Azure, Google® Cloud Platform, AWS, IBM® Cloud and Oracle® Cloud). The aforementioned cloud infrastructures may encompass public, private, secret and government clouds. The boundaries of the aforementioned systems may now encompass clouds including a number of data centers spread over the world. As organizations are spreading systems across infrastructures, platforms and applications of multiple cloud providers, the ensuing multi-cloud environment may have more moving parts that increase a surface area of exposure to vulnerabilities. Exemplary embodiments discussed herein may enable keeping track of all security configurations related to a multi-cloud computing system 100, allowable values thereof, configured values thereof and any security misconfigurations therein in near real-time. Again, in one or more embodiments, the threat modeling discussed above may enable identification of potential threat vectors, trust boundaries and data flows to enable optimal identification of the components (e.g., components 500) and the configurations of interest to be validated.

Again, exemplary embodiments discussed herein may not only extend to multi-cloud environments but also may cover traditional data centers as well as hybrid environments. In existing implementations, vulnerability scanning does not take into account application specific requirements and does not provide a holistic view of requirements and configurations of Information Systems within a computing system; instead, typical implementations of vulnerability scanning focus on generic industry benchmarks and best practices. Exemplary embodiments discussed herein may further encompass scanning across components built using legacy technology and modern architectures including container-based technologies and/or server-less computing functions. The architecture and design of computing system 100 discussed herein may not be limited to custom applications 210 that are deployed using traditional architecture (e.g., bare metal computing machines) but may also include VMs, PaaS, FaaS and SaaS. The possible thousands of custom services may lead to proliferation of security configurations. Again, the threat-modeling based identification of components, data flows and trust boundaries may help identify all security configurations of interest and importance and scan the aforementioned security configurations continuously to keep computing system 100 always security-compliant.

Exemplary embodiments discussed herein may further take into account vulnerabilities associated with security configurations of applications that are correlated with vulnerabilities of components described in an environment including databases, data at rest, data at motion, vendor products such as application servers, caching services, messaging services and cloud resources such as object stores and streaming services. Also, exemplary embodiments discussed herein may further correlate security configuration of custom applications 210 with other vulnerabilities detected at a network layer, an infrastructure layer, or a platform layer of the multi-layered software architecture model of computing system 100 to understand the composite effect of vulnerabilities that occur at various layers. Security configuration engine 150 discussed above may ingest vulnerability scan results from other vendors that complement findings thereof. The correlation of vulnerabilities may enable finding patterns where two single independent vulnerabilities can increase likelihood of exploitation thereof by an adversary. In one or more embodiments, the aforementioned feature may further increase accuracy of prediction of the likelihood of exploitation of vulnerabilities and may be very helpful in prioritizing solving problems (the remediation process discussed above) associated with security misconfiguration failures.

Exemplary embodiments discussed herein may enable a side-by-side comparison of configurations across two different environments; highlights and root cause analysis of failures there across may also be enabled. This is in addition to enabling the side-by-side comparison of configurations between two different scans of the same environment. During software development or maintenance, it is a common practice to have multiple development, integration testing, performance, user acceptance testing (UAT) and production environments. In case of government agencies and other regulated industries such as finance and healthcare, it is essential for security personnel to approve use of new environments that are provisioned. In addition, the aforementioned security personnel are involved in ensuring that the environments are in compliance with pre-negotiated security controls. Typically, security configurations of custom applications and related components thereof may be verified manually. Exemplary embodiments discussed herein may enable comparison of security configurations between two different scans of the same environment of computing system 100 and allow security personnel to approve continuation of use of the environment. In one or more embodiments, comparison of two different environments including one that is previously approved and another that is new may expedite the approval process.

Typical implementations involving spot checks may not cover all potential vulnerabilities and may be time-consuming. Across modern architecture-based applications and cloud environments with thousands of configurations changing constantly, exemplary embodiments provide for unique improvement of the Authority to Operate (ATO) process for Designated Approving Authorities (DAAs) and procurement of compliance audits completed for financial and other regulated industries. Exemplary embodiments may eliminate blind spots associated with traditional spot checks by providing the capability to compare two scans from same or different environments. Exemplary embodiments may also enable import of security vulnerability findings from other scans related to infrastructure, static and dynamic code analyzes and networks using other vendor products, correlation of vulnerabilities associated with same or related resources to understand the potential for chained vulnerability exploitation, procurement of key performance metrics of scan results, visualization of baselines, trends and differences between different versions of the same or different resources, scanning of results mapped to standards such as NIST 800-53 for all resources associated with the environment, scanning results mapped to cyber-security framework functional areas, and scanning results combined with cyber-security risk frameworks to compute risk levels of vulnerabilities.

The above mentioned features may be helpful in visualizing and analyzing security configuration scan results, lists of components that include environment(s) for an Information System, data flows, security controls, and metadata. Standard KPIs, charts, historical trends, etc., along with the root cause analysis, may help a human analyst narrow down misconfiguration issues of custom applications 210 and associated components thereof. Exemplary embodiments may also provide for anomaly detection and root cause analysis of misconfigurations based on historical scan results using machine learning and deep learning models. Summary and analysis of thousands of components along with hundreds of thousands of configurations through normal visualization and dashboards may not be efficient. In addition, in one or more embodiments, incorporation of machine learning and Artificial Intelligence (AI) technologies within the computing system may enable prediction of potential issues to be encountered when a new environment is provisioned, and all applications are deployed and configured therewith.

In one or more embodiments, the results of a scan may be analyzed initially through a machine learning/AI model to predict the root cause of misconfiguration failures. Exemplary embodiments enable achievement thereof through saving the root causes in machine-readable format in a repository (e.g., distributed across memories 204$_1$-N). Initially, a human may be classifying the root causes of the misconfigurations; once enough training data is available, machine learning models (e.g., incorporated in machine learning algorithms 244) may be developed. The trained machine learning models may then start classifying root causes of misconfigurations instead of humans. Exemplary embodiments discussed herein may further enable remediation of security misconfigurations using configuration management tools such as Chef, Puppet and Ansible; custom scripts for configuration management may also be compatible with security configuration engine 150. Configuration management tools such as Chef, Puppet and Ansible may include automated scripts to install, configure and update changes to any software including custom software. When a root cause of a misconfiguration is straightforward and when the remediation is well understood, in one or more embodiments, security configuration engine 150 (specifically, security configuration remediation engine 234) may programmatically invoke configuration management scripts such as Chef recipes and Ansible playbooks. Once the problem is fixed, in one or more embodiments, security configuration remediation engine 234 may rescan the environment (e.g., target security configuration scan environment 410) and the processes may be continued until all the issues associated with security misconfigurations are fixed completely.

Figure 7:
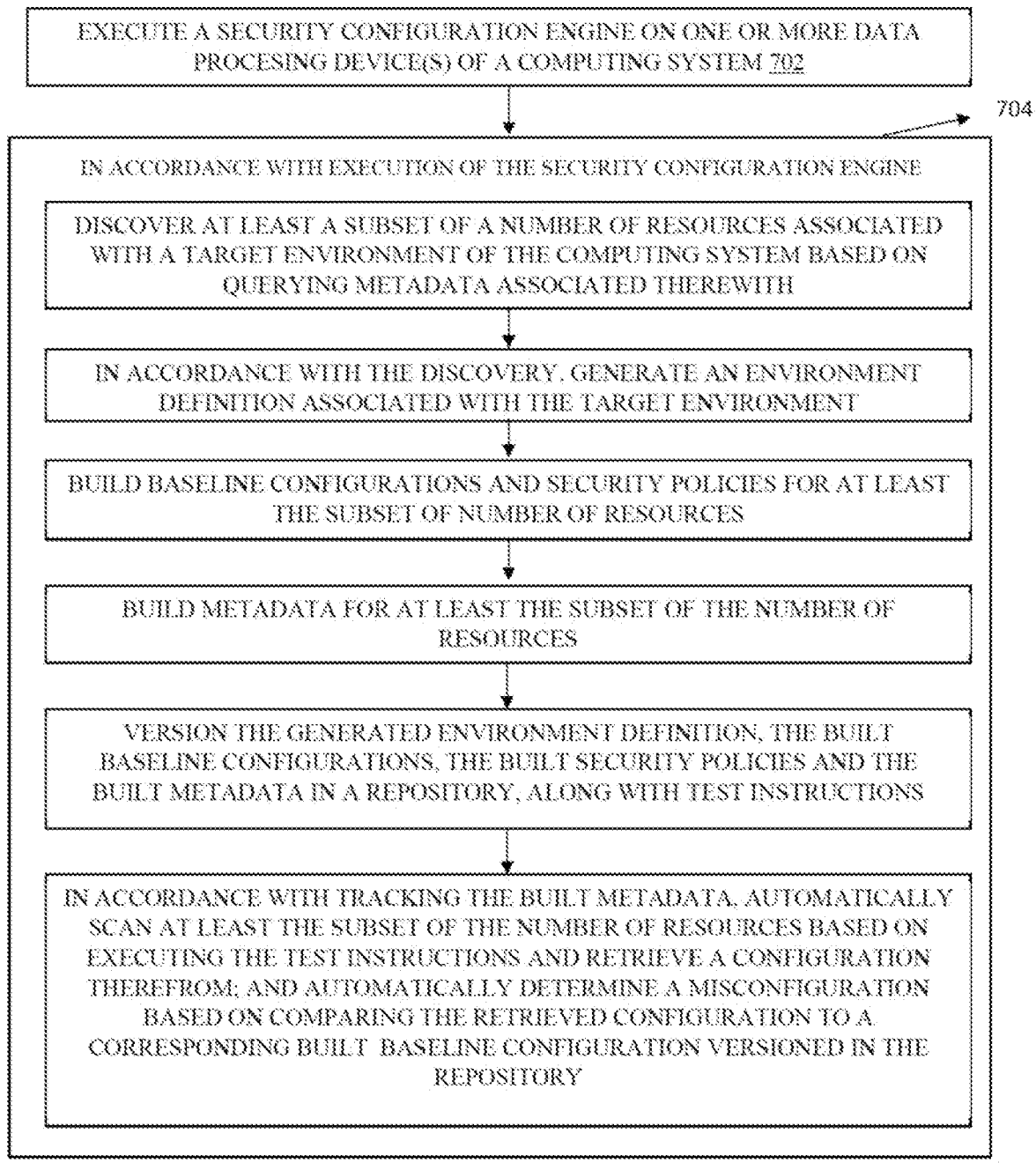
FIG. 7 is a process flow diagram detailing the operations involved in efficient security configuration compliance verification of resources in a target environment of a computing system, according to one or more embodiments.

Thus, exemplary embodiments provide for near real-time automatic remediation triggered through security configuration engine 150 after establishment of the root cause of a security misconfiguration in computing system 100. All of the above mentioned advantages provide for increased availability, reliability, confidentiality, integrity, and non-repudiation of computing system 100. FIG. 7 shows a process flow diagram detailing the operations involved in efficient security configuration compliance verification of resources (e.g., components 500, servers 1021-N, data processing devices 1041-M) in a target environment (e.g., target security configuration scan environment 410) of a computing system (e.g., computing system 100), according to one or more embodiments. In one or more embodiments, operation 702 may involve executing a security configuration engine (e.g., security configuration engine 150, security configuration engine components 1501-2, 1504-N, 1601-M) on one or more data processing device(s) (e.g., servers 1021-N, data processing devices 1041-M) of the computing system. In one or more embodiments, the computing system may include a number of resources across a computer network (e.g., computer network 106). In one or more embodiments, the number of resources may include a number of data processing devices including the one or more processing device(s) and components associated therewith executing across the number of data processing devices.

In one or more embodiments, operation 704 may involve, in accordance with an execution of the security configuration engine, discovering at least a subset of the number of resources that is associated with the target environment of the computing system based on querying a first metadata associated with the number of resources in the target environment, and, in accordance with a discovery, generating an environment definition (e.g., environment definition 214) associated with the target environment based on combining information relevant to test security configurations pertinent to all resources corresponding to at least the subset of the number of resources from all layers of a multi-layered system security architectural model (e.g., application centric system architecture model 242) of the target environment.

In one or more embodiments, the multi-layered system security architectural model may specify connections across all the resources corresponding to at least the subset of the number of resources, and the environment definition may specify configuration requirements of at least the subset of the number of resources in the target environment.

In one or more embodiments, operation 704 may also involve, in accordance with the execution of the security configuration engine, building a baseline configuration (e.g., component baselines 216) and a security policy (e.g., component security policies 218) for at least the subset of the number of resources in accordance with the environment definition, and building a second metadata (e.g., component metadata 220) for at least the subset of the number of resources in accordance with the security policy. In one or more embodiments, the second metadata may provide a number of contexts to the environment definition. In one or more embodiments, operation 704 may further involve, in accordance with the execution of the security configuration engine, versioning the environment definition, the baseline configuration, the security policy and the second metadata in a repository (e.g., version control repository 222) of the computing system, along with a test instruction (e.g., test code 224) pertinent to scanning the target environment for configurations, and, in accordance with tracking the second metadata versioned in the repository, automatically scanning at least the subset of the number of resources in accordance with the environment definition based on executing the test instruction and retrieving a specific configuration therefrom based on the scanning, and automatically determining a misconfiguration (e.g., security misconfiguration 236) based on comparing the specific configuration to a corresponding baseline configuration versioned in the repository.

Additionally, in some embodiments, operation 704 (not shown in FIG. 7) may involve verifying that a sequence of configurations is correctly defined based on retrieving another specific configuration. Again, as discussed above, while the figures are specifically directed to security configurations (e.g., security configuration verification) and remediation of security misconfigurations, it should be noted that concepts discussed herein may also be applicable to functional and non-functional configurations, functional and non-functional configuration verification, and functional and non-functional misconfiguration remediation. It should be obvious that security configuration engine 150 may be understood as a specific example of a generic configuration engine (e.g., a functional configuration engine and/or a non-functional configuration engine may be other examples) and that security policies and other security related elements may be specific examples of generic policies and elements that may encompass functional and non-functional policies associated with computing system 100. Also, the multi-layer system security architectural model may be a mere specific example of a multi-layer system architectural model. All reasonable variations are within the scope of the exemplary embodiments discussed herein.

Further, instructions associated with security configuration engine 150, security configuration engine components 1501-2, 1504-N, 1601-M, and components discussed with reference to FIG. 6 may be tangibly embodied on a non-transitory medium (e.g., a Compact Disc (CD), a Digital Video Disc (DVD), a Blu-ray disc®, a hard disk/drive), readable through a data processing device (e.g., a server 1021-N, a data processing device 1041-M) and executable therethrough. All reasonable variations are within the scope of the exemplary embodiments discussed herein.

The system, described herein, lays out an overarching efficient methodology to establish configuration baselines and continuously monitor configurations and identify misconfigurations. One of the key components of security configurations are related to access management security controls. These controls in the modern cloud-based systems are implemented through Identity and Access Management (IAM Roles) and IAM policies. Establishing baselines of IAM Roles and IAM Policies, security configuration policies, and continuously monitoring them needs special processes, tools, and technologies. The system described in the present disclosure establishes baselines of IAM Roles and IAM Policies, security configuration policies, and continuously monitors IAM Roles, IAM Policies, and security configuration policies.

In an embodiment, the system provides access privileges to a principal. (e.g., user (e.g., human), a program, or to an automated process (also known as Information Services)). Excessive privileges cannot be identified by the system if the system does not know what the user or a service is supposed to do while performing tasks during the normal course of operations. The system addresses the following challenges during assessment of excessive privilege:

A user (e.g., a human) may perform certain tasks by interacting with Information Systems. The system captures the user's task as job descriptions. These job descriptions are high level human readable descriptions in a natural language that give some idea about what the job is meant for.

Based on these job descriptions (e.g., definitions), the system designs and implements Identity and Access Management (IAM) roles and policies.

Once the IAM roles and policies are implemented, the system evaluates if the implemented role has excessive privileges or not, because a role may be associated with many policies. Each policy has many statements that describe what action is allowed or denied for each of the services and resources. Identifying such excessive privileges in an efficient way is very difficult on a scale.

The system ensures that no excessive privileges are provided to the users/services associated with the Roles by further addressing the following challenges:

The system verifies whether role access privileges are aligned with the persona job definitions or not based on least functionality, least privilege and privileged access management principles.

The system combines finding from historical usage of IAM roles with the job description and reconciling them to produce accurate representation of the access privileges required by the Persona/IAM Role.

Over a period, persona definition and/or persona job descriptions/use cases may change. Whenever such change occurs, the corresponding role access privileges are changed. The system continuously keeps track of the changes to job descriptions in a formal way. The system's ability to continuously track the changes to the description provides traceability of events and the changes to the description.

The system continuously monitors changes to the IAM Roles/Policies of the target environments. The system further verifies whether the changes are in alignment with Persona Job description or not. For example, a large organization can have 100s of Personas with 1000s of IAM Roles and 1000s of policies. Efficiently monitoring them for compliance is a real challenge and the system accomplishes this task dynamically and efficiently.

Many organizations simply do not establish persona definitions in a formal way. Further the organizations do not establish IAM Role and Policy baseline configurations which makes it difficult to continuously verify if the changes to IAM Roles/Policies of the target environment are in alignment with least functionality, least privilege and privilege access management principles. These principles are foundational elements in complying with the regulations such as Sarbanes Oxley (SOX), Credit Card Industry Regulations and Health Information Portability and Accountability Act (HIPPA), etc.

The cloud providers such as Amazon®, Google® or Microsoft® IAM services do not provide a methodology or a process or tools to solve the problem described. Even though Access Management Security controls and modern Zero trust architectural model emphasize the need for least privilege and least functionality of IAM Roles and Policies, cloud customers are unable to meet these requirements by themselves.

IAM Policy Simulator helps in identifying which specific statement in an IAM policy results in allowing or denying access to a particular resource or action. In the real world, excessive privileges can only be assessed in the context of job description and tasks a user/service assuming the role that is associated with the policy.

Similarly, AWS Access Analyzer collects historical information of the usage of the role and provides recommendations to remove unused roles. AWS Access Analyzer is somewhat helpful but it is not foolproof because a user may not have used a specific role for a long period of time but that does not mean that the user does not need those privileges. Similarly, just because the privileges are used by the user does not mean that they are in alignment with the Job description. Any adversary who is using excessive privileges continuously will go undetected. It is to be noted that IAM Access Analyzer is based on the mathematical theory of Provable Security. The concepts supported by Provable Security are verifying generic best practices, but will not be able to assess if a user or a service based on its job duties has excessive privilege or not. The security control framework such as NIST 800-53 mandates the analysis of the privileges based on what job they need to perform.

In the current cybersecurity landscape with the ever-increasing threats and ever-increasing dependency on cloud based IAM Roles and Policies as first layer of defense, it is extremely important to formally manage IAM Role/Policies security configurations to make sure that least functionality, least privileges and privileged access management principles are compliant. Any excessive privileges should be immediately detected and remediated.

The system provides an end-to-end solution that helps organizations to comply with access management controls for least functionality, least privilege and privileged access management. The system can efficiently detect excessive privilege as mandated by Security Frameworks such as NIST 800-53 and regulatory requirements such as Sarbanes Oxley (SOX), Credit Card Industry, Regulated industry, and Health Insurance Portability and Accountability Act (HIPAA). The solution described herein complements the existing methods such as Provable Security and can be used in conjunction with tools such as IAM Access Analyzer.

The system, identifying and remediating excessive privileges, improves the security posture of the computer system and/or information technology (IT) infrastructure. The system, by identifying and remediating excessive privileges, helps in automating the validation of compliance tests related to Access Management Security Controls specifically least functionality, least privilege and Privilege Access Management (PAM) controls.

The Information System is configured to comply with access management controls in any organization via the proposed system in areas of at least finance, healthcare, insurance, and government, etc., The system may be used in a commercial organization. The system is also used in areas of regulated industries having higher security. The regulated industry is a type of business that is controlled by government rules and has higher security (e.g., Health Insurance Portability and Accountability Act (HIPAA)). The system's ability to continuously track the changes to the description provides traceability of events and/or the changes to the description. The traceability enables the system to identify the root cause for any changes to the description.

The Information System (e.g., target environment) is configured to comply with access management controls for least functionality, least privilege and privileged access management for a principal. The system executes the following technical steps to comply with access management controls for least functionality, least privilege and privileged access management for the principal.

Machine-Readable Role Definition: Generating Machine-Readable Role Definition (MRRD) based on descriptions. The descriptions may be in a natural language that are human readable. The descriptions describe responsibilities of at least one of a user, an application, a program, and a software. The description comprises one of a job description and a service responsibility description. The job description comprises a narration of responsibilities of a user while interacting with an Information System. The service responsibility description comprises a narration of responsibilities of at least one of a software, an application, and a program, while interacting with an Information System. The system generates the Machine-Readable Role Definition (MRRD) from the description using artificial intelligence or machine learning. The system may specifically utilize Natural Language Processing (NLP) to understand and interpret the description in a human readable format. NLP is a component of Artificial Intelligence (AI). NLP enables computers to understand natural language as humans do. Whether the language is spoken or written, natural language processing uses artificial intelligence to take real-world input, process it, and make sense of it in a way a computer can understand. The system performs the natural language processing in two main phases: data preprocessing and algorithm. Data preprocessing involves preparing and "cleaning" text data from the description for machines to be able to analyze it. Data preprocessing may further involve conversion of audio format of the description to the text format. The system may transcribe the audio format of the description to the text format. Data preprocessing puts the text data in workable form and highlights features in the text that an algorithm can work with. The system performs the data preprocessing, including: tokenization, stop word removal, lemmatization and stemming and part-of-speech tagging.

The system performs the tokenization when text is broken down into smaller units to work with. The system performs the stop word removal when common words are removed from text and so unique words that offer the most information about the text remain. Lemmatization is the grouping together of different forms of the same word. Lemmatization is a text normalization technique used in Natural Language Processing (NLP), that switches any kind of a word to its base root mode. Lemmatization is responsible for grouping different inflected forms of words into the root form, having the same meaning. Stemming is basically removing the suffix from a word and reducing it to its root word. For example: "Flying" is a word and its suffix is "ing", if we remove "ing" from "Flying" then we will get the base word or root word which is "Fly". The system uses these suffixes to create a new word from the original stem word. The system performs the lemmatization and stemming when words in the text are reduced to their root forms to process. The system performs the part-of-speech tagging when words are marked based on the part-of-speech they are—such as nouns, verbs, and adjectives.

The algorithm used in NLP comprises two main types: rules-based algorithms and machine-learning based algorithms. The rules-based system uses carefully designed linguistic rules. The rules-based algorithms may comprise linguistic rules for different languages. Machine learning algorithms use statistical methods. Machine learning algorithms learn to perform tasks based on training data they are fed, and adjust their methods as more data is processed. Using a combination of machine learning, deep learning and neural networks, natural language processing algorithms hone their own rules through repeated processing and learning.

The natural language processing algorithm understands and interprets the description using any of the above data preprocessing methods. The natural language processing algorithm then extracts one of a keyword and a statement from the description. The keyword and the statement is related to at least one of a service action and an access level of an identity and access management (IAM) role.

b) IAM Role Baseline: Validating if the IAM Roles and Policies have excessive privilege or not during baseline establishment. Remediate if there are violations/changes. Capture baselines after remediation.

c) Continuous Monitoring: Validating continuously whenever changes are detected for IAM Role and or Associated Policies for least functionality and least privilege principles.

d) Maintain Job Descriptions: Performing version control of Job Descriptions and Machine-Readable Role Definitions.

e) Maintain Baselines: Performing rebaseline if the changes are in alignment with the current version of Role definition.

In an embodiment, the above technical steps can be used for validating any existing roles and policies for least functionality, least privileges and privileged access management rules as part of a security compliance verification process.

The Machine-Readable Role Definition is a JSON or XML or YAML or any other equivalent machine-readable formatted file that contains the list of resources and the access levels that a role requires.

Example:

Resource: Database

Access Level: Read

In an embodiment, a Smart Role Definition Generator is configured to automatically generate the Machine-Readable Role Definition. The Smart Role Definition Generator can parse natural language (example: English) Job Descriptions or Service Activity Descriptions and automatically generate the Machine-Readable Role Definition. The Machine-Readable Role Definitions are typically written by a security analyst or a business analyst or an end user who requires access to an Information System. The Smart Role Definition Generator is built using Natural Language Processing specifically Natural Language Understanding (NLU) techniques. The smart role definition generator extracts role name and service actions needed to be performed as part of the job. This data will be combined with a set of reference data that is relevant to the organization's approved service patterns. Example: A DB Operator in an organization may only be dealing with a specific type of DB such as PostgreSQL or Oracle® and may only be allowed to create new schemas. By matching the organization's approved pattern of services and the results of NLU output, Machine-Readable Role Definition will be generated. In an embodiment, the smart role definition generator can take recommendations from IAM access analyzer. The IAM access analyzer gives an idea about which access levels are not at all needed by the role.

Example Job Description:

Admin-Readonly-Role

Role Description: Performs daily monitoring of cloud sources and troubleshooting of infrastructure issues.

Membership: All Admin Personnel including Cloud Engineering, Info Sec, Enterprise DBAs, Network Admins, and Cloud Operations Teams.

Required Privileges: Read-Only Access to Cloud Services. No Access to Application/Business Data.

Admin read-only role does not have any write or permissions management or Tagging capabilities.

Machine-Readable Role Definition:

AdminReadOnlyRole {
"iam": read,
"ec2": "read",
"rds": "read",
"s3": "read",
}

In an embodiment, Artifact Builder Engine (206) generates job descriptions in Natural Language and Machine-Readable Role Definitions. The system assigns the job descriptions in Natural Language and Machine-Readable Role Definitions as part of Artifacts (424) as defined herein.

IAM Role and Policy Baselines without Excessive Privileges:

The IAM Role and Policy Baselines without excessive privileges are machine-readable IAM Role and Policy documents that are generated automatically initially and validated and rebaselined after remediation. These are the artifacts generated as described above, but the difference is that these baselines are verified against excessive privileges and any violations are remediated.

As described above, the Configuration Policy Scanner engine (226) detects any changes to the roles and policies by comparing them with baselines. If the changes are identified, then the Configuration Policy Scanner engine (226) validates the change against the excessive privilege criteria as done during baseline validation. If there is a violation, then the system performs further verification to see if role definition has changed or not. The Configuration Policy Scanner engine (226) then verifies the roles and policies for excessive privileges with the changed role definition if the role definition is changed. The system considers any violations as misconfigurations as defined herein. The system then automatically performs the remediation against the misconfigurations or optionally initiates a predefined workflow. Typically, these are done using enterprise ticketing systems such as Jira or ServiceNow etc.

Maintain IAM Role and Policy Baselines:

The system analyzes whether there are changes to IAM Roles and Policies. The system further determines whether the changes are valid changes based on the above step. The system then incorporates these changed role and policy configurations into the baselines.

The system establishes IAM roles/policies baselines that do not contain excessive privileges by executing the technical steps as follows:

1. Capture persona/service job description statements in English.
2. Generate a Machine-Readable Role Definition in terms of services and access levels required for the IAM role.
3. Compare existing roles and associated policies with role definition.
4. Assign the existing baselines as the golden baselines when the baselines do not have excessive privileges.
5. Verify whether the baselines can be remediated automatically if excessive privileges exist.
6. Generate machine-readable remediation instructions for auto remediation.
7. Remediate automatically.
8. Establish golden baselines that follow least functionality and least privilege.
9. Invoke an enterprise ticketing system to invoke a manual workflow if machine-readable automation is not possible.
10. Remediate manually the excessive privileges.
11. Rebaseline to establish IAM Roles and Policy Baselines without excessive privileges that assures or provides higher security assurance.

Figure 8:
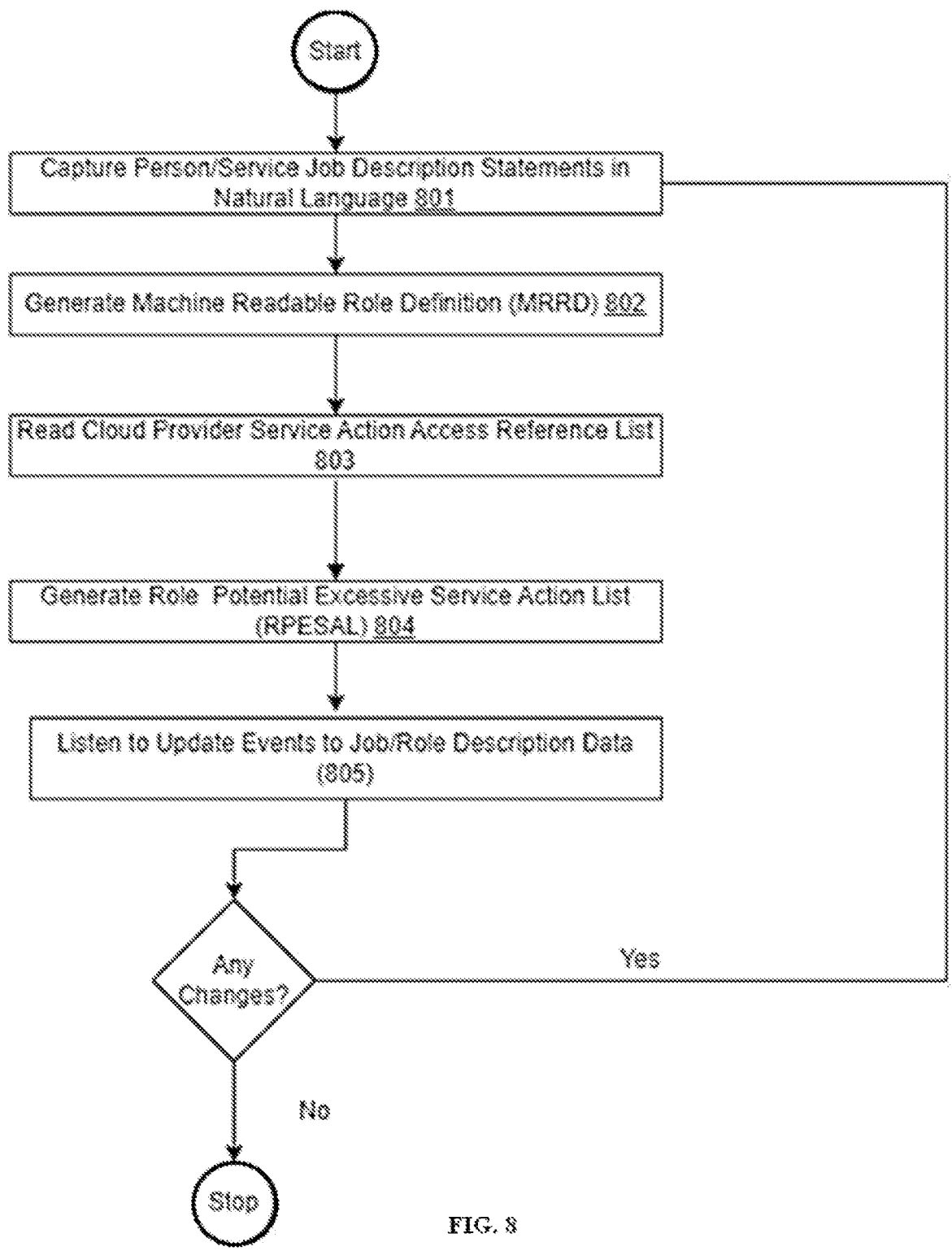
FIG. 8 illustrates process flow for dynamically establishing a Role Potential Excessive Service Action List, according to one or more embodiments.

FIG. 8 illustrates a process flow for dynamically establishing a Role Potential Excessive Service Action List, according to one or more embodiments. The method comprises the following technical steps. At step 801, persona/service job description statements are captured in a natural language. The natural language may be any language that is human readable. At step 802, Machine-readable Role Definitions (MRRD) are generated based on the job descriptions. The Machine-Readable Role Definition is a JSON or XML or YAML or any other equivalent machine-readable formatted file that contains the list of resources, service actions and the access levels that a role requires. At step 803, cloud provider service action access level reference list is read by the system. The cloud provider service action access level reference list comprises service action and access level. Each service action item has an access level. A service action is therefore always linked to a service. Each Information System service has its own set of actions (i.e., service action) that describe tasks that a user can perform with that Information System service. The service action refers to a specific service offering provided as part of a service. For example, Teams® software service provides service actions such as create team meeting, delete meeting, update meeting, add new meeting, etc. Teams® software service provides access levels such as read, write, or list. Based on the access level assigned, the Information System, via the present system described herein, enables the principal to perform the service action. The access levels are fixed for the entire Information System service industry. The service action may change depending on the applications or the service provided. The access level restricts the principal from using/availing the excessive privilege. For example, consider a user A is assigned an access level "read". Then User A can only read or view the information or data provided under the service and cannot write or update the information or data provided under the service.

At step 804, the system generates Role Potential Excessive Service Action List (RPESAL). The Role Potential Excessive Service Action List refers to a list of all possible service actions that can be considered as excess from a role definition perspective. The Role Potential Excessive Service Action List comprises service actions that are not enabled for the IAM role. The IAM role cannot use/access those service actions that are defined in the Role Potential Excessive Service Action List. The system generates the Role Potential Excessive Service Action List (RPESAL) for the Identity and Access Management (IAM) role by comparing the Machine-Readable Role Definition (MRRD) with a policy associated with the IAM role. The system compares the Machine-Readable Role Definition (MRRD) with a policy associated with the IAM role and understands the differences using NLP. The system, using the NLP, interprets and understands the Machine-Readable Role Definition (MRRD) and extracts keywords and statements. The system, using the NLP, interprets and understands the policy associated with the IAM role separately and extracts keywords and statements. The system compares the keywords and the statements respectively extracted from the MRRD and the policy associated with the IAM role and generates the Role Potential Excessive Service Action List (RPESAL). At Step 805, the system continuously listens to the description (e.g., Person/Service Job Description data) and whenever changes are detected, reinitiate step 801. The system provides the ability to dynamically keep RPESAL in alignment with changes to Person or Job Description statements by continuously monitoring any event and/or changes to the description. The RPESAL lineated with the changes to the description.

In an embodiment, the system assigns a first access level among a plurality of access levels to the Identity and Access Management (IAM) role based on at least one of the Machine-Readable Role Definition (MRRD) and a job requirement. In another embodiment, the system assigns a first access level among a plurality of access levels to the Identity and Access Management (IAM) role based on at least one of the Machine-Readable Role Definition (MRRD) and spatial and temporal information. The description may comprise the spatial and temporal information. The spatial and temporal information may define the service action and access level to be assigned to the IAM role at a predefined location and a predefined time. The Identity and Access Management (IAM) role is configured to at least one of access of information and perform a task based on the access level assigned to the IAM role. In an embodiment, the Identity and Access Management (IAM) role is configured to at least one of access of information and perform a task based on the access level assigned to the IAM role using the spatial and temporal information. The description for each of the IAM roles may comprise information related to access level and service action. In an embodiment, the description comprises the spatial and temporal information. The system using the Job Role or Service Description Extractor receives the description in the natural language. The Job Role or Service Description Extractor extracts keywords and/or statements from the description related to access level and/or service action and/or spatial and temporal information from the description and then derives Machine-Readable Role Definition (MRRD).

The system using the RPESAL generator generates Role Potential Excessive Service Action List (RPESAL) based on the MRRD derived. In an embodiment, the RPESAL generator dynamically generates RPESAL based on the MRRD derived and taking account of context of the spatial and temporal information. The RPESAL generator may generate a first RPESAL at a first predefined time and a first predefined location. For example, the RPESAL at working hours may provide an admin role to have "read" and "write" access level. The RPESAL may also generate a second RPESAL at a second predefined time and a second predefined location. For example, the RPESAL at off-hours may provide an admin role to have "read" access level and not "write" access level. The RPESAL generator may generate the RPESAL based on the locale (e.g., current time and current location of the IAM role). The RPESAL generator may receive the locale information of the IAM role via sensors (e.g., global positioning system (GPS), etc.) or any other electronic units (e.g., real-time clock, etc.).

The system also continuously looks for any updates to the description (e.g., job role description, service task description, spatial and temporal information). The system may specifically look for any updates such as an event related to accessing the description and/or modifying the description (e.g., spatial and temporal information). One such example of the event described herein could be an anonymous user unauthorizedly accessing and trying to modify the description. The system may also specifically look for any changes to the description. The system, upon detecting any such event and/or changes to the description, immediately and dynamically updates the MRRD in real-time. The system adapts continuously to changes to job role or service task changes and/or spatial and temporal information and updates the MRRD in real-time or near real-time. Based on the changes to the MRRD, the RPESAL and RAESAL list may also dynamically change in real-time.

For example, consider an IAM role such as a person X, a person Y, and a person Z from an entity or an organization are assigned to perform a certain job according to a job role or a service task required. The person X may be assigned to govern or operate financial related matters. The person Y may be assigned to govern or operate defense related matters. The person Z may be assigned to govern or operate external affairs related matters. The system receives the description for the IAM role (e.g., person Y). The system then extracts a keyword and statement related to the service action and access level and/or the spatial information for the IAM role (e.g., person Y) from the description. The system then derives the MRRD for the IAM role (e.g., person Y). The system then dynamically generates RPESAL based on the MRRD for the IAM role (e.g., person Y) (i.e., the RPESAL lineate with the different versions of the description). The system also then dynamically generates RAESAL based on the RPESAL (i.e., the RAESAL lineate with the different versions of the description). In an embodiment, the system also looks for any updates to the description or any event related to accessing or modifying the description. The event may comprise an activity related to modifying the description and/or any activity triggered as a result of a polling process to periodically check and verify the updates to the description. In an embodiment, the system may be implicitly programmed or configured to run the polling process periodically for a predefined period. The predefined period can be set as per the job requirement. The polling process enables the system to periodically check and verify for any updates to the description happened either by an authorized user, an unauthorized user, or by a malware attack.

The system upon detecting any event and/or any change to the description dynamically updates the MRRD for the person Y in real-time. The system then dynamically updates RPESAL and RAESAL in real-time in response to any updates to the MRRD. The system also assigns an access level to the person Y based on the MRRD and a job requirement. The system may also assign the access level to the person Y based on at least one of the MRRD and context of the spatial and temporal information. The description may or may not comprise the spatial and temporal information. The plurality of access levels comprise a level 1 access, a level 2 access, a level 3 access, and a level 4 access. The level 1 access comprises a lower access level of security. The level 2 access comprises a medium access level of security. The level 3 access comprises a higher access level of security. The level 4 access comprises a top access level of security. The system continuously looks for any updates to the description. The system may also dynamically reassign other access levels upon detecting the change to the description and job requirements. The system also determines, using artificial intelligence, whether the IAM role (e.g., person Y) performs at least one of accessing information and performing a task based on at least one of the job requirement, the MRRD, and the access level assigned. The system may also dynamically reassign another access level among the plurality of access levels to the IAM role using the artificial intelligence, when determining that the IAM role partly utilized the first access level and/or not accessed the information and not performed the task as per the job requirement. For example, consider the person Y is handling the defense related matters. Based on the MRRD and job role requirement, the system assigns the access level (e.g., read, write, list, etc. or combination thereof) that enables the person Y to access, govern, and/or perform any activities (e.g., access of information, write email, assign jobs, assign permissions, allocation, etc.) related to defense related matters. The system continuously tracks the access level and the service action taken by the user and determines that the person Y is nowhere accessing or governing financial related matters but however looks for external affairs related matters. The system then dynamically reassigns other access levels based on the job requirement and the MRRD. The system may dynamically reassign a higher access level or a lower access level according to the job requirement using the artificial intelligence. In an embodiment, the system assigns the same access level (e.g., read, write, list, etc. or combination thereof) when the system determines that the person Y fully utilizes the privileges provided and fulfills the job requirement.

Figure 9:
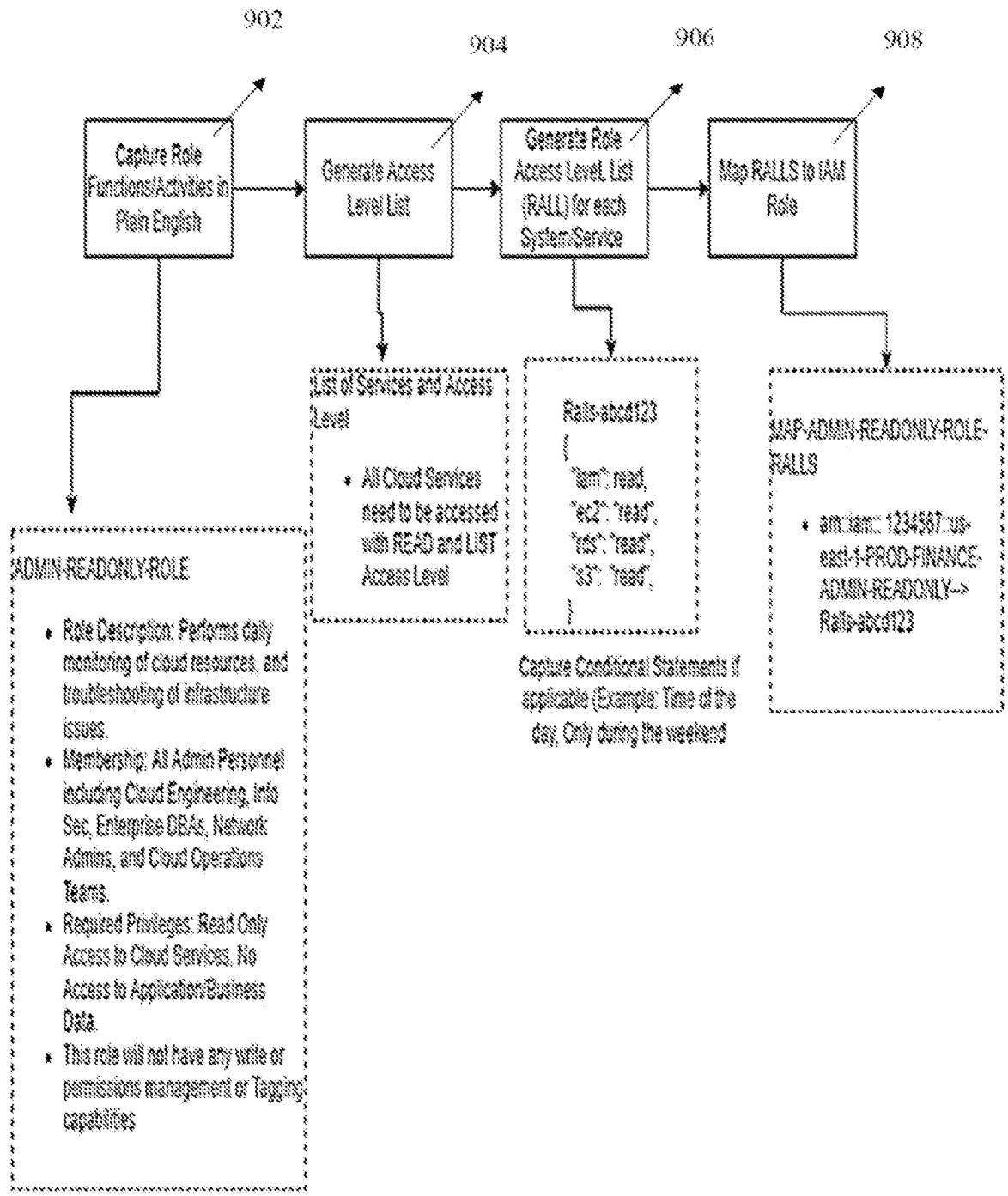
FIG. 9 illustrates a process flow for generating role definition and mapping role service access level list to IAM role, according to one or more embodiments.

FIG. 9 illustrates a process flow for generating role definition and mapping role service access level list to IAM role, according to one or more embodiments. At step 902, IAM role's functions or activities are captured as descriptions in natural language (e.g., English). Natural language is a human readable language. The descriptions comprise at least role description, membership, required privileges, and Role Potential Excessive Service Action List (RPESAL). The role description comprises activities that are to be executed by the principal. For example, role description may be performing daily monitoring of cloud resources, and troubleshooting of infrastructure issues. The membership refers to affiliation information regarding roles, teams, departments, etc., within the organization. The required privileges comprises privileges assigned or enabled to the IAM role. For example, the IAM roles may have read-only access to cloud services and the IAM role does not have access to application/business data. The Role Potential Excessive Service Action List (RPESAL) comprises service actions that are not enabled for the IAM role. For example, the IAM role does not have access service actions as write or permission management or tagging capabilities as the IAM role herein is an Admin read-only role.

At step 904, the system generates an access level list using machine learning or artificial intelligence. The system parses the descriptions and generates the access level list using Artificial Intelligence (AI) or Machine Learning (ML). The access level list comprises a list of services, service actions and access levels. For example, the IAM role having the read and list access levels can access all cloud services in a software service as the IAM role herein is an Admin read-only role.

At step 906, the system generates a Role Service Access Level List (RALL) for each service. The RALL assigns access levels to the IAM roles. The RALL provides the actual privileges or the IAM roles. The system assigns "read" access level to all the services as the IAM role herein is an Admin read-only role. At step 908, the system maps RALL to the IAM roles.

Figure 10:
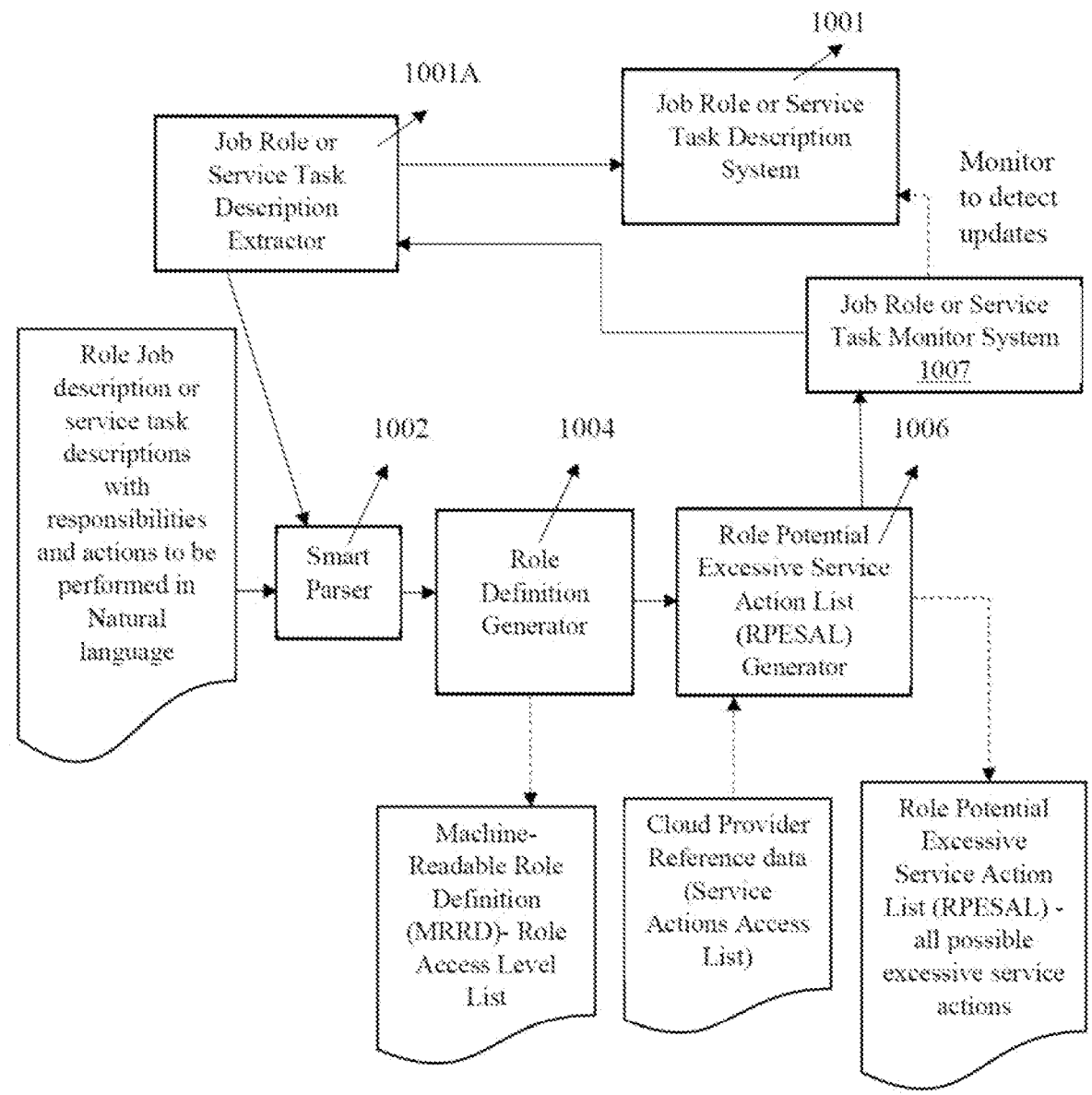
FIG. 10 illustrates an architectural view of a system, according to one or more embodiments.

FIG. 10 illustrates an architectural view of a system, according to one or more embodiments. The architectural view comprises, a Job Role or Service Task Description System 1001, a Job Role or Service Task Description Extractor, 1001A, a smart parser 1002, a role definition generator 1004, and a Role Potential Excessive Service Action List (RPESAL) generator 1006, and a Job Role or Service Task Monitor System 1007. The Job Role or Service Task Description System 1001 captures the job descriptions or system task descriptions in a Natural Language. The Job Role or Service Task Description Extractor 1001A extracts the relevant job descriptions or task descriptions and makes it available to the smart parser 1002. The smart parser 1002 receives the descriptions. The smart parser 1002 receives role job descriptions with responsibilities and actions to be performed in natural language. The smart parser 1002 then parses the description and extracts role names and service actions needed to be performed as part of the job. This data will be combined with a set of reference data that is relevant to the organization's approved service patterns. Example: A DB Operator in an organization may only be dealing with a specific type of DB such as PostgreSQL or Oracle® and may only be allowed to create new schemas. The role definition generator 1004 generates Machine-Readable Role Definition (MRRD) by matching the organization's approved pattern of services and the results of NLU output. In an embodiment, the role definition generator 1004 can take recommendations from an IAM access analyzer. The IAM access analyzer gives an idea about which access levels are not at all needed by the IAM role. The role definition generator 1004 further generates role service access level list (RALL) and cloud provider reference data. The cloud provider reference data comprises cloud provider service action access level reference list.

The Job Role or Service Task Description System 1001 monitors for any updates to the job role or service task description. This is accomplished by subscribing to the events generated by Job Role or Service Task Description System 1001 or alternatively monitoring can be performed by polling the system for any changes. The Job Role or Service Task Description System 1001 invokes Job Role or Service Task Description Extractor 1001A which will produce updated role job descriptions or service task descriptions and makes it available to smart parser 1002. The Job Role or Service Task Description System 1001 invokes the Job Role or Service Task Description Extractor 1001A when the changes are detected. The Job Role or Service Task Monitor System 1007, performing continuous monitoring of the changes, provides the ability to dynamically detect changes to job role or service task descriptions. The Role Potential Excessive Service Action List (RPESAL) generator 1006 immediately and dynamically updates the Role Potential Excessive Service Action List (RPESAL) upon detecting the changes to the job role or service task descriptions. The Role Potential Excessive Service Action List (RPESAL) generator 1006, performing dynamic generation, enables to remediate excessive privileges dynamically and adapt continuously to changes to job role or service task changes (i.e., the RPESAL lineate with the changes to the description).

The Role Potential Excessive Service Action List (RPESAL) generator 1006 generates Role Potential Excessive Service Action List (RPESAL). The Role Potential Excessive Service Action List refers to a list of all possible service actions that can be considered as excess from a role definition perspective. The Role Potential Excessive Service Action List comprises service actions that are not enabled for the IAM role. The IAM role cannot use/access those service actions that are defined in the Role Potential Excessive Service Action List.

Figure 11:
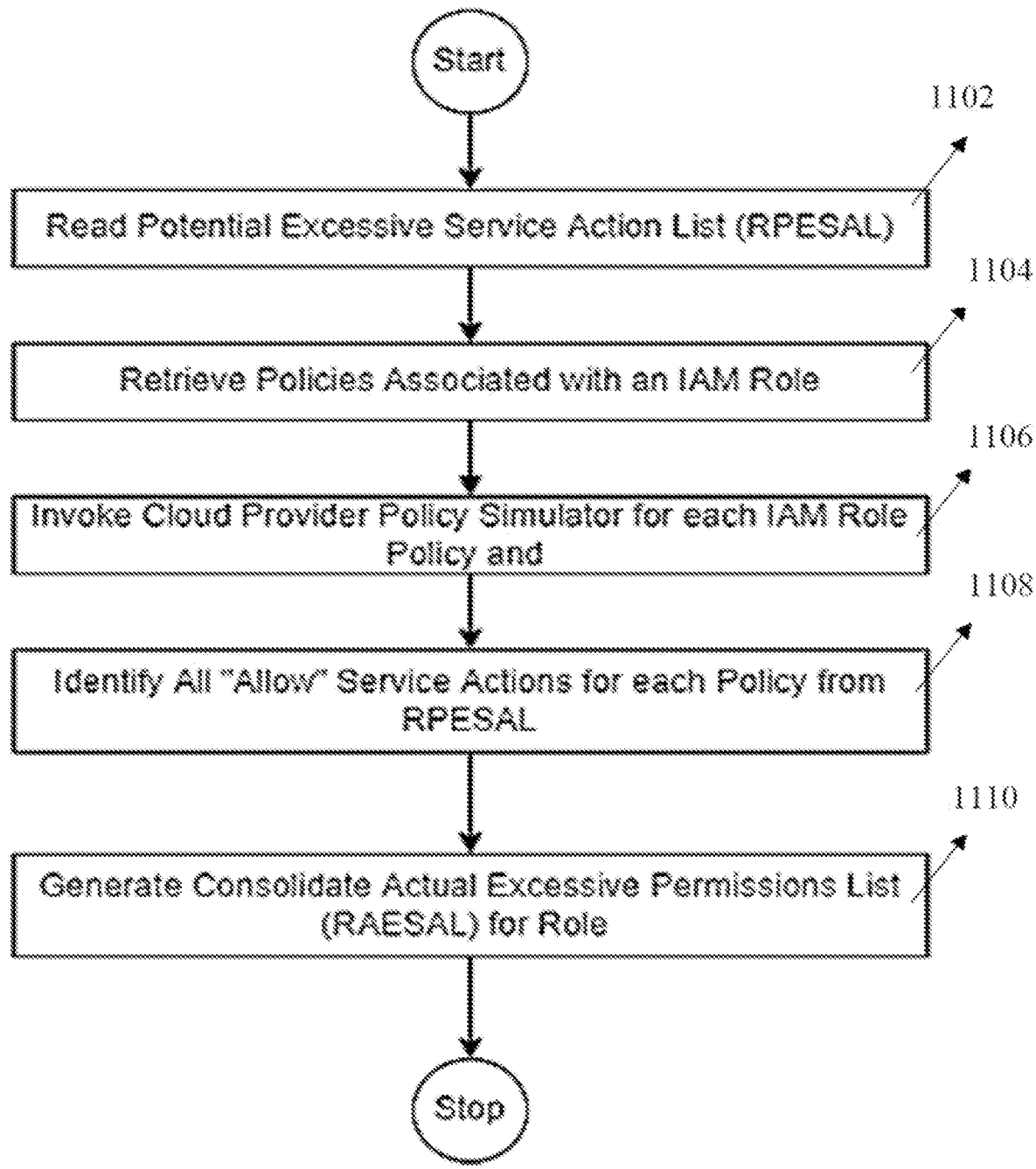
FIG. 11 illustrates a method of generating a Role Actual Excessive Service Action List, according to one or more embodiments.

FIG. 11 illustrates a method of generating a Role Actual Excessive Service Action List, according to one or more embodiments. At step 1102, the system reads a Role Potential Excessive Service Action List (RPESAL) for an IAM role. The Role Potential Excessive Service Action List comprises service actions that should not be enabled for the IAM role. The IAM role cannot use/access those service actions that are defined in the Role Potential Excessive Service Action List. At step 1104, the system retrieves policies associated with the IAM role.

At step 1106, the system invokes a cloud provider policy simulator for each IAM role and IAM policy. The Policy Simulator helps in identifying which specific statement in an IAM policy results in allowing or denying access to a particular resource or action. In the real world, excessive privileges can only be assessed in the context of job description and tasks a user/service assuming the role that is associated with the policy.

The policy simulator further generates Role Potential Excessive Service Action List (RPESAL). At step 1108, the system then identifies all "allow" service actions for each policy from the RPESAL. At step 1110, the system generates Role Actual Excessive Service Action List (RAESAL) for the IAM role. The Role Actual Excessive Service Action List (RAESAL) comprises the service actions that are enabled for the IAM role.

Figure 12:
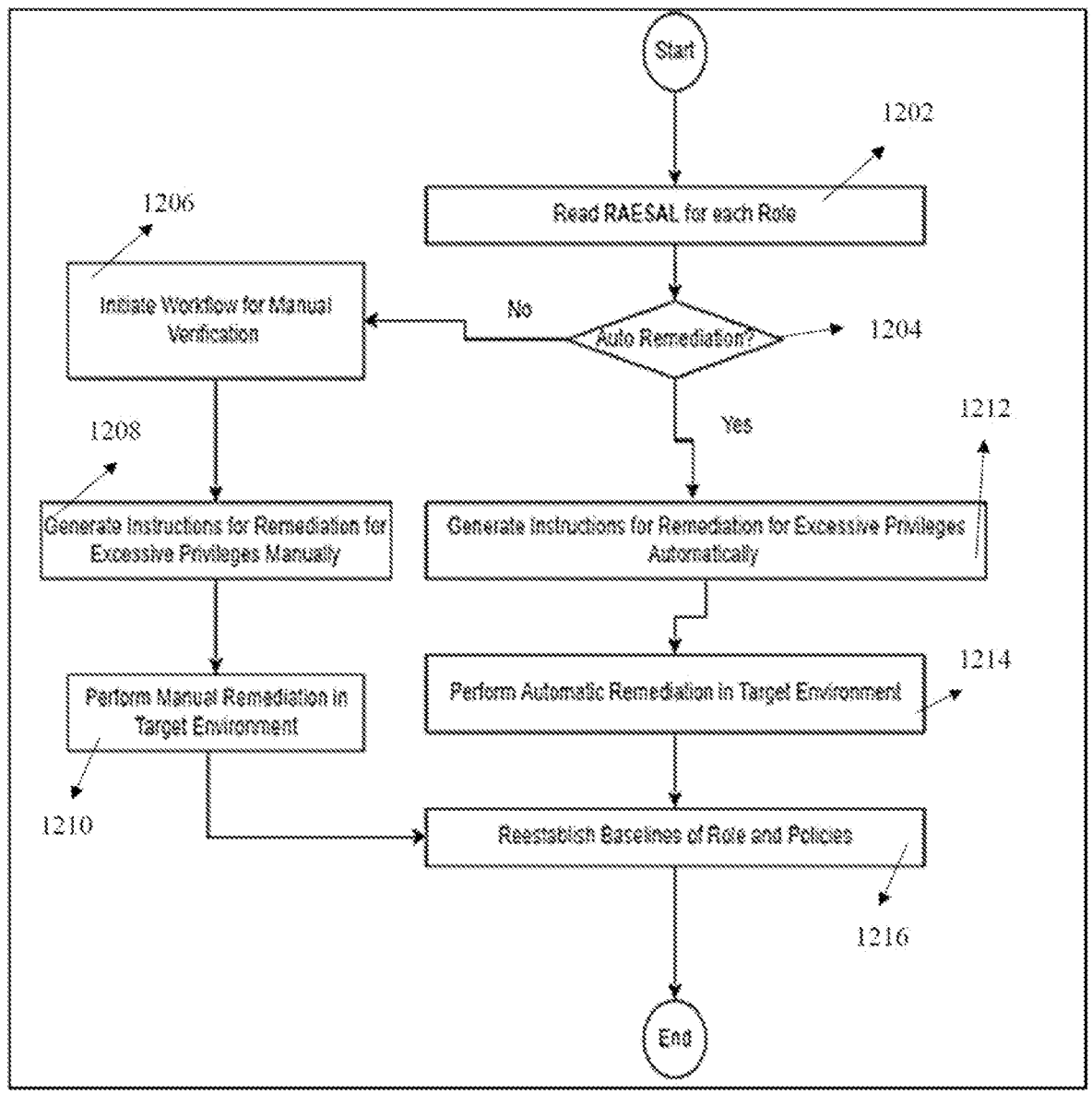
FIG. 12 illustrates a process flow of remediating excessive privileges in target environment, according to one or more embodiments.

FIG. 12 illustrates a process flow of remediating excessive privileges in target environment, according to one or more embodiments. At step 1202, the system reads Role Actual Excessive Service Action List (RAESAL). The system identifies excessive privileges from RAESAL. At step 1204, the system determines whether auto-remediation can/has to be done on the determined excessive privileges. At step 1206, the system initiates workflow for manual verification, when the system determines that the auto-remediation cannot be done. At step 1208, the system generates instructions for remediation for excessive privileges manually. At step 1210, the system then performs manual remediation in target environment.

At step 1212, the system generates instructions for remediation for excessive privileges automatically, when the system determines that the auto-remediation can be done. At step 1214, the system then performs automatic remediation in target environment. In an embodiment, the system disables permissions for a service action in the Role Actual Excessive Service Action List (RAESAL) by removing an unused service and restricting an access level by analyzing a historical role usage. At step 1216, the system reestablishes baselines for IAM roles and policies once the remediation is performed. The system assigns the existing baselines as the golden baselines when the baselines do not have excessive privileges.

Figure 13A:
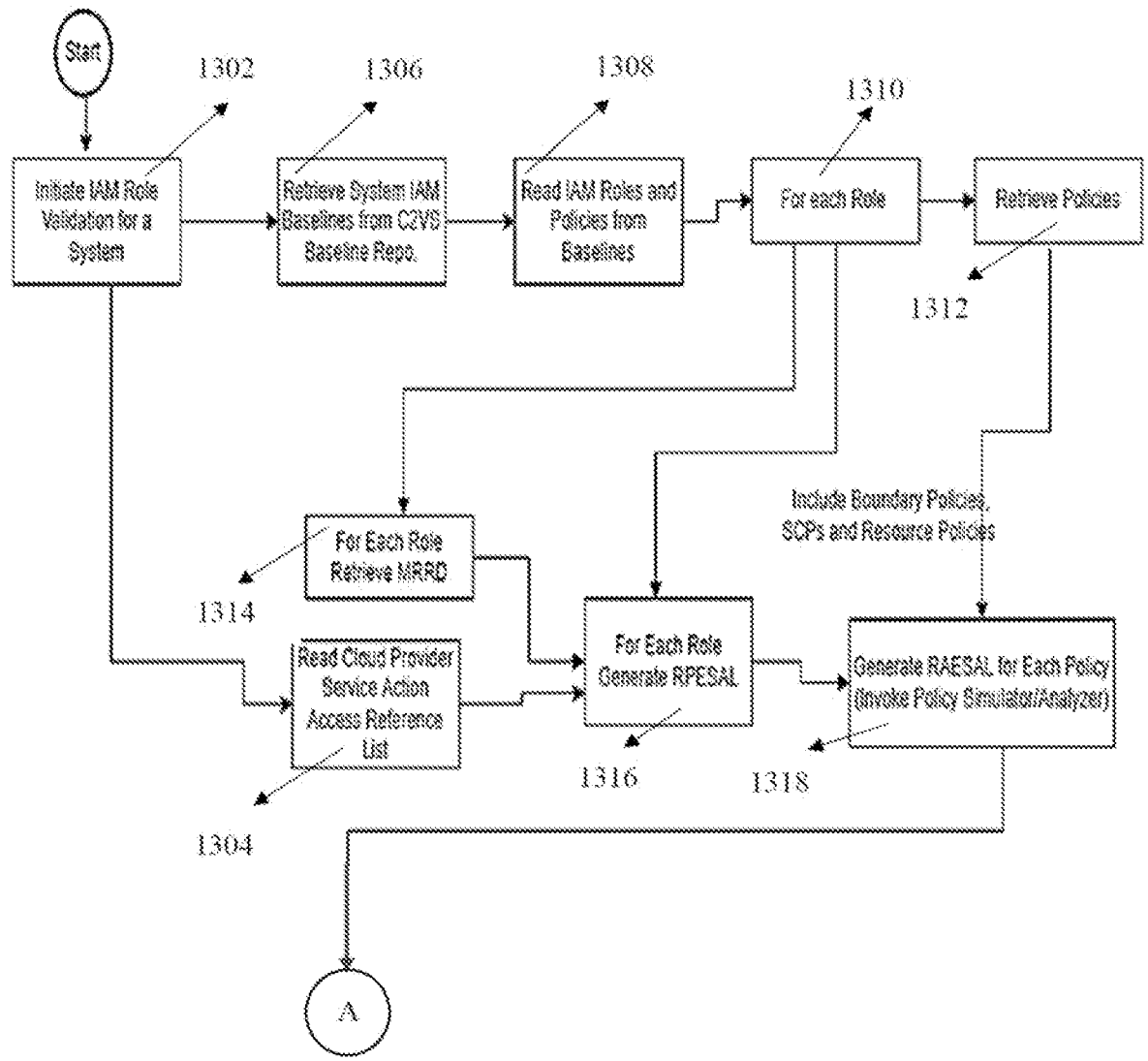
FIG. 13A-13B illustrates a process flow of identifying and remediating excessive privileges of Identity and Access Management (IAM) roles and/or policies for a System, according to one or more embodiments.
Figure 13B:
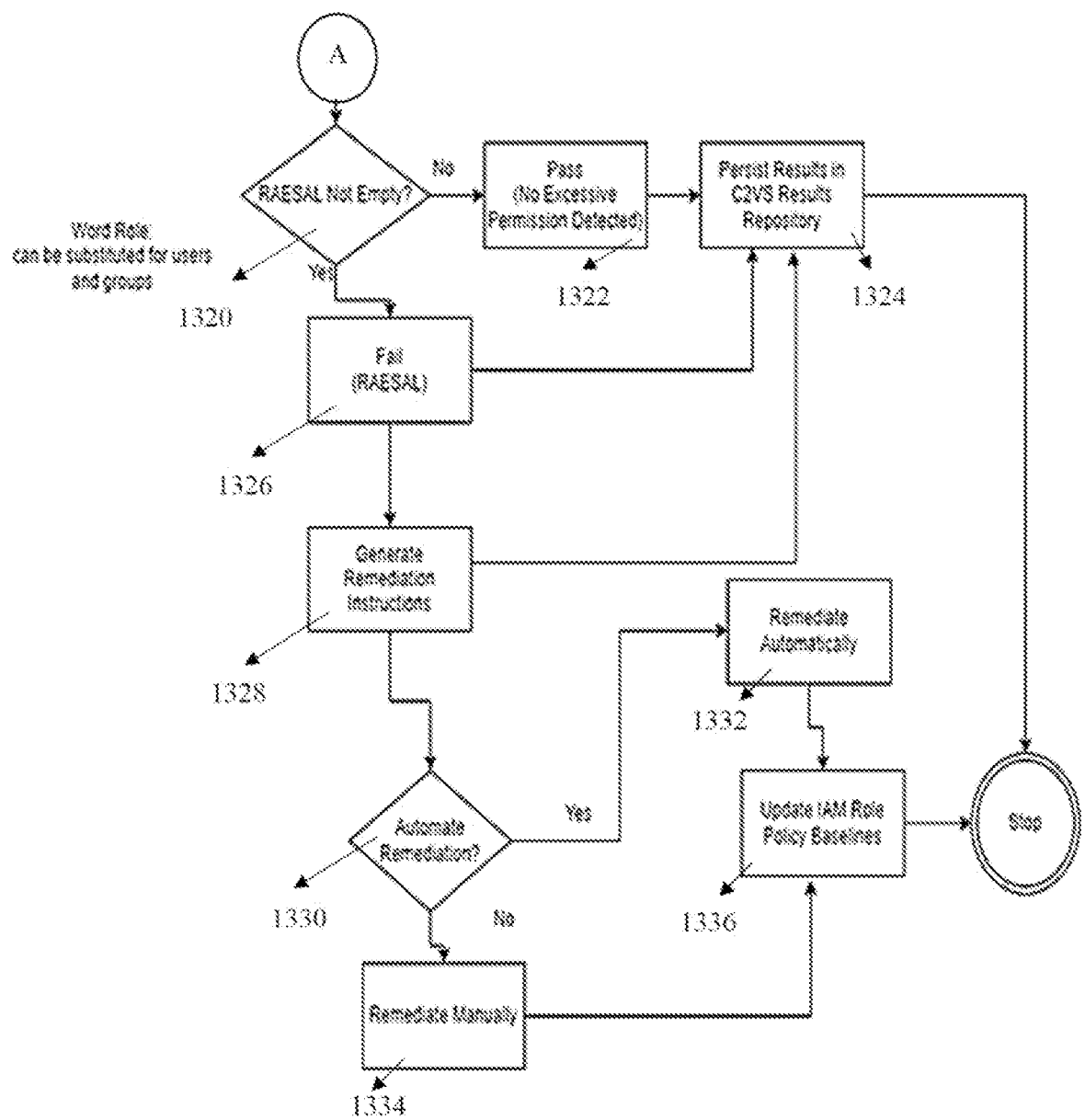

FIG. 13A-13B illustrates a process flow of identifying and remediating excessive privileges of Identity and Access Management (IAM) roles and/or policies for a system, according to one or more embodiments. At step 1302, an IAM role validation is initiated on-demand or whenever RPESAL is updated because of changes detected by Job Role or Service Task Monitor System 1007. Updating baselines that do not have excessive privileges whenever job role or service description changes provides the ability to dynamically adapt baselines to changes in the Role Descriptions and Service Task Descriptions. The IAM role validation is performed to provide access to any other functionality or perform permissions management. At step 1304, the system reads and generates a cloud provider service action access reference list. At step 1306, the system retrieves IAM baselines for the IAM role from a compliance solution (e.g., C2VS) repository. At step 1308, the system reads IAM roles and policies from the baselines retrieved. At step 1310, the system analyzes each IAM role. At step 1312, the system retrieves policies for the each IAM role. At step 1314, the system retrieves Machine-Readable Role Definition for each role. At step 1316, the system generates Role Potential Excessive Service Action List (RPESAL) based on the MRRD. At step 1318, the system generates Role Actual Excessive Service Action List (RAESAL) for each policy. In an embodiment, the system may invoke policy simulator/IAM access analyzer to generate RAESAL.

At step 1320, the system determines whether the RAESAL is not empty. At step 1322, the system detects no excess permissions. At step 1324, the system persists in placing the results in the compliance solution (e.g., C2VS) repository. At step 1326, the system detects excess permissions and the RAESAL is not empty and proceeds to step 1324. At step 1328, the system generates remediation instructions until empty and proceeds to step 1324. At step 1330, the system determines whether the remediation can be automated. At step 1332, the system automatically remediates the excessive privileges. At step 1334, the system manually remediates the excessive privileges. At step 1336, the system updates IAM role and policy baselines once the remediation is done.

Figure 14:
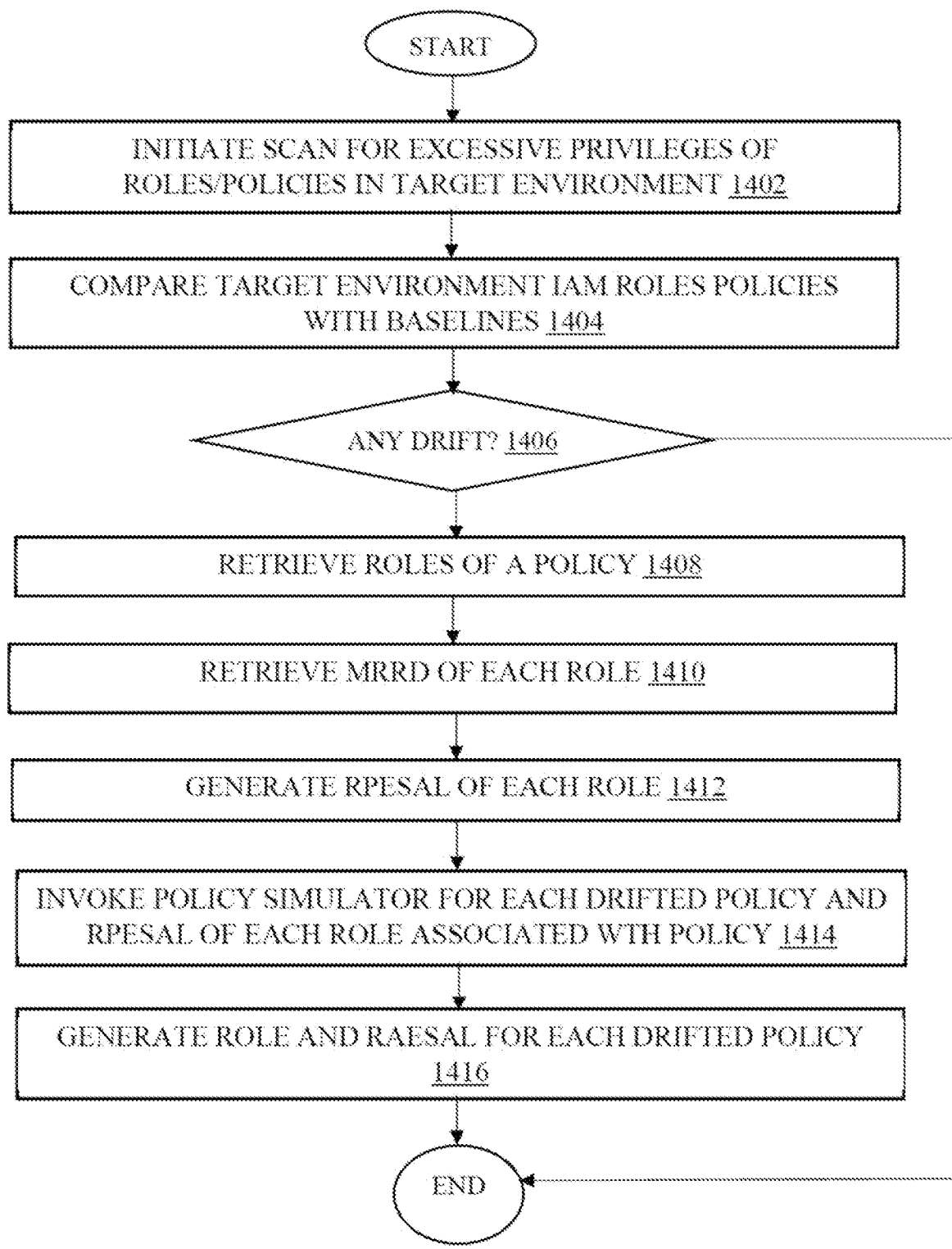
FIG. 14 illustrates a process flow of monitoring IAM Role Policies for excessive privilege drifts, according to one or more embodiments in target environment.

FIG. 14 illustrates a process flow of monitoring IAM Role Policies for excessive privilege drifts, according to one or more embodiments. At step 1402, the system initiates a scan for excessive privileges of roles/policies in target environment. At step 1404, the system compares target environment IAM role policies with IAM role policies during baseline establishment. At step 1406, the system determines whether any drifts exist in the baselines. At step 1408, the system retrieves roles of a policy if any drifts exist in the IAM roles policies. At step 1410, the system retrieves MRRD for each role. At step 1412, the system then generates RPESAL for each role. At step 1414, the system then generates RPESAL for each role associated with the policy. In an embodiment, the system invokes policy simulator for each drifted policy and for generating RPESAL. At step 1416, the system then generates role and RAESAL (Role Actual Excessive Service Action List) for each drifted policy.

Figure 15:
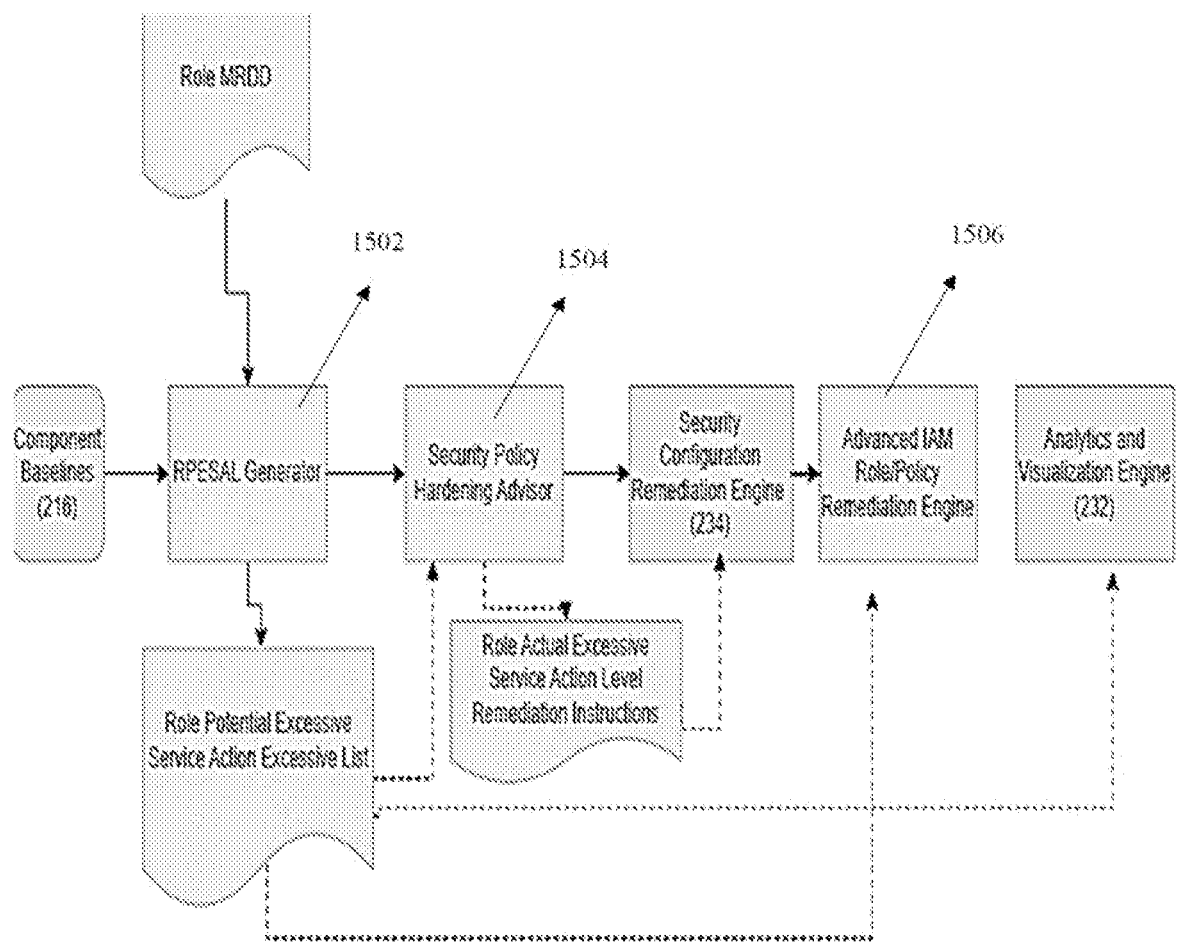
FIG. 15 illustrates a logical architecture of a system for identifying excessive privileges, remediating and visualizing the security configurations, according to one or more embodiments.

FIG. 15 illustrates a logical architecture of a system for identifying excessive privileges, remediating and visualizing the security configurations, according to one or more embodiments. The logical architecture depicts a Role Potential Actual Excessive Service Action List (RPESAL) generator 1502, a security policy hardening advisor 1504, and an advanced IAM role/policy remediation engine 1506. The logical architecture further depicts security configuration remediation engine 234, and analytics and visualization engine 232.

The Role Potential Excessive Service Action List (RPESAL) generator 1502 generates Role Potential Actual Excessive Service Action List (RPESAL) using the component baselines 216 and IAM role MRRD. The Machine-Readable Role Definition may be generated based on job descriptions. The component baselines 216 may be predetermined attributes of the components of the resources discovered. The aforementioned predetermined attributes may serve as basis/references for change definitions. The component baseline 216 may primarily focus on security configurations. The component baselines 216 may also include functional and performance configurations of computing system 100 as availability and reliability of critical and secure enterprise applications (e.g., custom applications 210) of computing system 100 may also be important.

The security policy hardening advisor 1504 hardens at least one of the IAM roles, and the policy associated with the IAM role at a time of baseline establishment. The security policy hardening advisor 1504 hardens by executing the following technical steps: reading at least one of the IAM role and the policy associated with the IAM role, retrieve corresponding Role Potential Excessive Service Action List (RPESAL); generating the Role Actual Excessive Service Action List (RAESAL) for the IAM role for the policy associated with the IAM role; remediating at least one of the IAM roles, and the policy associated with the IAM role for a service action in the Role Actual Excessive Service Action List (RAESAL) in a target environment; and updating baseline configuration for at least one of the IAM role and the policy associated with the IAM role by retrieving remediated policy and remediated IAM role from the target environment. In an embodiment, the system reads cloud provider service action and access mapping reference list to retrieve Role Potential Excessive Service Action List (RPESAL).

The security configuration remediation engine 234 is configured to remediate deviated security configurations in accordance with component security policies using the RAESAL remediation instructions. The security configuration remediation engine 234 may rescan the environment (e.g., target security configuration scan environment) and the processes may be continued until all the issues associated with security misconfigurations are fixed completely.

The advanced IAM role/policy remediation engine 1506 remediates the IAM role and IAM policy based on the RAESAL. The remediation is performed by removing each of Role Actual Excessive Service Actions from each of the policies associated with the role. The analytics and visualization engine 232 analyzes and identifies/predicts root causes based on the determination (e.g., if a target resource configuration deviates from a corresponding component baseline 216) of the validation of the target resource configurations. The analytics and visualization engine 232 may provide risk computations, dashboards, reports, and Key Performance Indicators (KPIs) in conjunction with enterprise security tools 238.

Figure 16:
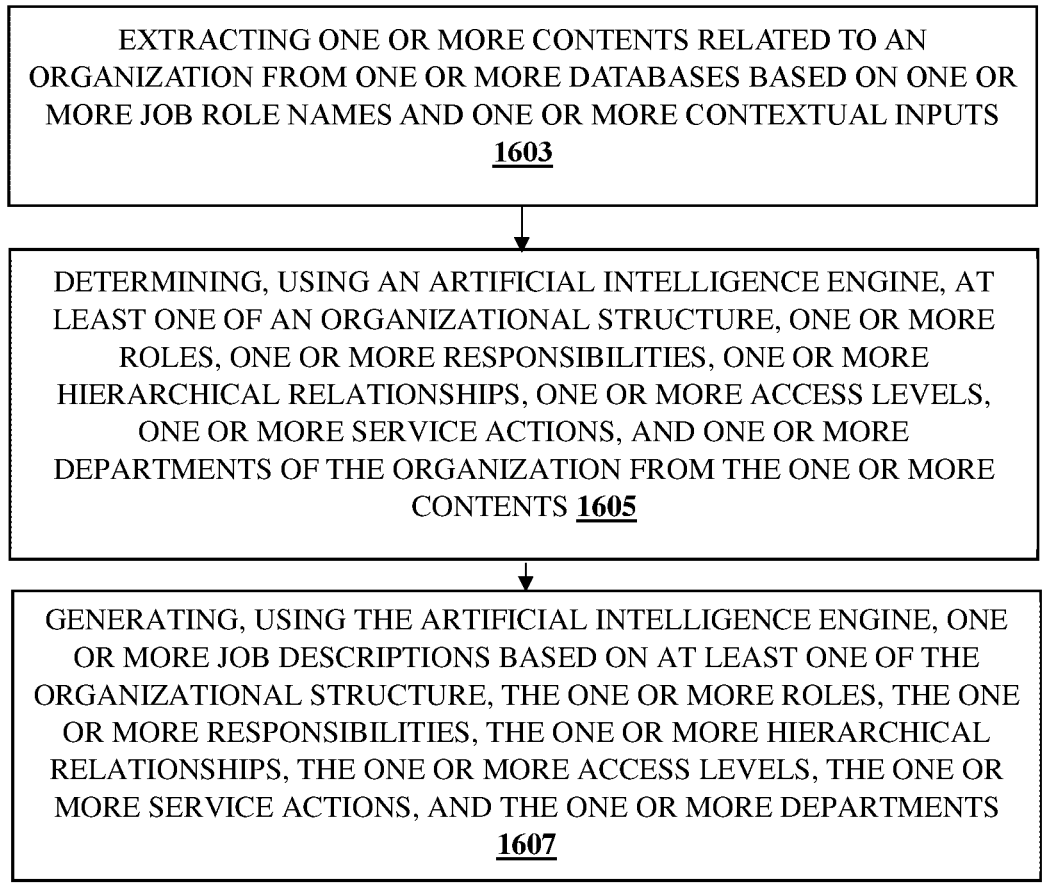
FIG. 16 illustrates a method, according to one or more embodiments.

In an embodiment, a method is described. As an example, FIG. 16 illustrates a method, according to one or more embodiments. The method comprises following technical steps: extracting one or more contents related to an organization from one or more data sources based on one or more job role names and one or more contextual inputs (at step 1603); determining, using an artificial intelligence engine, at least one of an organizational structure, one or more roles, one or more responsibilities, one or more hierarchical relationships, one or more access levels, one or more service actions, and one or more departments of the organization from the one or more contents (at step 1605); and generating, using the artificial intelligence engine, one or more job descriptions based on at least one of the organizational structure, the one or more roles, the one or more responsibilities, the one or more hierarchical relationships, the one or more access levels, the one or more service actions, and the one or more departments (at step 1607). In one embodiment, the method further comprises: receiving the one or more job role names and the one or more contextual inputs as an input from one or more users. In one embodiment, the one or more users comprises at least one of one or more professionals and one or more stakeholders. In one embodiment, the system may also receive an organization name (similar organization) as an input from the one or more users. The processor then may extract the one or more contents related to that organization from one or more data sources based on the one or more job role names and the one or more contextual inputs. In an embodiment, the job role descriptions are generated considering data privacy and security, feedback, continuous improvement of the large language models, and legal and ethical compliance. The system determines the sensitive information from the one or more contents and anonymizes the sensitive information and provides protection during training. The system also receives feedback from the users to report inaccuracies and provide suggestions for improvement. The system also regularly updates the training dataset and retrains the model to adapt to evolving security policies and organizational changes, privacy and security standards, policies, and procedures including industry best practices. The system analyzes legal and ethical guidelines and interprets to ensure compliance while generating the job role descriptions. The system generates the job role descriptions that are in compliance with legal and ethical guidelines in industry best practices, especially if using real organizational data. The system enables the processor to leverage a language model to generate innovative and precise job role descriptions, aligning them with access level privileges based on the least privilege principle. The system enables continuous validation, feedback and improvement.

In one embodiment, the one or more contents comprises at least one of one or more security policies, one or more privacy policies, one or more change management policies, one or more organizational policies, one or more standards, and one or more procedures. The policies refers to contents that comprise highest guideline. Organizations do not change the policies frequently. The standards refer to the contents that comprise next level of guidelines. Organizations change the standards sometimes. The procedures refer to the contents that comprise lowest level of detail. Organizations change the procedures often. Based on a single policy, the organization may create many standards. Based on a single standard, the organization may create many procedures. The security policy is a comprehensive document that comprises information designed to protect the organization's information systems, data, assets, and resources. The security policy serves as a framework to ensure the confidentiality, integrity, and availability of information while addressing potential risks and threats. The security policy defines scope and purpose. The security policy defines the scope of the policy and outlines objectives, emphasizing the importance of security within the organization. The security policy may also comprise roles and responsibilities information, separation of duties, access control information, data protection guidelines, incident response information, physical security procedures, network security procedures, software and patch management guidelines, training and awareness procedures, compliance and legal procedures, monitoring and audit guidelines, business continuity and disaster recovery guidelines.

The roles and responsibilities information clearly defines and delineates the roles and responsibilities of individuals and departments involved in maintaining security, such as system administrators, users, security officers, etc.

The Separation of Duties (SoD) is a fundamental principle in information security, enshrined in several industry standards and best practices. The Separation of Duties (SoD) aims to minimize the risk of unauthorized access, modification, or destruction of data and systems by preventing individuals from having control over all stages of a sensitive process. The SoD may comprise following information:

Divided responsibilities information: Instead of granting one person complete control over a task, the process is split into distinct steps with different individuals or teams responsible for each based on the divided responsibilities information. The compliance of the divided responsibilities information prevents any single person from having enough privileges to compromise the entire process.

Multiple layers of control information: This section comprises information regarding different individuals handling authorization, execution, and recording of transactions, creating checks and balances that makes it more difficult for errors or malicious actions to go unnoticed.

Minimize conflicts of interest information: This section comprises information that guides to avoid assigning individuals tasks where their personal interests might conflict with the organization's security. For example, someone responsible for approving financial transactions also should not be able to initiate those transactions.

Separation of Duties (SoD)-Industry Standards and Best Practices:

NIST SP 800-171: The National Institute of Standards and Technology (NIST) publication outlines best practices for protecting controlled unclassified information (CUI) in nonfederal organizations. The National Institute of Standards and Technology (NIST) explicitly recommends SoD as a key control for minimizing insider threats and unauthorized access.

ISO 27001: The International Standard For Information Security Management Systems (ISMS) emphasizes the importance of SoD in controlling access and managing risks. It provides guidance on implementing SoD controls and ensuring their effectiveness.

PCI DSS: The Payment Card Industry Data Security Standard (PCI DSS) requires organizations that handle credit card information to implement SoD controls for tasks like cardholder data authorization and access.

HIPAA: The Health Insurance Portability and Accountability Act (HIPAA) also incorporates SoD principles in its regulations for protecting patient health information (PHI).

Benefits of Implementing SoD:

Reduced risk of fraud and errors: SoD prevents individuals from having excessive control. SoD makes it more difficult for the individuals to commit intentional or unintentional breaches.

Improved data integrity: Separating responsibilities helps ensure the accuracy and completeness of data by introducing checks and balances throughout the process.

Enhanced accountability: By clearly defining roles and responsibilities, SoD facilitates easier identification of who is responsible for any security incidents.

Stronger compliance: Implementing SoD helps organizations comply with various information security regulations and standards.

Separation of Duties is a critical principle for securing information systems and data. By incorporating SoD into your security practices, the organization can significantly reduce the risk of internal threats, errors, and unauthorized access. Referencing industry standards and best practices can provide a valuable framework for implementing effective SoD controls within an organization.

The access control information may comprise service actions and access levels. The access level refers to the privileges that a user has within an Information System or network. In computer security, access levels are assigned to each user account. Access levels are permission sets that allow members to perform different tasks within an organization. The access level includes actions such as list, read, write and permissions management within the IAM. The service action refers to a specific service offering provided as part of a service. The data protection guidelines define and guide specific measures to safeguard sensitive data, including encryption, data classification, handling procedures, and data retention policies. The incident response information outlines procedures to detect, report, and respond to security incidents or breaches, including incident reporting channels and escalation processes. The physical security procedures define procedures to address physical security measures to protect facilities, equipment, and resources, such as access controls, surveillance, and environmental controls. The network security procedures comprises guidelines for securing network infrastructure, firewalls, intrusion detection/prevention systems, and secure configurations. The software and patch management guidelines comprises procedures for software installation, updates, and patch management to mitigate vulnerabilities. The training and awareness procedures provide information that emphasizes the importance of ongoing security training and awareness programs for employees to mitigate human errors and promote a security-conscious culture. The compliance and legal procedures comprises step by step instructions to ensure alignment with relevant laws, regulations, and industry standards to maintain compliance. The monitoring and audit guidelines describe monitoring practices, logging mechanisms, and regular audits to assess the effectiveness of security controls and identify potential weaknesses. The business continuity and disaster recovery guidelines outline plans and procedures to ensure business continuity in the event of security incidents, disasters, or disruption.

The organizational policy comprises a set of guidelines, principles, and rules established by an organization to govern its operations, activities, and interactions. These policies serve as a framework for decision-making, behavior, and the overall functioning of the organization. Organizational policies serve several purposes, including mitigating risks, ensuring consistency in decision-making, setting expectations for employees, complying with legal requirements, and fostering a positive organizational culture. The organizational policy comprises at least one of code of conduct policies, human resource policies, information technology policies, health and safety policies, financial policies, communication policies, environmental policies, diversity and inclusion policies, legal and compliance policies, and data protection and privacy policies.

The code of conduct policies defines expected behaviors and ethical standards for employees, outlining acceptable and unacceptable conduct in the workplace. The human resource policies encompasses hiring practices/procedures, employee benefits, performance evaluations, disciplinary procedures, and termination protocols. The information technology policies defines policies governing the use of technology resources, including acceptable use of company computers, networks, software, and data security measures. The health and safety policies define procedures for establishing safety protocols, emergency procedures, and guidelines for handling hazardous materials for ensuring a safe working environment. The financial policies encompasses budgeting, accounting practices, expense reimbursement, procurement procedures, and financial reporting standards. The communication policies encompass guidelines for internal and external communication, including email usage, social media policies, and media relations. The environmental policies encompass guidelines for addressing the organization's commitment to sustainability, waste management, and environmental conservation practices. The diversity and inclusion policies encompasses the organization's commitment to diversity, equity, and inclusion, promoting a fair and inclusive work culture. The legal and compliance policies encompass guidelines for ensuring adherence to local, national, and international laws, as well as industry-specific regulations relevant to the organization's operations. The data protection and privacy policies detail procedures for handling sensitive information, ensuring compliance with data protection laws, and safeguarding privacy.

The change management policies are crucial frameworks within organizations that outline the procedures, processes, and guidelines for managing changes in a structured and controlled manner. The change management policies are essential for ensuring that changes to systems, processes, or procedures are implemented smoothly while minimizing potential disruptions and risks. The change management policy defines the purpose and scope clause. The purpose and scope clause clearly defines the purpose of the policy and the scope of changes that the change management policy covers. The purpose and scope clause outlines what constitutes a change, such as modifications to systems, software, hardware, processes, organizational structure, etc. The change management policy further comprises roles and responsibilities guidelines, change request and approval process guidelines, assessment and impact analysis guidelines, change implementation procedures, communication and stakeholder involvement procedures, change monitoring and review procedures, documentation and record-keeping procedures, and continuous improvement procedures. The change management policies comprises procedures or step-by-instructions that ensure that changes are implemented in a controlled and coordinated manner, reducing the likelihood of disruptions, minimizing risks, and maximizing the success of organizational changes. The roles and responsibilities guidelines define step-by-step instructions to identify the roles and responsibilities of individuals or teams involved in the change management process. The roles and responsibilities guidelines include step-by-step instructions to change initiators, change managers, change advisory board (CAB) members, and stakeholders. The change request and approval process guidelines detail the procedure for requesting changes, including the required documentation, forms, or systems for submitting change requests. The roles and responsibilities guidelines also outline the criteria for assessing and approving changes. The assessment and impact analysis guidelines describe step-by-step instructions to evaluate and assess changes and for their potential impact on the organization, including risk assessment, cost-benefit analysis, and the identification of potential disruptions. The change implementation procedures outline the steps and protocols for implementing approved changes. The change implementation procedures include communication plans, testing procedures, fallback plans, and coordination among relevant teams or departments. The communication and stakeholder involvement procedures outline the steps and protocols to address communication regarding changes. The communication and stakeholder involvement procedures comprises steps and protocols to inform stakeholders, affected teams, and employees about upcoming changes, as well as providing training or support as needed. The change monitoring and review procedures specify mechanisms for monitoring changes post-implementation to ensure meeting intended objectives. The change monitoring and review procedures also include provisions for collecting feedback and conducting post-implementation reviews. The documentation and record-keeping procedures comprises steps and protocols to document all change requests, approvals, implementation plans, and outcomes for future reference and auditing purposes. The continuous improvement procedures comprises steps and protocols to review the change management process and making adjustments based on lessons learned and feedback for evaluating continuous improvement.

The change management policy comprises security change management policy and regular change management policy. While both regular change management policies and security change management policies aim to ensure smooth transitions within an organization, they have distinct focuses and approaches.

Regular Change Management Policy:
- Focus: The system may implement regular change management policies for smoothly implementing changes to IT infrastructure, applications, and processes.
- Scope: The regular change management policies are broader, encompassing all types of changes, including system upgrades, software rollouts, and new processes.
- Risk Assessment: The regular change management policies considers general IT risks, such as downtime, productivity loss, and data integrity issues.
- Approval Process: The regular change management policies are usually less stringent, with different levels of complexity depending on the change's impact.
- Testing and Rollout: The regular change management policies emphasis on functionality and integration with existing systems.
- Post-Change Monitoring: The regular change management policies are primarily focused on ensuring the new system functions as intended.

Security Change Management policy:
- Focus: The system may implement security change management policies for minimizing risks to information security and data confidentiality, integrity, and availability.
- Scope: The regular change management policies are specifically focused on changes that affect security systems, data, or access controls.
- Risk Assessment: The security change management policies emphasizes identifying and mitigating potential security vulnerabilities introduced by the change.
- Approval Process: The security change management policies are more stringent, often involving review by security specialists and potentially a dedicated security change advisory board (SCAB).
- Testing and Rollout: The security change management policies implies rigorous testing for security vulnerabilities and thorough rollback plans in case of issues.
- Post-Change Monitoring: The regular change management policies are primarily focused on ongoing monitoring for suspicious activity and potential security incidents.

Key Differences:
- Focus: Regular change management prioritizes functionality and efficiency, while security change management prioritizes minimizing security risks.
- Scope: Regular change management deals with all IT changes, while security change management focuses specifically on changes with potential security implications.
- Risk Assessment: Regular change management considers general IT risks, while security change management focuses on identifying and mitigating specific security vulnerabilities.
- Approval Process: Security change management has a more stringent approval process and often involves additional security expertise.

Testing and Rollout: Security changes undergo more thorough testing for vulnerabilities and have stricter rollback procedures.

Post-Change Monitoring: Security change management requires ongoing monitoring for potential security incidents.

Benefits of Security Change Management Policies:

The security change management policies reduce the risk of security breaches and data breaches.

The security change management policies improve compliance with security regulations and standards. The security change management policies minimizes disruption to business operations due to security incidents. The security change management policies enhance overall security posture of the organization.

The system may periodically review the one or more security policies and update the security policies to address emerging risks and changes in technology or regulations. The system may also periodically review the one or more organizational policies and update the organizational policies to improve the performance of the organization, oriented towards its goals and achieve better results. The system periodically reviews the one or more organizational policies and updates the organizational policies to keep policies aligned with evolving regulations, best practices, and the changing needs of the organization. The system may also regularly review and update the change management policies to align with evolving business needs, technological advancements, and industry best practices.

The standards of the organization refers to a set of guidelines, benchmarks, or specifications that dictate the minimum requirements or best practices to be followed across various aspects of operations. The standards define step-by-step procedures to ensure consistency, quality, efficiency, and compliance within the organization. The standards comprise at least one of quality standards, information security standards, health and safety standards, environmental standards, compliance standards, technology standards, ethical standards, and performance standards. The quality standards encompasses step-by-step procedures to maintain consistent quality in products, services, or processes. The information security standards encompasses step-by-step procedures for information security management, covering aspects such as data protection, access controls, risk management, and compliance. The health and safety standards define step-by-step procedures to adhere to standards and regulations aimed at ensuring a safe working environment, minimizing hazards, and preventing accidents or injuries. The environmental standards define step-by-step instructions to manage environmental responsibilities, reduce environmental impact, and promote sustainability in operations (for example, ISO 14001). The compliance standards define step-by-step instructions to follow legal, regulatory, and industry-specific standards relevant to the organization's operations, ensuring conformity with laws and guidelines. The technology standards cover guidelines for technology usage, infrastructure, software development, and data management, ensuring consistency and compatibility across systems. The ethical standards comprises guidelines for ethical conduct and behavior within the organization, promoting integrity, honesty, and fairness in business practices. The performance standards comprise step-by-step instructions to set performance benchmarks and metrics to measure success, track progress, and evaluate performance across departments or projects.

The procedures are detailed, step-by-step instructions or workflows that outline how specific tasks, processes, or activities should be performed. The procedures provide a structured framework for employees to follow, ensuring consistency, efficiency, and compliance with organizational standards. The procedures comprise operational procedures, IT procedures, human resources procedures, financial procedures, health and safety procedures, project management procedures, compliance procedures, customer service procedures. The operational procedures cover detailed day-to-day operations within different departments or teams. The operational procedures may include procedures for handling customer inquiries, processing orders, managing inventory, or conducting routine tasks. The IT procedures cover various aspects of information technology, such as software installations, network configurations, troubleshooting, cybersecurity protocols, data backups, and system maintenance. The human resources procedures encompass procedures related to hiring, onboarding, training, performance evaluations, disciplinary actions, employee benefits administration, and offboarding processes. The financial procedures outline protocols for financial management, including budgeting, expense approvals, accounting practices, invoicing, payroll processing, and financial reporting. The health and safety procedures cover detailed safety protocols, emergency procedures, evacuation plans, hazard identification, and risk management strategies to ensure a safe working environment. The project management procedures provide guidelines for initiating, planning, executing, monitoring, controlling, and closing projects, including methodologies, reporting structures, and documentation requirements. The compliance procedures define steps to ensure compliance with relevant laws, regulations, and industry standards. The compliance procedures often involve audits, documentation, and reporting requirements. The customer service procedures outline protocols for handling customer complaints, providing support, maintaining service standards, and managing customer interactions. The procedures include the following elements: purpose, step-by-step, roles and responsibilities, resources needed, timeframe, quality checks, and documentation.

The one or more contents may be in a form of at least one of one or more documents, one or more files, one or more folders, one or more images, one or more slides, and one or more excel sheets. In one embodiment, the one or more contents comprise at least one of one or more security contents and one or more organizational structural contents. The one or more contents may be in natural language (e.g., English, Hindi, French, Chinese, Japanese, Korean, etc.).

In one embodiment, the one or more data sources, from which the contents extracted, are related to the organization. In another embodiment, the one or more data sources, from which the contents extracted, are external to the organization. The one or more data sources comprise at least one of databases, object stores, document management system, file systems, and through application programming interfaces. In an embodiment, the job role names and the one or more contextual inputs may be fed as an input query to the processor. The contextual inputs may comprise organizational inputs. The contextual inputs comprise at least one of an organization size, an industry, a field, a tier classification, and employee count. The processor receives the contextual inputs as inputs in context of the previous inputs/interaction within the same session or previous sessions or based on user who is interacting with. The query may be provided as an input using Structured Query Language (SQL) or another query language or semantic or keywords. The query may be provided using natural language. The natural language is human language, such as English or Standard Mandarin, as opposed to a constructed language, an artificial language, a machine language, or the language of formal logic. The query may also be provided using machine language. The databases comprises at least one of an employee database, a professionals network database (e.g., LinkedIn®), a human resource management system database, enterprise resource planning (ERP) system database, customer relationship management (CRM) database, document management system (DMS), knowledge management system, directory services database, an employment database, etc.

The artificial intelligence engine comprises one or more large language models. The large language models represent state-of-the-art developments in natural language processing (NLP) and artificial intelligence (AI). The large language models have several characteristics as described below. The large language models are trained on vast amounts of text data, sometimes comprising billions or even trillions of words. The sheer size enables them to capture intricate patterns and relationships within language. The datasets herein may be custom datasets. The large language models are pre-trained on diverse corpora of text from the internet, books, articles, and other sources (e.g., databases, networks, etc.). The large language models learn a wide range of language features and nuances in the pre-training phase. The large language models utilize the transformer architecture. Transformers have self-attention mechanisms that enable capturing long-range dependencies in text, making them particularly effective for language understanding and generation tasks. The large language models can be fine-tuned on specific tasks or domains by further training on smaller, task-specific datasets. The system fine-tuning the large language models enables them to specialize in various applications like text completion, translation, summarization, interpretation of contents, generation of job description, and more. In an embodiment, the system comprises an artificial intelligence engine (e.g., natural language processing engine) to interpret and understand the one or more contents.

In one embodiment, the method further comprises: extracting at least one of one or more security contents and one or more organizational structural contents from the contents. The method further comprises: generating one or more custom datasets by combining at least one of the one or more security contents and the one or more organizational structural contents. The method further comprises training the artificial intelligence engine using the one or more custom datasets.

In one embodiment, the method further comprises: creating, using the artificial intelligence engine, one or more queries based on at least one of the organizational structure, the one or more roles, the one or more responsibilities, the one or more hierarchical relationships, the one or more access levels, the one or more service actions, and the one or more departments. In an embodiment, the one or more queries are created based on the training. The training may be provided iteratively to improve and learn further. The queries may be in a natural language. The artificial intelligence engine upon iterative learning improves its ability to interpret and understand the semantics, terms, keywords of complex contents (e.g., job descriptions, access levels, service actions, roles and responsibilities, etc.). The processor generates the queries based on the contents. The method further comprises: receiving one or more feedback from one or more users for the one or more queries; and refining, using the artificial intelligence engine, the one or more job descriptions based on the one or more feedback.

In one embodiment, the method further comprises: receiving validation for the one or more job descriptions from the one or more users. The processor displays the one or more job descriptions generated to the one or more users and receives the inputs from the one or more users. The processor also highlights some crucial contents (e.g., access levels, service actions, roles and responsibilities, etc.) within the one or more job descriptions. The one or more users may ensure the job descriptions and specifically the crucial contents. The system may then receive the approval or refusal for the one or more job descriptions from the one or more users. The system may also receive edits for the one or more job descriptions and receive updates to the one or more job descriptions. The system also learns from the inputs (e.g., one touch approval or one touch refusal or edits to the job descriptions). The system then may use the approved job description or edited job description as a base for future generation job description in similar categories. In an embodiment, the system is configured to implement the processor having one or more models onto a computing system of a testing environment. The testing environment may be a second organization for which the job descriptions are yet to be automatically created.

In one embodiment, the method further comprises: deploying one or more models (e.g., trained large language models) onto a computing system (e.g., target environment) to generate one or more second job descriptions of a second organization based on the training; creating one or more second roles based on the one or more second job descriptions; and assigning one or more second access levels, and one or more second service actions to the one or more second roles based on the one or more second job descriptions.

For example, the system receives an input "Database Administrator" as a job role name. In an embodiment, the system may also receive the input as an industry of an organization (e.g., database management). The processor communicates with one or more data sources of the relevant organization and extracts one or more related contents. The one or more contents may comprise job role description, key responsibilities, track records, task activities register, emails, chat conversation, recording, meetings, documents, folders, files, images, flowcharts, privacy policies, security policies, organizational policies, standards, procedures, change management policies etc. that are relevant to the input provided. The processor, comprising the large language models, interprets and analyzes the one or more extracted contents and determines at least one of an organizational structure, one or more roles, one or more responsibilities, one or more hierarchical relationships, one or more access levels, one or more service actions, and one or more departments of the organization from the one or more contents. The processor, in association with the large language models, generates the one or more job descriptions based on at least one of the organizational structure, the one or more roles, the one or more responsibilities, the one or more hierarchical relationships, the one or more access levels, the one or more service actions, and the one or more departments.

As an example, the system generates the output as the job role description of the "database administrator" briefly as "The role of a Database Administrator (DBA) involves managing and maintaining an organization's databases to ensure they operate efficiently, securely, and reliably. The Database Administrator ensures the efficient and secure operation of the organization's databases. The Database Administrator manages, maintains, and optimizes databases to meet the data needs of the organization while ensuring data integrity, availability, and security. The role might also involve collaborating with other IT teams, developers, and system architects to ensure databases align with the organization's overall technological goals and requirements". The job role description also lists the key responsibilities as below:

Database Management:
(a) Install, configure, and maintain database software (e.g., Oracle, MySQL, SQL Server).
(b) Design and implement database structures, schemas, and tables.
(c) Perform database upgrades, patches, and migrations.

Performance Monitoring and Optimization:
(a) Monitor database performance and identify areas for improvement.
(b) Optimize database queries and performance-tuning for efficient data retrieval.
(c) Implement indexing strategies to enhance database performance.

Backup and Recovery:
(a) Develop and maintain backup and recovery strategies to safeguard data.
(b) Conduct regular backups and perform recovery procedures in case of data loss or corruption.

Security Management:
(a) Implement and manage database security measures to protect sensitive data.
(b) Define access controls, user permissions, and authentication mechanisms.
(c) Monitor for security breaches and take corrective actions.

Troubleshooting and Problem Resolution:
(a) Diagnose and resolve database-related issues and errors.
(b) Conduct root cause analysis and implement preventive measures.

Documentation and Reporting:
(a) Maintain documentation for database configurations, procedures, and policies.
(b) Generate reports on database performance, usage, and security.

Data Security and Integrity:
a. Implement and maintain database security measures, including access controls, user permissions, and encryption to protect sensitive data.
b. Ensure compliance with data protection regulations and industry standards.

The job role description further lists out the skills and responsibilities of the job role "Database Administrator".

Bachelor's degree in computer science, Information Technology, or related field.
Proven experience as a Database Administrator or in a similar role.
Proficiency in database management systems (e.g., Oracle, SQL Server, MySQL).
Strong knowledge of database architecture, design, and normalization.
Skills in database performance tuning, troubleshooting, and optimization.
Understanding of database security practices and data protection regulations.
Excellent problem-solving and communication skills.

The specifics of the DBA role can vary based on the organization's size, industry, and the complexity of its database systems. Additionally, DBAs might specialize in certain database platforms or focus on specific areas like data warehousing, big data, or cloud databases, influencing their job responsibilities.

The job role description also lists the access levels for DBA as below:

Access Level Privileges for Database Administrator:
The Database Administrator (DBA) requires specific access level privileges to effectively perform their job responsibilities while adhering to the principle of least privilege. Access permissions should be fine-tuned to ensure the DBA can carry out their duties without unnecessary access to sensitive systems. Here's a detailed list of access level privileges:

Database Management Console (AWS Management Console):
Access to specific AWS RDS and Aurora database instances in read and write modes for provisioning, configuration, and optimization tasks.
Privileges to create, modify, and delete database instances based on business requirements.

Database Backup and Restoration:
Access to perform database backups and schedule automated backup tasks.
Privileges to initiate database restoration processes, ensuring data integrity and availability during recovery scenarios.

Security and Access Control:
Access to database security settings, allowing the DBA to configure access control policies, user roles, and permissions.
Permission to configure encryption settings, implementing encryption-at-rest and in-transit protocols as per security standards.

Monitoring and Audit Logs:
Access to database performance metrics and logs for regular monitoring and optimization purposes.
Permission to review audit logs to identify and address security incidents or unauthorized access attempts.

Database Optimization:
Access to query execution plans and performance statistics for optimizing database queries and indexes.
Privileges to modify database schemas and structures for performance enhancements, with appropriate change management processes.

Disaster Recovery and High Availability:
Access to configure automated failover and high availability settings for critical database instances.
Privileges to test and validate disaster recovery processes, ensuring seamless operations during unexpected events.

Collaboration and Communication:
Access to collaborate with development teams, providing necessary database support and expertise.
Permission to communicate effectively with stakeholders and other IT teams, ensuring alignment with organizational goals.

Documentation and Knowledge Base:
Access to maintain documentation related to database configurations, security settings, and best practices.
Permission to contribute to the organizational knowledge base, sharing expertise and insights with colleagues.

Training and Skill Development:
Access to training resources and courses to stay updated with the latest database technologies, security practices, and AWS services.
Privileges to attend relevant workshops and conferences, enhancing skills and knowledge in database management and security.

The system maps the access level privileges described for the Database Administrator (DBA) to AWS service access levels ensures that the DBA has the appropriate permissions within the AWS environment. Below is a mapping of the access levels to AWS service access levels:

- Database Management Console: The database management console provides AWS Management Console Access with RDS and Aurora Database permissions.
- Database Backup and Restoration: The database backup and restoration privilege provides AWS RDS Backup and Restore permissions for automated backup tasks and restoration processes.
- Security and Access Control: The Security and Access Control provides AWS RDS Security Group permissions for configuring access control policies and network access and AWS Key Management Service (KMS) permissions for encryption settings and access to encryption keys.
- Monitoring and Audit Logs-AWS CloudWatch Logs and Metrics permissions for monitoring database performance metrics and logs.
- Database Optimization: The database optimization privilege provides AWS RDS Performance Insights permissions for analyzing query performance and optimizing database queries and AWS RDS and Aurora Database permissions for modifying database schemas and structures.
- Disaster Recovery and High Availability: The disaster recovery and high availability privilege provides AWS RDS Multi-AZ Deployment permissions for configuring automated failover and high availability settings.
- Collaboration and Communication: The collaboration and communication privilege provides AWS Simple Notification Service (SNS) permissions for communication with stakeholders and IT teams.
- Documentation and Knowledge Base: The documentation and knowledge base privilege provides AWS Simple Storage Service (S3) permissions for maintaining documentation related to database configurations and security settings.
- Training and Skill Development: The training and skill development privilege provides AWS Training and Certification permissions for accessing training resources, courses, workshops, and conferences.

By aligning the access levels with specific AWS service access permissions, the DBA can perform their duties effectively within the AWS environment while adhering to the organization's security policies and the principle of least privilege.

In one embodiment, the method further comprises: enabling the one or more second roles to perform one or more tasks; monitoring the one or more tasks performed by the one or more second roles; and determining at least one of one or more misconfigurations and one or more excessive privilege drifts for the one or more second roles. The misconfigurations and one or more excessive privilege drifts are determined to align access level privileges with the DBA's specific job responsibilities.

In one embodiment, the method further comprises: determining, using the artificial intelligence engine, at least one of the organizational structure, the one or more roles, the one or more responsibilities, the one or more hierarchical relationships, the one or more access levels, the one or more service actions, and the one or more departments comprises: extracting data comprising at least one of one or more keywords, one or more statements, one or more images, one or more access control requirements, and role-related information from the one or more contents; organizing the data into a format, wherein the format comprises the one or more roles associated with the one or more service actions and the one or more access levels; and generating one or more custom datasets from the data.

The processor creates the datasets by compiling information from various sources, including job listings, HR databases, industry reports, and specialized repositories. As an example, the processor collecting the data from various sources are listed below:

- Job Postings and Descriptions: Collect job postings from various platforms (like LinkedIn, Indeed, Glassdoor) across different industries and roles. This data should include job titles, descriptions, required skills, qualifications, and responsibilities.
- HR Databases and Surveys: Access HR databases or conduct surveys within organizations to gather structured data on job roles, responsibilities, qualifications, and skills required for various positions.
- Industry-Specific Reports and Publications: Utilize industry reports, white papers, and publications focused on specific sectors (e.g., IT, healthcare, finance) to extract information about job roles, emerging skills, and evolving job descriptions.
- Online Repositories and Academic Papers: Search academic databases or online repositories (such as Kaggle, UCI Machine Learning Repository) for datasets related to job descriptions or occupational classifications.
- Natural Language Processing (NLP) Techniques: Use NLP tools to parse, extract, and structure textual data from job postings and descriptions. Techniques like Named Entity Recognition (NER) can identify key information such as job titles, skills, and qualifications.
- Manual Annotation and Curation: Manually annotate and curate the dataset to ensure accuracy, consistency, and relevance of the collected job role descriptions. This step helps in refining the dataset and ensuring its quality.
- Data Preprocessing: Clean the dataset by removing duplicates, irrelevant information, or inconsistencies. Normalize text, remove special characters, and perform tokenization to prepare the data for analysis.
- Metadata Tagging: Add metadata tags or labels to categorize job roles based on industry, seniority, function, or skills required. This aids in organizing and categorizing the dataset.
- Validation and Verification: Validate the dataset by cross-referencing information, conducting quality checks, and verifying the accuracy of job role descriptions against known standards or expert opinions.

In one embodiment, the method further comprises: annotating the one or more custom datasets by highlighting the one or more roles, and the one or more service actions and the one or more access levels, respectively; and training the artificial intelligence engine/large language models) using the one or more custom datasets.

In one embodiment, the method further comprises: updating the one or more custom datasets based on one or more feedback received from one or more users; and retraining the artificial intelligence engine iteratively based on one or more custom datasets updated.

In one embodiment, the method comprises executing following technical steps. The technical steps comprise: extracting, using the artificial intelligence engine, cloud provider service action access level reference list related to the organization from the one or more data sources based on the one or more job role names and the one or more contextual inputs. The method also comprises: generating one or more role actual service action reference lists based on the one or more job descriptions; and generating a Role Potential Excessive Service Action List (RPESAL) for the one or more roles based on comparing the cloud provider service action access level reference list and the one or more role actual service action reference lists. The one or more role actual service action reference lists comprises the one or more roles tabulated against at least the one or more service actions and the one or more access levels. The method further comprises: generating a Role Actual Excessive Service Action List (RAESAL) for the one or more roles based on comparing the cloud provider service action access level reference list and the one or more job descriptions.

In another embodiment, the method comprises generating a Role Actual Excessive Service Action List (RAESAL) by executing the following technical steps. The technical steps comprises: monitoring at least one of one or more activities and one or more tasks executed by the one or more roles for a predefined period of time; recording at least one of the one or more activities and the one or more tasks executed by the one or more roles; and generating a Role Actual Excessive Service Action List (RAESAL) for the one or more roles based on comparing the cloud provider service action access level reference list with at least one of the one or more activities and the one or more tasks.

The cloud provider service action access level reference list comprises actions, resources, and conditions keys. For example, the actions, resources, and conditions keys for Amazon® RDS are listed in the below table.

| Actions | Description | Access level | Resource types (*required) | Condition keys |
|---|---|---|---|---|
| AddRoleToDBCluster | Grants permission to associate an Identity and Access Management (IAM) role from an Aurora DB cluster | Write | cluster* | |
| AddRoleToDBInstance | Grants permission to associate an AWS Identity and Access Management (IAM) role with a DB instance | Write | db* | |
| AddTagsToResource | Grants permission to add metadata tags to an Amazon RDS resource | Tagging | cev cluster cluster-endpoint cluster-pg cluster-snapshot db deployment es integration og pg proxy proxy-endpoint ri secgrp snapshot snapshot-tenant-database subgrp target-group tenant-database | aws:RequestTag/${TagKey} aws:TagKeys rds:req-tag/${TagKey} |
| AuthorizeDBSecurityGroupIngress | Grants permission to enable ingress to a DBSecurity Group using one of two forms of authorization | Permissions management | secgrp* | |

-continued

| Actions | Description | Access level | Resource types (*required) | Condition keys |
| --- | --- | --- | --- | --- |
| DescribeBlueGreenDeployments | Grants permission to describe blue green deployments | List | deployment | |
| DescribeRecommendations [permission only] | Grants permission to return information about recommendations | Read | | |

Figure 17:
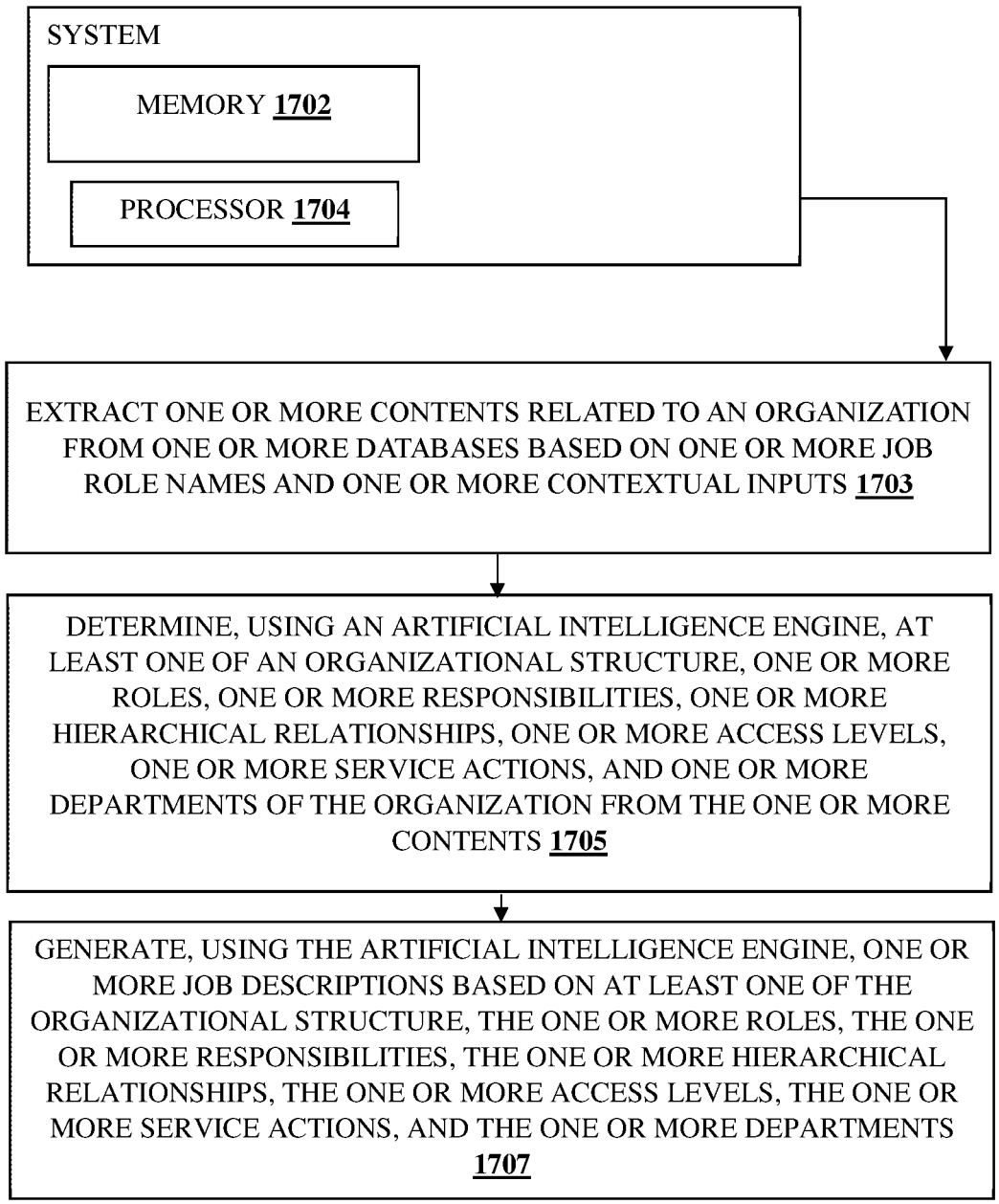
FIG. 17 illustrates a system, according to one or more embodiments.

In another aspect, a system is described. As an example, FIG. 17 illustrates a system, according to one or more embodiments. The system comprises: a memory 1702; and a processor 1704 communicatively coupled to the memory 1702, the processor 1704 storing instructions in the memory 1702 that, when executed, causes the processor 1704 to: extract one or more contents related to an organization from one or more data sources based on one or more job role names and one or more contextual inputs (at step 1703); determine, using an artificial intelligence engine, at least one of an organizational structure, one or more roles, one or more responsibilities, one or more hierarchical relationships, one or more access levels, one or more service actions, and one or more departments of the organization from the one or more contents (at step 1705); and generate, using the artificial intelligence engine, one or more job descriptions based on at least one of the organizational structure, the one or more roles, the one or more responsibilities, the one or more hierarchical relationships, the one or more access levels, the one or more service actions, and the one or more departments (at step 1707). In one embodiment, the one or more data sources are related to the organization. In another embodiment, the one or more data sources are external to the organization. In another embodiment, the one or more data sources are internal to the organization. In one embodiment, the artificial intelligence engine comprises one or more large language models.

In one embodiment, the one or more contents comprises at least one of one or more security policies, one or more privacy policies, one or more change management policies, one or more organizational policies, one or more standards, and one or more procedures. In one embodiment, the one or more contents are in a form of at least one of one or more documents, one or more files, one or more folders, one or more images, one or more slides, and one or more excel sheets. In one embodiment, the one or more contents comprise at least one of one or more security contents and one or more organizational structural contents.

The processor is operable to: extract at least one of one or more security contents and one or more organizational structural contents from the contents; generate one or more custom datasets by combining at least one of the one or more security contents and the one or more organizational structural contents; and train the artificial intelligence engine using the one or more custom datasets. The processor is further operable to: create, using the artificial intelligence engine, one or more queries based on at least one of the organizational structure, the one or more roles, the one or more responsibilities, the one or more hierarchical relationships, the one or more access levels, the one or more service actions, and the one or more departments.

The processor is further operable to: receive one or more feedback from one or more users for the one or more queries; and refine, using the artificial intelligence engine, the one or more job descriptions based on the one or more feedback. The processor is further operable to: receive validation for the one or more job descriptions from the one or more users. The validation is performed in order to align with least privilege principles.

In one embodiment, the processor receives the one or more job role names and the one or more contextual inputs as an input from one or more users. The one or more users comprises at least one of one or more professionals and one or more stakeholders.

In one embodiment, the processor is operable to: deploy one or more models onto a computing system to generate one or more second job descriptions of a second organization based on the training; create one or more second roles based on the one or more second job descriptions; and assign one or more second access levels, and one or more second service actions to the one or more second roles based on the one or more second job descriptions. The processor is further operable to: enable the one or more second roles to perform one or more tasks; monitor the one or more tasks performed by the one or more second roles; and determine at least one of one or more misconfigurations and one or more excessive privilege drifts for the one or more second roles.

In one embodiment, the processor, determining, using the artificial intelligence engine, at least one of the organizational structure, the one or more roles, the one or more responsibilities, the one or more hierarchical relationships, the one or more access levels, the one or more service actions, and the one or more departments, is operable to: extract data comprising at least one of one or more keywords, one or more statements, one or more images, one or more access control requirements, and role-related information from the one or more contents; organize the data into a format, wherein the format comprises the one or more roles associated with the one or more service actions and the one or more access levels (associating roles with their respective access privileges); and generate one or more custom datasets from the data.

In one embodiment, the processor is operable to: annotate the one or more custom datasets by highlighting the one or more roles, and the one or more service actions and the one or more access levels, respectively; and train the artificial intelligence engine using the one or more custom datasets. The processor is further operable to: update the one or more custom datasets based on one or more feedback received from one or more users; and retrain the artificial intelligence engine iteratively based on one or more custom datasets updated.

In an embodiment, the processor through the artificial intelligence engine is configured to generate the one or more role actual service action reference lists based on the one or more job descriptions. The one or more role actual service action reference lists generated defines the service actions and actions levels to the one or more job roles (IAM roles) as intended without any excessive privileges or permissions or service actions or access levels. According to this embodiment, there is no need for generation of RPESAL and RAESAL as there is no excessive privileges or permissions or service actions or access levels. The processor through the artificial intelligence engine generates the RAESAL and RPESAL at the first go accurately based on the job descriptions and the contextual inputs without any training.

In another embodiment, the processor through the artificial intelligence engine is configured to monitor and/or track for any event or activity related to change in the job descriptions or change in the service actions, or access levels. The change in the job descriptions may be due to at least one of intentional, unintentional, authorized, unauthorized, inadvertent error, fraudulent activity, malicious threat, counterfeit activity, change in job roles, change in priority of job roles, addition of new job roles, just-in time (JIT) provisioning, beak glass process, war game test, security auditing, introduction of new commands, critical infrastructure tests, introduction of new service action, introduction of new access levels, escalation of privileges, or change in the organizational standards, policies or procedures. According to this embodiment, there is need for generation of RPESAL and RAESAL. The processor through the artificial intelligence engine detects or monitors for any activity or event related to change in the job descriptions. Uon identifying the change in the job descriptions, the job descriptions are analyzed for at least one of keywords, terms or statements. The at least one of keywords, terms or statements may impact the access levels, privileges assigned, permissions granted and/or service actions. The processor through the artificial intelligence engine generates the one or more role actual service action reference lists based on the job descriptions updated/changed. The processor through the artificial intelligence engine also extracts the cloud provider service action access level reference list related to the organization from the one or more data sources based on the one or more job role names and the one or more contextual inputs. The processor then compares the one or more role actual service action reference lists with the cloud provider service action access level reference list. The one or more role actual service action reference lists and the cloud provider service action access level reference list may have similar data structure or dissimilar data structure. The processor then generates the RAESAL and RPESAL based on the comparison. In an embodiment, the processor through the artificial intelligence engine builds a baseline configuration and a policy for at least the subset of the number of resources in accordance with the environment definition. The artificial intelligence engine receives the input as at least one of environment definition and contextual inputs. The environment definition may be part of the job description. In an embodiment, the artificial intelligence engine may extract the environment definition.

Figure 18:
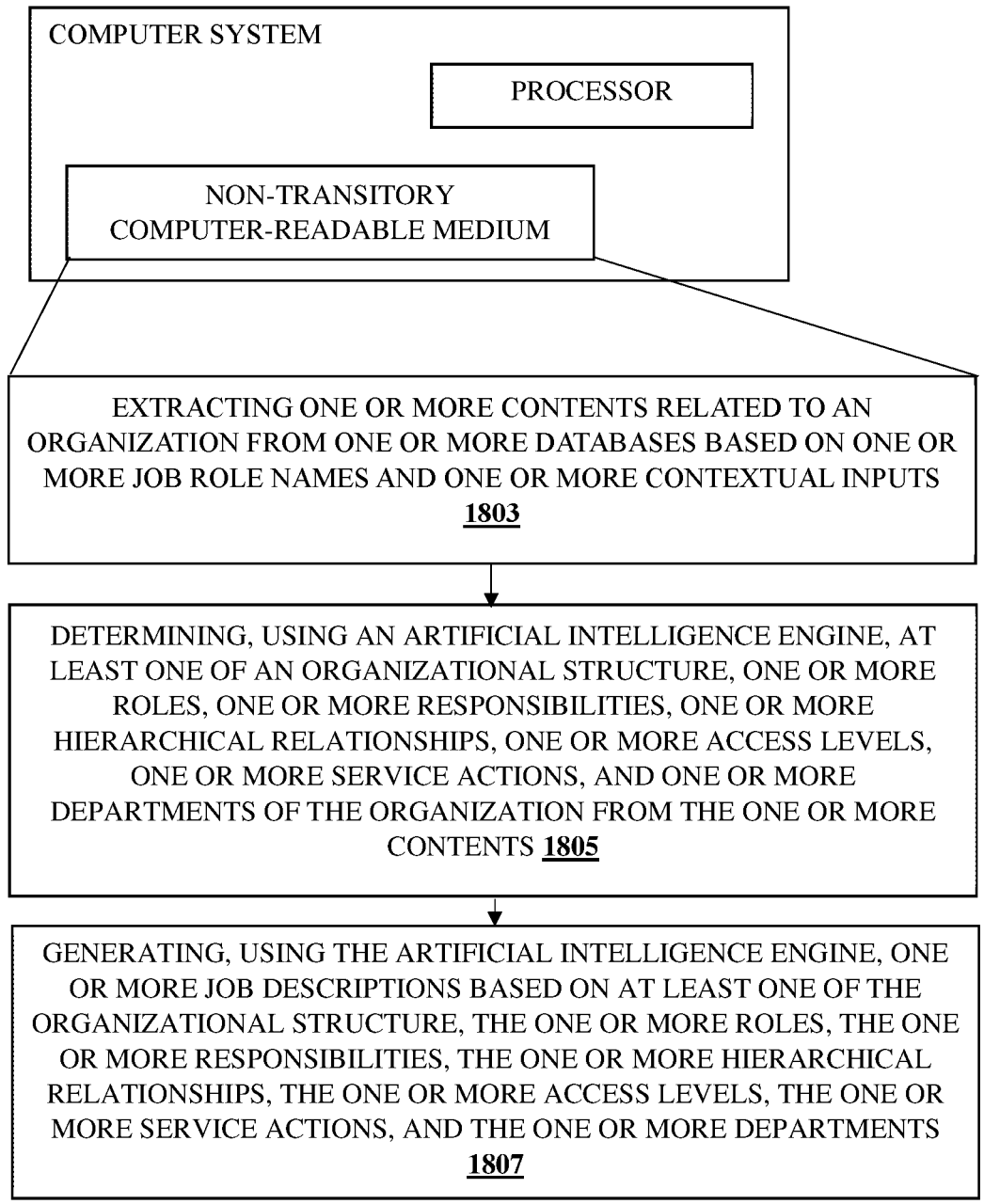
FIG. 18 illustrates a non-transitory computer-readable storage medium, according to one or more embodiments.

In another embodiment, a non-transitory computer-readable storage medium is described. As an example, FIG. 18 illustrates a non-transitory computer-readable storage medium, according to one or more embodiments. The non-transitory computer-readable storage medium storing a sequence of instructions, which when executed by a processor causes: extracting one or more contents related to an organization from one or more data sources based on one or more job role names and one or more contextual inputs (at step 1803); determining, using an artificial intelligence engine, at least one of an organizational structure, one or more roles, one or more responsibilities, one or more hierarchical relationships, one or more access levels, one or more service actions, and one or more departments of the organization from the one or more contents (at step 1805); and generating, using the artificial intelligence engine, one or more job descriptions based on at least one of the organizational structure, the one or more roles, the one or more responsibilities, the one or more hierarchical relationships, the one or more access levels, the one or more service actions, and the one or more departments (at step 1807).

In one embodiment, the one or more contents comprises at least one of one or more security policies, one or more privacy policies, one or more change management policies, one or more organizational policies, one or more standards, and one or more procedures. The one or more contents may be in a form of at least one of one or more documents, one or more files, one or more folders, one or more images, one or more slides, and one or more excel sheets. In one embodiment, the one or more contents comprise at least one of one or more security contents and one or more organizational structural contents. The one or more data sources are related to the organization. The one or more data sources are external to the organization. The one or more data sources may be internal to the organization.

In one embodiment, the artificial intelligence engine comprises one or more large language models. In one embodiment, the non-transitory computer-readable storage medium further causes: receiving the one or more job role names and the one or more contextual inputs as an input from one or more users.

In one embodiment, the non-transitory computer-readable storage medium further causes: extracting at least one of one or more security contents and one or more organizational structural contents from the contents; generating one or more custom datasets by combining at least one of the one or more security contents and the one or more organizational structural contents; and training the artificial intelligence engine using the one or more custom datasets.

In one embodiment, the non-transitory computer-readable storage medium further causes: creating, using the artificial intelligence engine, one or more queries based on at least one of the organizational structure, the one or more roles, the one or more responsibilities, the one or more hierarchical relationships, the one or more access levels, the one or more service actions, and the one or more departments.

In one embodiment, the non-transitory computer-readable storage medium further causes: receiving one or more feedback from one or more users or the agents for the one or more queries; and refining, using the artificial intelligence engine, the one or more job descriptions based on the one or more feedback. The agents may be the software agents from which we may receive the feedback automated enabling it to perform without human intervention at all to receive the feedback.

In an embodiment, the non-transitory computer-readable storage medium further causes: creating an agent for performing automated tasks without human intervention. The non-transitory computer-readable storage medium creates the agents based on the job descriptions. The non-transitory computer-readable storage medium analyzes and extracts contents such as at least one of the keywords, terms and/or statements from the job descriptions. The keywords, terms and/or statements from the job descriptions may be related to the organization for creating the agents. The contents may comprise agent name, agent description, etc. The non-transitory computer-readable storage medium analyzes the agent description and the agent name and determine whether the agent is allowed to request additional inputs. The non-transitory computer-readable storage medium may also assign access levels, service actions, to agents based on the contents. The contents may also comprise at least one of keywords, terms, and/or statements related to foundation model (FM)/base model. The contents/job descriptions may be in the natural language. The contents may also comprise at least one of the keywords, terms and/or statements related to action items, API schema, business logic (lambda function). The action item describes a task that the agent can perform automatically by making API calls to organization system/environment. The set of actions items is defined in an action group. The non-transitory computer-readable storage medium also defines an action group based on the contents in the job description.

Agents accelerate the delivery of generative AI applications that can manage and perform tasks by making API calls to the organization systems. Agents extend FMs to understand user requests, break down complex tasks into multiple steps, carry on a conversation to collect additional information, and take actions to fulfill the request. The agents automate the prompt engineering and orchestration of user-requested tasks. Once configured, an agent automatically builds the prompt and securely augments it with organization-specific information to provide responses back to the user/system in natural language. The agent is able to figure out the actions required to automatically process user-requested tasks. The agent is able to break the task into multiple steps, orchestrates a sequence of API calls and data lookups, and maintains memory to complete the action for the user.

The system provides the agent access to external data sources and connect it to existing APIs of other applications. The system allows the foundation models (FM) that powers the agent to interact with the broader world and extend its utility beyond just language processing tasks. Second, the system enables the foundation models (FM) or base models to figure out what actions to take, what information to use, and in which sequence to perform these actions. The system enables to show FMs how to handle such interactions and how to reason through tasks by building prompts that include definitions and instructions. The process of designing prompts to guide the model towards desired outputs is known as prompt engineering.

With fully managed agents, the system is configured to not to worry about provisioning or managing infrastructure. The system has seamless support for monitoring, encryption, user permissions, and API invocation management without writing custom code. Bedrock console or SDK may be used to upload the API schema. The agent then orchestrates the tasks with the help of foundation models (FMs) and performs API calls using AWS Lambda functions. The foundation models or base models may be tuned or refined iteratively to perform the intended tasks with optimized accuracy.

In one embodiment, the non-transitory computer-readable storage medium further causes: receiving validation for the one or more job descriptions from the one or more users. In one embodiment, the one or more users comprises at least one of one or more professionals and one or more stakeholders.

In one embodiment, the non-transitory computer-readable storage medium further causes: deploying one or more models onto a computing system to generate one or more second job descriptions of a second organization based on the training; creating one or more second roles based on the one or more second job descriptions; and assigning one or more second access levels, and one or more second service actions to the one or more second roles based on the one or more second job descriptions.

In one embodiment, the non-transitory computer-readable storage medium further causes: enabling the one or more second roles to perform one or more tasks; monitoring the one or more tasks performed by the one or more second roles; and determining at least one of one or more misconfigurations and one or more excessive privilege drifts for the one or more second roles.

In one embodiment, determining, using the artificial intelligence engine, at least one of the organizational structure, the one or more roles, the one or more responsibilities, the one or more hierarchical relationships, the one or more access levels, the one or more service actions, and the one or more departments causes: extracting data comprising at least one of one or more keywords, one or more statements, one or more images, one or more access control requirements, and role-related information from the one or more contents; organizing the data into a format, wherein the format comprises the one or more roles associated with the one or more service actions and the one or more access levels; and generating one or more custom datasets from the data. The non-transitory computer-readable storage medium further causes: annotating the one or more custom datasets by highlighting the one or more roles, and the one or more service actions and the one or more access levels, respectively; and training the artificial intelligence engine using the one or more custom datasets. The non-transitory computer-readable storage medium further causes: updating the one or more custom datasets based on one or more feedback received from one or more users; and retraining the artificial intelligence engine iteratively based on one or more custom datasets updated.

In one embodiment, the non-transitory computer-readable storage medium further causes executing following technical steps. The technical steps comprise: extracting, using the artificial intelligence engine, cloud provider service action access level reference list related to the organization from the one or more data sources based on the one or more job role names and the one or more contextual inputs. The non-transitory computer-readable storage medium further also causes: generating one or more role actual service action reference lists based on the one or more job descriptions; and generating a Role Potential Excessive Service Action List (RPESAL) for the one or more roles based on comparing the cloud provider service action access level reference list and the one or more role actual service action reference lists. The one or more role actual service action reference lists comprises the one or more roles tabulated against at least the one or more service actions and the one or more access levels. The non-transitory computer-readable storage medium further causes: generating a Role Actual Excessive Service Action List (RAESAL) for the one or more roles based on comparing the cloud provider service action access level reference list and the one or more job descriptions.

In another embodiment, the non-transitory computer-readable storage medium further causes generating a Role Actual Excessive Service Action List (RAESAL) by executing the following technical steps. The technical steps comprises: monitoring at least one of one or more activities and one or more tasks executed by the one or more roles for a predefined period of time; recording at least one of the one or more activities and the one or more tasks executed by the one or more roles; and generating a Role Actual Excessive Service Action List (RAESAL) for the one or more roles based on comparing the cloud provider service action access level reference list with at least one of the one or more activities and the one or more tasks.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a non-transitory machine-readable medium). For example, the various electrical structures and methods may be embodied using transistors, logic gates, and electrical circuits (e.g., application specific integrated (ASIC) circuitry and/or Digital Signal Processor (DSP) circuitry).

In addition, it will be appreciated that the various operations, processes, and methods disclosed herein may be embodied in a non-transitory machine-readable medium and/or a machine-accessible medium compatible with a data processing system (e.g., a server 1021-N, a data processing device 1041-M). Accordingly, the specification and drawings are to be regarded in an illustrative rather than a restrictive sense.

Other specific forms may embody the present disclosure without departing from its spirit or characteristics. The described embodiments are in all respects illustrative and not restrictive. Therefore, the appended claims rather than the description herein indicate the scope of the invention. All variations which come within the meaning and range of equivalency of the claims are within their scope.

INCORPORATION BY REFERENCE

All patents, patent application publications, and non-patent literature mentioned in the application are incorporated by reference in their entirety, including:
U.S. Pat. No. 8,261,318B2, HUNAG et. al, titled "METHOD and APPARATUS FOR PASSING SECURITY CONFIGURATION INFORMATION BETWEEN A CLIENT AND A SECURITY POLICY SERVER";
U.S. Pat. No. 8,510,842B2, Amit et. al, titled "PINPOINTING SECURITY VULNERABILITIES IN COMPUTER SOFTWARE APPLICATIONS";
U.S. Pat. No. 8,868,701B1 titled "Configuration Management of Distributed Platforms";
US20190068650A1 titled "Automated Network Security Configuration";
U.S. Pat. No. 9,992,230B1 titled "Assessing Security Control Quality and State in an Information Technology Infrastructure";
U.S. Pat. No. 7,587,754B2 titled "Environment Integrity Assured Transactions";
U.S. Pat. No. 8,484,694B2 titled "Systems and methods for performing remote configuration compliance assessment of a networked computer device";
U.S. Pat. No. 10,778,446B2 titled "Detection of vulnerable root certificates in software containers";
U.S. Pat. No. 8,001,527B1, Qureshi et al., titled "AUTOMATED ROOT CAUSE ANALYSIS OF PROBLEMS ASSOCIATED WITH SOFTWARE APPLICATION DEPLOYMENTS";
US20220342846A1 titled "EFFICIENT CONFIGURATION COMPLIANCE VERIFICATION OF RESOURCES IN A TARGET ENVIRONMENT OF A COMPUTING SYSTEM';
U.S. Pat. No. 11,409,697B2 titled "EFFICIENT CONFIGURATION COMPLIANCE VERIFICATION OF RESOURCES IN A TARGET ENVIRONMENT OF A COMPUTING SYSTEM";
Guide for Security-Focused Configuration Management of Information Systems. NIST 800-128;
Security and Privacy Controls for Federal Information Systems and Organizations. NIST 800-53 Rev 4;
Threat Modeling: Designing for Security 1st Edition-Adam Shostack-ISBN 13:9781118809990; Framework for Improving Critical Infrastructure Cybersecurity-National Institute of Standards and Technology-NIST 800-37 April 2016;
Risk Management Framework for Information Systems and Organizations: A System Life Cycle Approach for Security and Privacy-SP 800-37 Rev 2;
How do hybrid clouds work?; and
Multi-cloud and Hybrid Cloud: A world of Difference.

What is claimed is:

1. A computer implemented method comprising:
   executing, by one or more processors of a computing system, computer-executable instructions stored in a non-transitory computer-readable medium to perform operations comprising:
   extracting one or more contents related to an organization from one or more data sources based on one or more job role names and one or more contextual inputs;
   extracting data comprising at least one of one or more keywords, one or more statements, one or more images, one or more access control requirements, and role-related information from the one or more contents and organizing the data into a format, wherein the format comprises one or more roles associated with one or more service actions and one or more access levels;
   determining, using an artificial intelligence engine comprising one or more large language models (LLM), trained on organizational datasets, at least one of an organizational hierarchical structure, the one or more roles, the one or more access levels, the one or more service actions, and one or more departments of the organization from the one or more contents using the extracted data and the format; and
   generating, using the artificial intelligence engine, one or more job descriptions based on the determined at least one of the organizational hierarchical structure, the one or more roles, the one or more access levels, the one or more service actions, and the one or more departments of the organization, and
   wherein the one or more job descriptions are output for use in configuring access control so as to verify compliance within the computing system through a use of the LLM models trained on the organizational datasets to proactively generate machine usable and structured job descriptions and to directly and effectively configure an Identity and Access Management (IAM) system and efficiently provide configuration verification of resources in the computing system.

2. The computer implemented method of claim 1, further comprising:
   extracting at least one of one or more security contents and one or more organizational structural contents from the contents;

generating one or more custom datasets by combining at least one of the one or more security contents and the one or more organizational structural contents; and training the artificial intelligence engine using the one or more custom datasets.

3. The computer implemented method of claim 2, further comprising: creating, using the artificial intelligence engine, one or more queries based on at least one of the organizational hierarchical structure, the one or more roles, the one or more access levels, the one or more service actions, and the one or more departments.

4. The computer implemented method of claim 3, further comprising:
receiving one or more feedback from one of one or more users and one or more agents for the one or more queries; and
refining, using the artificial intelligence engine, the one or more job descriptions based on the one or more feedback.

5. The computer implemented method of claim 4, further comprising:
receiving validation for the one or more job descriptions from the one or more users.

6. The computer implemented method of claim 4, further comprising:
deploying one or more models onto the computing system to generate one or more second job descriptions of a second organization based on the training;
creating one or more second roles based on the one or more second job descriptions; and
assigning one or more second access levels, and one or more second service actions to the one or more second roles based on the one or more second job descriptions.

7. The computer implemented method of claim 6, further comprising:
enabling the one or more second roles to perform one or more tasks;
monitoring the one or more tasks performed by the one or more second roles; and
determining at least one of one or more misconfigurations and one or more excessive privilege drifts for the one or more second roles.

8. The computer implemented method of claim 1, wherein determining, using the artificial intelligence engine, at least one of the organizational hierarchical structure, the one or more roles, the one or more access levels, the one or more service actions, and the one or more departments comprises:
generating one or more custom datasets from the data.

9. The computer implemented method of claim 8, further comprising:
annotating the one or more custom datasets by highlighting the one or more roles, and the one or more service actions and the one or more access levels, respectively; and
training the artificial intelligence engine using the one or more custom datasets.

10. The computer implemented method of claim 9, further comprising:
updating the one or more custom datasets based on one or more feedback received from one or more users; and
retraining the artificial intelligence engine iteratively based on one or more custom datasets updated.

11. The computer implemented method of claim 1, further comprising:
extracting, using the artificial intelligence engine, cloud provider service action access level reference list related to the organization from the one or more data sources based on the one or more job role names and the one or more contextual inputs.

12. The computer implemented method of claim 11, further comprising:
generating one or more role actual service action reference lists based on the one or more job descriptions, wherein the one or more role actual service action reference lists comprises the one or more roles tabulated against at least the one or more service actions and the one or more access levels; and
generating a Role Potential Excessive Service Action List (RPESAL) for the one or more roles based on comparing the cloud provider service action access level reference list and the one or more role actual service action reference lists.

13. The computer implemented method of claim 12, further comprising:
generating a Role Actual Excessive Service Action List (RAESAL) for the one or more roles based on comparing the cloud provider service action access level reference list and the one or more job descriptions.

14. The computer implemented method of claim 12, further comprising:
monitoring at least one of one or more activities and one or more tasks executed by the one or more roles for a predefined period of time;
recording at least one of the one or more activities and the one or more tasks executed by the one or more roles; and
generating a Role Actual Excessive Service Action List (RAESAL) for the one or more roles based on comparing the cloud provider service action access level reference list with at least one of the one or more activities and the one or more tasks.

15. A computing system comprising:
a memory; and
a processor communicatively coupled to the memory, the processor storing instructions in the memory that, when executed, causes the processor to:
extract one or more contents related to an organization from one or more data sources based on one or more job role names and one or more contextual inputs;
extract data comprising at least one of one or more keywords, one or more statements, one or more images, one or more access control requirements, and role-related information from the one or more contents and organizing the data into a format wherein the format comprises one or more roles associated with one or more service actions and one or more access levels;
determine, using an artificial intelligence engine comprising one or more large language models (LLM), trained on organizational datasets, at least one of an organizational hierarchical structure, the one or more roles, the one or more access levels, the one or more service actions, and one or more departments of the organization from the one or more contents using the extracted data and the format; and
generate, using the artificial intelligence engine, one or more job descriptions based on the determined at least one of the organizational hierarchical structure, the one or more roles, the one or more access levels, the one or more service actions, and the one or more departments of the organization, and
wherein the one or more job descriptions are output for use in configuring access control so as to verify compliance within the computing system through a use of the LLM models trained on the organizational datasets to proactively generate machine usable and structured job descriptions and to directly and effectively configure an Identity and Access Management (IAM) system and efficiently provide configuration verification of resources in the computing system.

16. The computing system of claim 15, wherein the processor is operable to:
monitor at least one of activity or an event related to one or more changes in the one or more job descriptions;
analyze the one or more changes in the one or more job descriptions; and
generate a Role Potential Excessive Service Action List (RPESAL) for the one or more roles based on the analysis of the one or more changes in the one or more job descriptions.

17. The computing system of claim 16, wherein the processor is operable to:
generating a Role Actual Excessive Service Action List (RAESAL) for the one or more roles based on the analysis of the one or more changes in the one or more job descriptions.

18. A non-transitory computer-readable storage medium storing a sequence of instructions, which when executed by a processor causes:
extracting one or more contents related to an organization from one or more data sources based on one or more job role names and one or more contextual inputs;
extracting data comprising at least one of one or more keywords, one or more statements, one or more images, one or more access control requirements, and role-related information from the one or more contents and organizing the data into a format, wherein the format comprises one or more roles associated with one or more service actions and one or more access levels;
determining, using an artificial intelligence engine comprising one or more large language models (LLM), trained on organizational datasets, at least one of an organizational hierarchical structure, the one or more roles, the one or more access levels, the one or more service actions, and one or more departments of the organization from the one or more contents using the extracted data and the format; and
generating, using the artificial intelligence engine, one or more job descriptions based on the determined at least one of the organizational hierarchical structure, the one or more roles, the one or more access levels, the one or more service actions, and the one or more departments of the organization, and
wherein the one or more job descriptions are output for use in configuring access control so as to verify compliance within a computing system through a use of the LLM models trained on the organizational datasets to proactively generate machine usable and structured job descriptions and to directly and effectively configure an Identity and Access Management (IAM) system and efficiently provide configuration verification of resources in the computing system.

19. The non-transitory computer-readable storage medium of claim 18, further causes: creating, a baseline configuration, from an environment definition, wherein the one or more contents comprise the environment definition.

* * * * *